US011450087B2

(12) United States Patent
Panetta et al.

(10) Patent No.: US 11,450,087 B2
(45) Date of Patent: Sep. 20, 2022

(54) SYSTEM AND METHOD FOR MULTIMEDIA ANALYTIC PROCESSING AND DISPLAY

(71) Applicants: Trustees of Tufts College, Medford, MA (US); The Board of Regents of the University of Texas System, Austin, TX (US)

(72) Inventors: Karen Panetta, Rockport, MA (US); Shreyas Kamath Kalasa Mohandas, Revere, MA (US); Sos Agaian, San Antonio, TX (US)

( * ) Notice: Subject to any disclaimer, the term of this patent is extended or adjusted under 35 U.S.C. 154(b) by 0 days.

(21) Appl. No.: 17/048,817

(22) PCT Filed: Apr. 18, 2019

(86) PCT No.: PCT/US2019/028072
§ 371 (c)(1),
(2) Date: Oct. 19, 2020

(87) PCT Pub. No.: WO2019/204577
PCT Pub. Date: Oct. 24, 2019

(65) Prior Publication Data
US 2021/0124977 A1    Apr. 29, 2021

Related U.S. Application Data

(60) Provisional application No. 62/659,551, filed on Apr. 18, 2018.

(51) Int. Cl.
*G06T 7/11* (2017.01)
*G06K 9/00* (2022.01)
*G06V 10/46* (2022.01)
*G06T 5/50* (2006.01)
*G06V 10/26* (2022.01)
*G06V 40/12* (2022.01)

(52) U.S. Cl.
CPC .............. *G06V 10/462* (2022.01); *G06T 5/50* (2013.01); *G06V 10/26* (2022.01); *G06V 40/1335* (2022.01); *G06T 2207/10116* (2013.01)

(58) Field of Classification Search
USPC .......................... 382/172–173, 176, 237.257
See application file for complete search history.

(56) References Cited

U.S. PATENT DOCUMENTS 6,587,586 B1 * 7/2003 Cui ...................... G06K 9/6297
382/176
6,775,405 B1    8/2004 Zhu
(Continued)

OTHER PUBLICATIONS

You, Restoration of Highly Impulse Corrupted Images by Contrast-Based Algorith, 2012 IEEE 978-07695-4655-1/12, pp. 475-478. (Year: 2012).*

(Continued)

*Primary Examiner* — Ishrat I Sherali
(74) *Attorney, Agent, or Firm* — Quarles & Brady LLP

(57) ABSTRACT

The present disclosure includes systems and methods for multimedia image analytic including automated binarization, segmentation, and enhancement using bio-inspired based visual morphology schemes. The present disclosure further includes systems and methods for biometric multimedia content authentication using extracted geometric features and one or more of the binarization, segmentation, and enhancement methods.

12 Claims, 38 Drawing Sheets

(56) References Cited

U.S. PATENT DOCUMENTS

| | | | |
|---|---|---|---|
| 8,144,986 | B2 | 3/2012 | Ma |
| 8,213,735 | B2 | 7/2012 | Cooksey |
| 8,351,699 | B2* | 1/2013 | Li ........................ G06V 10/28 |
| | | | 382/172 |
| 8,594,446 | B2 | 11/2013 | Morales |
| 9,443,129 | B2* | 9/2016 | Kask ...................... G06T 7/136 |
| 10,818,011 | B2* | 10/2020 | Hu ....................... G06T 7/0012 |
| 2009/0196501 | A1 | 8/2009 | Ma |
| 2010/0061629 | A1 | 3/2010 | Ma |
| 2010/0158373 | A1* | 6/2010 | Li ......................... G06V 10/28 |
| | | | 382/172 |
| 2012/0116883 | A1 | 5/2012 | Asam |
| 2013/0170749 | A1 | 7/2013 | Tian |
| 2014/0205174 | A1* | 7/2014 | Kask .................... G06V 20/698 |
| | | | 382/133 |
| 2015/0244946 | A1 | 8/2015 | Agaian |
| 2015/0334398 | A1* | 11/2015 | Socek ..................... G06T 7/254 |
| | | | 375/240.26 |
| 2017/0084040 | A1* | 3/2017 | Rad ........................ G06V 10/28 |
| 2020/0134795 | A1* | 4/2020 | Zhang ................. G06F 12/0875 |
| 2021/0124977 | A1* | 4/2021 | Panetta ..................... G06T 5/50 |

OTHER PUBLICATIONS

Qazi et al., Detection and comparison of color edges via median based PCA, 2008 IEEE 1-4244-2384-2/08, pp. 702-706 (Year: 2008).*

Gopalan et al., Sliding window approach based Text Binarisation from Complex Textual images, (IJCE) International Journal on Computer Science and Engineering vol. 02, No. 02, 2010, pp. 309-313 (Year: 2010).*

Agaian, S. S. et al., "Bright and dark distance-based image decomposition and enhancement." Imaging Systems and Techniques (IST), 2014 IEEE International Conference on. IEEE, 2014.

Agaian, S. S. et al., "New haze removal scheme and novel measure of enhancement," Cybernetics (CYBCONF), 2013 IEEE International Conference, IEEE (2013).

Agaian, S.S. et al., (2011). Image fusion using a parameterized logarithmic image processing framework. In Image Fusion. InTech.

Agaian, S. S. et al., "A Comparative Study of Image Feature Detection and Matching Algorithms for Touchless Fingerprint Systems," Electronic Imaging, 2016.15: 1-9 (2016).

Agaian, S. S., Visual Morphology, IS&T/SPIE Conference on Nonlinear Image Processing X, Jan. 1999, San Jose, California, SPIE vol. 3646, 12 pages.

Alspach, D. L. "A Gaussian sum approach to the multi-target identification-tracking problem." Automatica 11.3 (1975): 285-296.

Awad et al., Evaluation of a Fingerprint Identification Algorithm with SIFT Features, 2012 HAI International Conference an Advanced Applied Informatics, 2012, 4 pages.

Bernsen, J., "Dynamic Thresholding of Grey-Level Images." International Conference on Pattern Recognition, vol. 2. N.p.: 1251-1255 (1986).

Cheng et al., Threshold Selection Based on Fuzzy c-Partition Entropy Approach, 1998, Pattern Recognition, vol. 31, No. 7, pp. 857-870.

Derpanis, K. G. "Overview of the RANSAC Algorithm." Image Rochester NY 41:2-3 (2010).

Gao, C. et al. "New edge detection algorithms using alpha weighted quadratic filter." Systems, Man, and Cybernetics (SMC), 2011 IEEE International Conference on. IEEE, 2011.

Goodfellow, I., et al. "Generative adversarial nets," Advances in neural information processing systems, pp. 2672-2680 (2014).

Grauman, K. et al., "Visual object recognition," Synthesis lectures on artificial intelligence and machine learning, 5:1-181(2011).

International Searching Authority. International Search Report and Written Opinion for application PCT/US2019/028072. dated Aug. 19, 2019. 10 pages.

Jiao et al., A Visual Consistent Adaptive Image Thresholding Method, The Imaging Science Journal, 2012, 64:1, pp. 34-49.

Kapur et al., A New Method for Gray-Level Picture Thresholding Using the Entropy of the Histogram, Computer Vision, Graphic, and Image Processing, 1984, 29, pp. 273-285.

Kim, I.-J., "Multi-window binarization of camera image for document recognition," Frontiers in Handwriting Recognition (2004).

Lindeberg, Feature Detection with Automatic Scale Selection, 1998, International Journal of Computer Vision, 30(2), pp. 79-116.

Lowe, Distinctive Image Features from Scale-Invariant Keypoints, 2004, International Journal of Computer Vision, 60 (2), pp. 91-110.

Mikolajczyk et al., An Affine Invariant Interest Point Detector, 2002, ECCV 2002, LNCS 2350, pp. 128-142.

Muppidi, M., et al. "Image segmentation by multi-level thresholding based on fuzzy entropy and genetic algorithm in cloud." System of Systems Engineering Conference (SoSE), 2015 10th. IEEE, 2015.

Muppidi, M., et al. "Image segmentation by multi-level thresholding using genetic algorithm with fuzzy entropy cost functions." Image Processing Theory, Tools and Applications (IPTA), 2015 International Conference on. IEEE, 2015.

Nercessian et al., "Multiresolution decomposition schemes using the parameterized logarithmic image analytic model with application to image fusion." EURASIP Journal on Advances in Signal Processing 2011.1 (2011): 515084.

Nercessian et al., "Multiscale Image Fusion Using an Adaptive Similarity-Based Sensor Weighting Scheme and Human Visual System-Inspired Contrast Measure," Journal of Electronic Imaging, 21.2:021112-1 (2012).

Otsu, A Threshold Selection Method from Gray-Level Histograms, IEEE Transactions on Systems, Man, and Cybernetics, Jan. 1979, col. SMC-9, No. 1, 5 pages.

Panetta, K. et al., "A new reference-based edge map quality measure." IEEE Transactions on Systems, Man, and Cybernetics: Systems 46.11 (2016): 1505-1517.

Panetta, K. et al., "Choosing the optimal spatial domain measure of enhancement for mammogram images," Journal of Biomedical Imaging 2014, 3 (2014).

Panetta, K. et al., "Nonreference medical image edge map measure." Journal of Biomedical Imaging 2014 (2014).

Panetta, K. et al., "Parameterized logarithmic framework for image enhancement," IEEE Transactions on Systems, Man, and Cybernetics, Part B (Cybernetics) 41.2: 460-473 (2011).

Paul, S., et al., "Multi-Exposure and Multi-Focus Image Fusion in Gradient Domain," Journal of Circuits, Systems and Computers, 25.10:1650123 (2016).

Qazi, S. et al. "Detection and comparison of color edges via median based pca," Systems, Man and Cybernetics, 2008, SMC 2008, IEEE International Conference on, IEEE, 2008.

Rao, S. P., et al., "Alpha trimmed correlation for touchless finger image mosaicking." Mobile Multimedia/Image Processing, Security, and Applications 2016, vol. 9869, International Society for Optics and Photonics, 2016.

Roopaei, M., et al., "Cross-entropy histogram equalization," Systems, Man and Cybernetics (SMC), 2014 IEEE International Conference, IEEE (2014).

Rosenfeld, A., et al. "Thresholding Using Relaxation." IEEE Transactions on Pattern Analysis and Machine Intelligence PAMI-3.5: 598-606 (1981).

Sauvola et al., Adaptive Document Image Binarization, Pattern Recognition, 2000, 33, pp. 225-236.

Sezgin, et al., Survey Over Image Thresholding Techniques and Quantitative Performance Evaluation, Journal of Electronic Imaging, Jan. 2004, 13(1), pp. 146-165.

Shuai et al., Fingerprint Indexing Based on Composite Set of Reduced SIFT Features, 2008 19th International Conference on Pattern Recognition, Dec. 2008, Tampa, Florida; 4 pages.

Tang et al., An Improved Scheme for Minimum Cross Entropy Threshold Selection Based on Genetic Algorithm, Knowledge-Based Systems, 2011, 24, pp. 1131-1138.

Tsai, W-H. "Moment-Preserving Thresholding: A New Approach." Computer Vision, Graphics, and Image Processing 29.3 (1985): 377-393.

(56) References Cited

OTHER PUBLICATIONS

Tuytelaars, et al., Local Invariant Feature Detectors: A Survey, Foundations and Trends in Computer Graphics and Vision, 2008, vol. 3, No. 3, pp. 177-280.
White, J. M., et al. "Image Thresholding for Optical Character Recognition and Other Applications Requiring Character Image Extraction." IBM Journal of Research and Development 27.4:400-411 (1983).
Wu, A. Y., et al. " I hreshold Selection Using Quadtrees." IEEE Transactions on Pattern Analysis and Machine Intelligence PAMI-4.1 (1982): 90-94.
You, B. "Restoration of highly impulse corrupted image by contrast-based algorithm." 2012 International Symposium an Computer, Consumer and Control. IEEE, 2012.
Zhou et al., Adaptive SIFT-based Algorithm for Specific Fingerprint Verification, 2011 International Conference on Hand-Based Biometrics, Nov. 2011, Hong Kong, China; 6 pages.
Zhou et al., Fingerprint Identification Using SIFT-based Minutia Descriptors and Improved All Descriptor-Pair Matching, Sensors, 2013, 13; pp. 3142-3156.

\* cited by examiner

SYSTEM AND METHOD FOR MULTIMEDIA ANALYTIC PROCESSING AND DISPLAY

CROSS-REFERENCE TO RELATED APPLICATIONS

This application is the national stage entry of PCT/US2019/028072, filed Apr. 18, 2019, which claims priority to U.S. Provisional Patent Application 62/659,551, filed Apr. 18, 2018, and entitled "Bio-Inspired Multimedia Analytic Systems and Methods", The contents of these applications are incorporated by reference herein.

BACKGROUND OF THE INVENTION

A wide variety of applications employ multimedia content (image, video, figure, and/or text) analytic systems for improved visualization. For example, still digital multimedia (such as, but not limited to, images) may include noise, low exposure, and/or illumination variations that, even if unseen to human eye, may be improved using various multimedia processing techniques.

SUMMARY OF THE INVENTION

The present disclosure provides methods and systems for multimedia analytics including automated binarization, segmentation, and enhancement. In some aspects, the present disclosure implements such processing for different types of multimedia content (e.g., images and/or videos) using human visual system-based schemes. For example, without limiting the scope of the present disclosure, the systems and methods discussed may be used with visible, near visible, thermal, grayscale, color, thermal, biometric, and biomedical imaging, as well as video processing and measurement. Additionally, the present disclosure may include a biometric authentication system using geometric features.

In one aspect, the present disclosure provides a method of binarizing an acquired input multimedia content. The method includes receiving the input multimedia content, applying single window α-trim mean on one of the input multimedia content and a transformed grayscale channel of the input multimedia content, and applying double window α-trim mean on one of the input multimedia content and the transformed grayscale channel of the input multimedia content. The method also includes creating a visibility multimedia content using the single window α-trim mean and the double window α mean, determining a local visual threshold using the visibility multimedia input and a visual morphological thresholding method, and generating a binarized multimedia content by applying the local visual threshold on the input multimedia content.

In another aspect, the present disclosure provides a method of segmenting an acquired input multimedia content. The method includes receiving the input multimedia content, applying single window α-trim mean on one of the input multimedia content and a transformed grayscale channel of the input multimedia content, and applying double window α-trim mean on one of the input multimedia content and the transformed grayscale channel of the input multimedia content. The method also includes creating a visibility multimedia content using the single window α-trim mean and the double window α mean, determining a local visual threshold using the visibility multimedia content and a visual morphological thresholding method, and generating a mask based on the local visual threshold. The method further includes generating a foreground multimedia content and a background multimedia content by applying the mask to the input multimedia content.

In yet another aspect, the present disclosure provides a method of enhancing an acquired input multimedia content. The method includes receiving the input multimedia content, determining a global visual threshold using the input multimedia content and a visual morphological thresholding method, and creating a visual morphological enhanced multimedia content (VMEI/VMEV) by performing visual morphological equalization using the global visual threshold. The method also includes creating a gamma corrected multimedia content by applying gamma correction to the VMEI/VMEV, and generating an enhanced multimedia content by fusing together the gamma corrected multimedia content with the input multimedia content.

In yet a further aspect, the present disclosure provides a method of authenticating a biometric multimedia content. The method includes receiving the biometric multimedia content, determining a global visual threshold using the biometric multimedia content and a visual morphological thresholding method, and creating a visual morphological enhanced multimedia content (VMEI/VMEV) by performing visual morphological equalization using the global visual threshold. The method further includes creating a gamma corrected multimedia content by applying gamma correction to the VMEI/VMEV, generating an enhanced biometric multimedia content by fusing together the gamma corrected multimedia content with the biometric multimedia content, and creating a multimedia content template from the enhanced biometric multimedia content. The method further includes obtaining a retrieved template, matching the multimedia content template with the retrieved template, and generating a report based on the matching.

The foregoing and other aspects of the invention will appear from the following description. In the description, reference is made to the accompanying drawings which form a part hereof, and in which there is shown by way of illustration a preferred aspect of the invention. Such aspect does not necessarily represent the full scope of the invention, however, and reference is made therefore to the claims and herein for interpreting the scope of the invention.

BRIEF DESCRIPTION OF THE DRAWINGS

The present disclosure will hereafter be described with reference to the accompanying drawings, wherein like reference numerals denote like elements.

DETAILED DESCRIPTION

Figure 1:
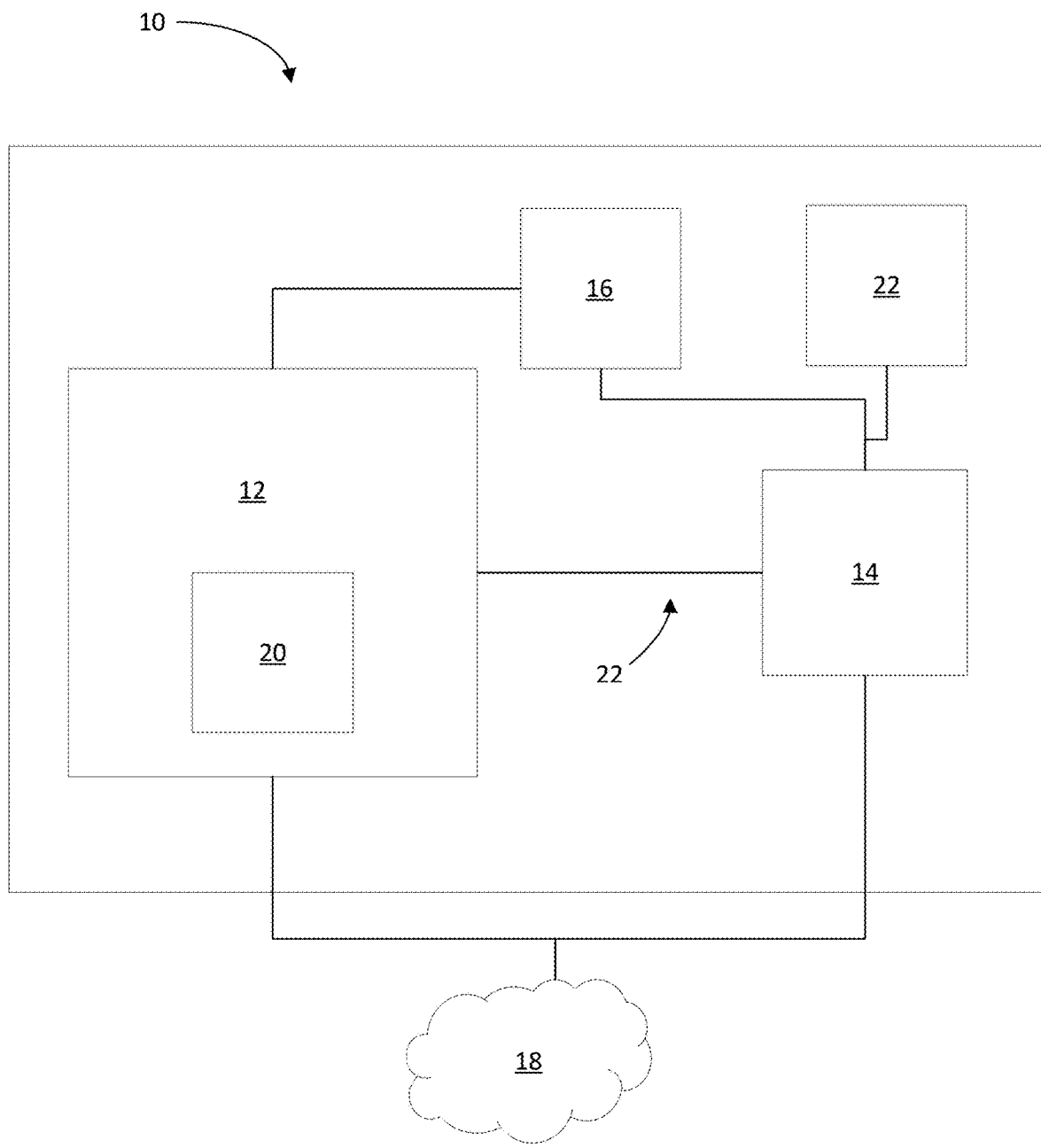
FIG. 1 is a schematic diagram of a multimedia analytic system, according to an embodiment of the present disclosure.

Before the present invention is described in further detail, it is to be understood that the invention is not limited to the particular aspects described. It is also to be understood that the terminology used herein is for the purpose of describing particular aspects only and is not intended to be limiting. The scope of the present invention will be limited only by the claims. As used herein, the singular forms "a", "an", and "the" include plural aspects unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising", "including", or "having" should be interpreted as referring to elements, components, or steps in a non-exclusive manner, so the referenced elements, components, or steps may be combined with other elements, components, or steps that are not expressly referenced. Aspects referenced as "comprising", "including", or "having" certain elements are also contemplated as "consisting essentially of" and "consisting of" those elements, unless the context clearly dictates otherwise. It should be appreciated that aspects of the disclosure that are described with respect to a system are applicable to the methods, and vice versa, unless the context explicitly dictates otherwise. Furthermore, the word "may" is used throughout this application in a permissive sense (i.e., having the potential to, being able to), not in a mandatory sense (i.e., must).

Aspects of the present disclosure are explained in greater detail in the description that follows. Aspects of the disclosure that are described with respect to a method are applicable to aspects related to systems and other methods of the disclosure, unless the context clearly dictates otherwise. Similarly, aspects of the disclosure that are described with respect to a system are applicable to aspects related to methods and other systems of the disclosure, unless the context clearly dictates otherwise.

In the drawings, similar symbols typically identify similar components, unless context dictates otherwise. The numerous innovative teachings of the present invention will be described with particular reference to several embodiments (by way of example, and not of limitation). It will be readily understood that the aspects of the present disclosure, as generally described herein, and illustrated in the Figures, can be arranged, substituted, combined, separated, and designed in a wide variety of different configurations, all of which are explicitly contemplated herein.

In biometric multimedia data applications (such as fingerprint or palm print matching), image analytic techniques may be used to improve recognition systems. In biomedical images, detection of physiological abnormalities may lead to improved diagnoses. Vehicle navigation systems use image and/or video analytics to detect lane markings and improve visualization during various weather conditions. Other multimedia analytics applications include, but are not limited to, facial detection, feature detection, quality analysis in food industry, remote sensing, and defense surveillance. Analytic systems can be crucial for mobile biometrics, for document image analysis (identification), and for visual sensor networks and big data applications, including social/personal media applications. For example, using visual sensor networks, various types of cameras may provide diverse views of a scene, which can enhance the consistency of and help provide a better understanding of the captured events/actions. Each multimedia process for these various applications can be divided into several sub techniques, such as enhancement, color correction, segmentation, thresholding, sharpening, warping, and multimedia content quality measurements.

Generally, aspects of the present disclosure relate to systems and methods for multimedia processing and measurement. Such multimedia may include, but is not limited to, any form of visible, near visible, thermal, grayscale, color, thermal, biometric, and/or biomedical imaging, and/or video, figure, and/or text. For example, various aspects of the present disclosure relate generally to visual and non-visual image analytics, video processing, analysis, and biometric authentication. More particularly, the present disclosure relates to image thresholding, image binarization, image segmentation, image multilevel binarization, image classification, image enhancement, image brightness and darkness equalization, and image/video applications. The present disclosure further relates to biometric authentication systems and, more specifically, may relate to fingerprint, palm print, footprint, or other biometric authentication systems. As used herein, the term biometrics refers to authenticating any human characteristics. While the following description may generally refer to images, the methods and systems described herein may be applicable to any type of multimedia content (e.g., images, videos, figures, and/or text). Thus, by way of example, any method steps described herein as using images may instead use videos, figures, and/or text.

According to some embodiments, the present disclosure includes systems and methods for image binarization. The binarization method may be applied to a variety of images to create binary images. In some aspects, the method may include computing a Human Visual System Operator (HVSO), and/or additional computing schemes, to determine one or more optimal thresholds for binarization. According to other embodiments, the present disclosure includes systems and methods for image segmentation. The segmentation technique may be applied to separate image foreground from image background, for example, to conduct background removal and permit further processing of the foreground (e.g., for biometric authentication or other processing). According to yet other embodiments, the present disclosure includes systems and methods for image enhancement. The enhancement technique may be applied to a variety of images to provide missing image details. By providing missing image details, the images may be more suitable for displaying purposes. According to yet other embodiments, the present disclosure includes systems and methods for biometric authentication. In the present disclosure, any biometric characteristic that can be obtained in the form of an image may be used for personal identification and/or verification.

FIG. 1 illustrates a diagram of an example system 10 configured to carry out one or more of the methods described herein. The system 10 of FIG. 1 can include one or more acquisition modules 12 configured to capture or obtain images and can include processing circuitry 14 configured to execute an image analytic algorithm using the acquired images in accordance with the methods described herein. The system 10 can also include memory 16 configured to store images, image data, and/or templates, in which the acquisition module 12 may retrieve such data from the memory 16 for use by the processing circuitry 14. Additionally or alternatively, the acquisition module 12 may be configured to access similar data via external memory, such as cloud storage 18 or other external storage. Furthermore, the memory 16 or cloud storage 18 may be used to store processed images and/or generated reports (e.g., generated as output from the processing circuitry 14, as further described below).

Generally, in some embodiments, the system 10 can be a portable imaging system configured to capture image data. As such, the acquisition module 12 can include one or more sensors 20 and may be used to create or acquire digital image data. Example sensors 20 include, but are not limited to, a 2D digital visible image sensor, a near infrared sensor, and/or a thermal sensor. According to one example, in some embodiments, the system 10 can be a portable imaging system such as a camera, a cellular telephone, a video camera, or any other imaging device that captures digital image data. In such embodiments, the acquisition module 12 can include a camera module with one or more lenses (not shown) and one or more corresponding image sensors 20. Additionally, the lens may be part of an array of lenses and image sensor 20 may be part of an image sensor array. In some embodiments, the acquisition module 12 can also include its own processing circuitry (not shown) to pre-process acquired images.

In some embodiments, the processing circuitry 14 can include one or more processors configured to carry out one or more method steps described herein. For example, the processing circuitry 14 can include one or more integrated circuits (e.g., image analytic circuits, microprocessors, storage devices such as random-access memory and non-volatile memory, etc.) and can be connected via an input 22 to the acquisition module 12 and/or form part of the acquisition module 12 (e.g., as circuits that form part of an integrated circuit that includes the sensor 20 or an integrated circuit within the acquisition module 12 that is associated with the sensor 20). Image data that has been captured, or acquired, and processed by the acquisition module 12 can, if desired, be further processed and stored using the processing circuitry 14.

As shown in FIG. 1, the system 10 can also include an output module 22 in communication with the processing circuitry 14. The output module 22 can be, for example, a display configured to display generated reports or processed images created by the processing circuitry 14. Additionally, processed image data (such as visual images and/or generated reports) can also, if desired, be provided to external equipment (not shown), such as a computer or other electronic device, using wired and/or wireless communication paths coupled to the processing circuitry 14.

It should be noted that, while the system 10 is shown and described herein, it is within the scope of this disclosure to provide other types of systems to carry out one or more methods of the present disclosure. For example, some embodiments may provide an external acquisition module as a standalone system. The external acquisition module may be configured to acquire and initially process image data, as described above, then store such data on external storage (such as the cloud storage 18) for use with the system 10 of FIG. 1. Furthermore, in some embodiments, the system 10 may or may not include its own acquisition module, and is configured to be connected with or coupled to an external acquisition module.

Figure 2:
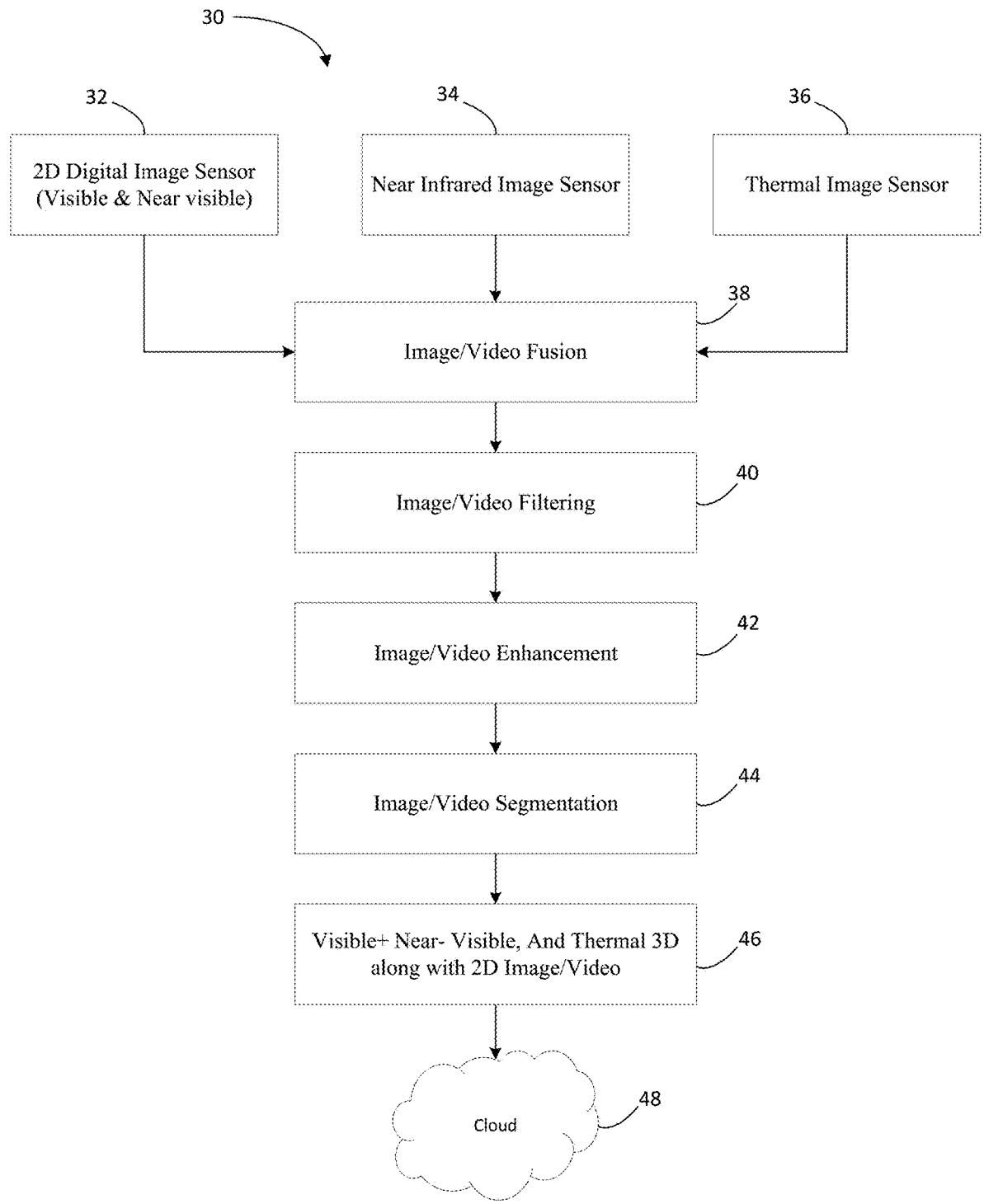
FIG. 2 is a flowchart of a multimedia content acquisition method, according to an embodiment of the present disclosure.

With respect to image (or other multimedia content) acquisition, FIG. 2 illustrates an example acquisition method 30 according to some embodiments. More specifically, FIG. 2 illustrates a method for acquiring a two-dimensional (2D) and/or three-dimensional (3D) digital image from one or more sensors. As shown in FIG. 2, initial image data can be acquired via a 2D visible digital image sensor 32, a near infrared image sensor 34, and/or a thermal image sensor 36. The visible image data, near infrared image data, and/or thermal image data (e.g., from steps 32, 34, and/or 36) can be fused together at step 38. The resulting fused image (and/or other image data if not initially fused in step 38), may contain different types of noise, for example, Gaussian noise, salt and pepper noise, speckle noise, anisotropic noise, etc. This noise can be filtered at step 40 by applying one or more filters depending on the noise present, such as, Gaussian filters to remove Gaussian noise, a median filter to remove salt and pepper noise, and/or other filters.

The filtered image can then be enhanced (step 42) and segmented (step 44) (for example, using the segmentation and enhancement methods described below), resulting in an output image or images at step 46, such as a visible, near-infrared, and thermal 3D image and 2D image. The output image(s) may then be stored in cloud storage (step 48), or other types of memory. These stored output images can be used for display and/or with an image analytics system, such as the system 10 of FIG. 1. For example, in some applications, the output images can be retrieved by an acquisition module 12 of the system 10 and used as input images for additional image analytics (such as any of the processing methods described herein).

Alternatively, in some embodiments, steps 42 and 44 can be skipped and the filtered image from step 40 may be stored in cloud storage 18, internal memory 16, or other types of memory. The filtered images can then be retrieved by an acquisition module 12 of the system 10 and used as input images for additional image analytics (such as any of the processing methods described herein).

Furthermore, while the above image acquisition method 30 is illustrated and described herein, it is within the scope of this disclosure to provide other types of image acquisition methods and methods configured to provide image data for use with one or more methods of the present disclosure. In other words, input images for use with the methods described herein are not limited to those acquired by the above-described system and method.

With respect to the image (or other multimedia content) binarization methods of the present invention, the process of converting a grayscale image into a bitonal image is called binarization. More specifically, grayscale digital images are a combination of black, white, and various shades of gray pixels. For example, grayscale images generally include 8 bits, meaning pixels can vary from 0 (black) and 255 (white), enabling a total of 28 levels. In contrast, a bitonal digital image includes only 0 (black) and 1 (white). Accordingly, image binarization includes converting pixels of a grayscale image to a series of black and white pixels.

Image binarization may be used in numerous applications such as, but not limited to, motion detection, document analysis, optical character recognition (OCR), and industrial image analytics. For example, image binarization may be an effective tool in such applications to separate image foreground from background. However, downsides exist when using current image binarization techniques. As one example, image binarization performs poorly when the variation between foreground and background image intensity is low. As a result, conventional thresholding techniques may include foreground information in the background information or vice versa.

More specifically, in the binarization process, a threshold value must be determined in order to convert a pixel from its current value to white or black (e.g., from a grayscale value to 0 or 1). There are two main categories of thresholding: global thresholding and local thresholding (or adaptive thresholding). Global thresholding methods generally provide good performance for images that have distinct foregrounds and backgrounds. However, the performance decreases when backgrounds are complex, including non-uniform illumination, low contrast, and large signal-dependent noise.

For example, one method of global thresholding suggests minimizing or maximizing the weighted sum of inter-class variances of the foreground and background pixels, which may provide an optimum threshold. Otsu, Nobuyuki. "A Threshold Selection Method from Gray-Level Histograms." Automatica 11.285-296 (1975): 23-27. Another method of global thresholding is based on entropy. This method considers image foreground and background distribution likelihood and the optimal threshold is calculated when the sum of the two entropies reach maximum. Kapur, J. N., P. K. Sahoo, and A. K. C. Wong. "A New Method for Gray-Level Picture Thresholding Using the Entropy of the Histogram." *Computer Vision, Graphics, and Image Processing* 29.3 (1985): 273-285. *ScienceDirect*. Yet another method of global thresholding chooses an optimal threshold depending upon the maximal entropy principle and fizzy C-partition. Cheng, H. D., Jim-Rong Chen, and Jiguang Li. "Threshold Selection Based on Fuzzy c-Partition Entropy Approach." Pattern Recognition 31.7: 857-870 (1998). Other methods include Agaian, Sos, et al. "Bright and dark distance-based image decomposition and enhancement." Imaging Systems and Techniques (IST), 2014 IEEE International Conference on. IEEE, 2014; Roopaei, Mehdi, et al. "Cross-entropy histogram equalization." Systems, Man and Cybernetics (SMC), 2014 IEEE International Conference on. IEEE, 2014; Muppidi, Mohan, et al. "Image segmentation by multi-level thresholding based on fuzzy entropy and genetic algorithm in cloud." System of Systems Engineering Conference (SoSE), 2015 10th. IEEE, 2015; and Muppidi, Mohan, et al. "Image segmentation by multi-level thresholding using genetic algorithm with fuzzy entropy cost functions." Image Processing Theory, Tools and Applications (IPTA), 2015 International Conference on. IEEE, 2015.

Additional methods of global thresholding are described by Tsai (Tsai, Wen-Hsiang. "Moment-Preserving Thresholding: A New Approach." *Computer Vision, Graphics, and Image Processing* 29.3 (1985): 377-393), Wu (Wu, A. Y., T. H. Hong, and A. Rosenfeld. "Threshold Selection Using Quadtrees." *IEEE Transactions on Pattern Analysis and Machine Intelligence* PAMI-4.1 (1982): 90-94), and Rosenfeld (Rosenfeld, A., and R. C. Smith. "Thresholding Using Relaxation." *IEEE Transactions on Pattern Analysis and Machine Intelligence* PAMI-3.5: 598-606 (1981)).

With respect to local thresholding methods, the threshold value of each pixel is determined using itself and information from neighboring pixels. It is generally computed by sliding a square or rectangle window over the entire image. One method of local thresholding uses the computed mean and standard deviation of all pixels to provide an optimal threshold. Niblack, Wayne, *An Introduction to Digital Image Processing*, Strandberg Publishing Company, 1985. Another method of local thresholding uses the methods of Niblack with modifications to provide better performance by considering the variations such as light texture and uneven illumination. Sauvola, J., and M. Pietikäinen, "Adaptive Document Image Binarization," *Pattern Recognition* 33.2: 225-236 (2000). Yet another method of local thresholding utilizes contrast of the image. This method provides a threshold that is the midrange of the mean of the minimum and maximum intensity gray levels of all pixels. Bernsen, John, "Dynamic Thresholding of Grey-Level Images." *International Conference on Pattern Recognition*, Vol. 2. N.p.: 1251-1255 (1986). Further, a method of local thresholding is described by White (White, J. M., and G. D. Rohrer. "Image Thresholding for Optical Character Recognition and Other Applications Requiring Character Image Extraction." *IBM Journal of Research and Development* 27.4:400-411 (1983)).

Figure 3:
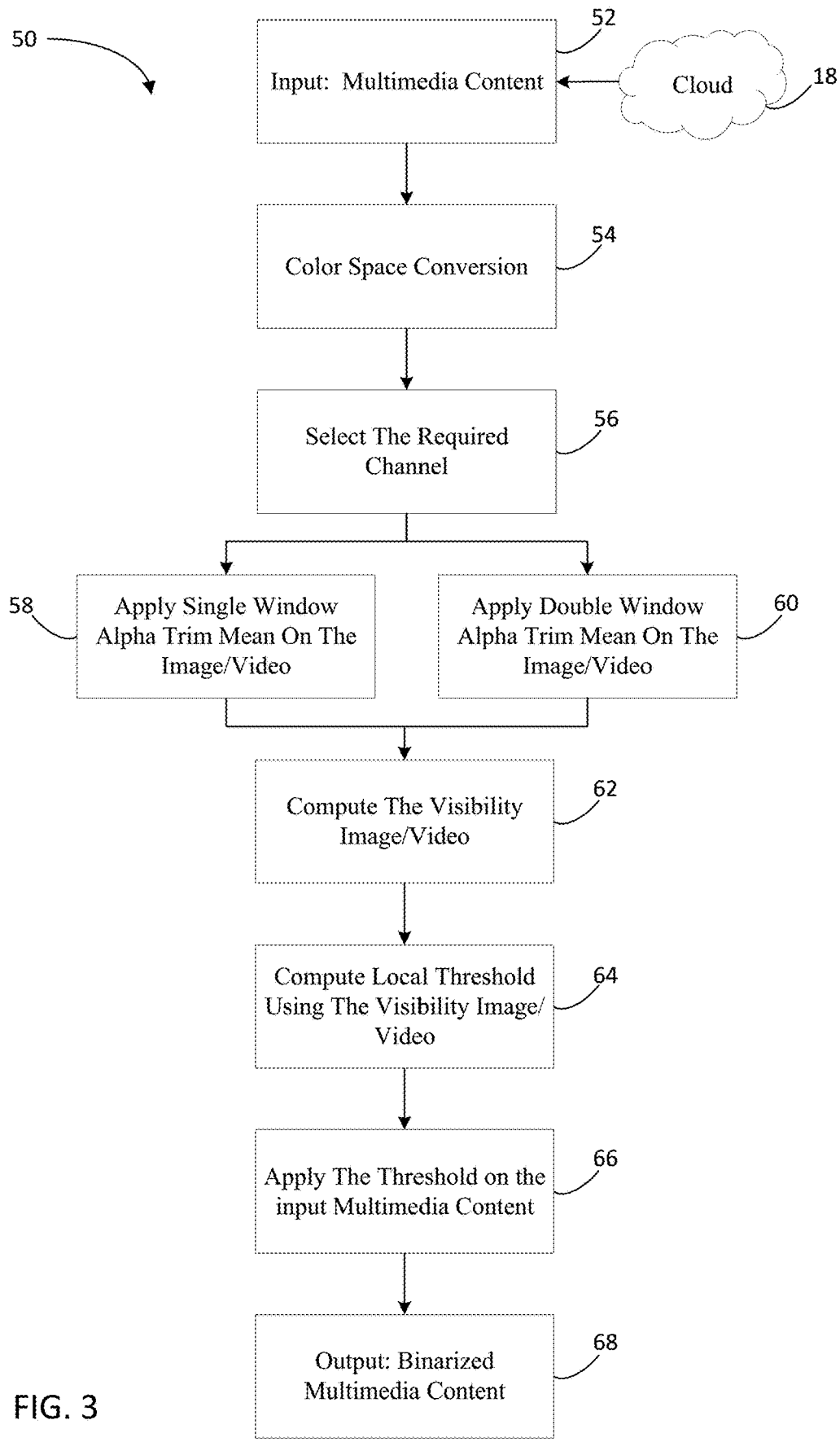
FIG. 3 is a flowchart of a multimedia content binarization method, according to an embodiment of the present disclosure.

FIG. 3 illustrates a method 50 for image binarization according to some embodiments. The method 50 may be based on pixel density of images and can be used with, for example, grayscale, color, thermal, visible and near infrared, or other types of images. Generally, as shown in FIG. 3, the method 50 can include receiving an image as input (step 52), if needed, applying color space transformation to obtain a grayscale input image (step 54), selecting a required channel from the transformed image (step 56), and applying a single window α-trim mean (step 58) and double window α-trim mean (step 60) to compute a visibility image (step 62). Using the visibility image, a local visual threshold is computed (step 64) and applied to the grayscale input image (step 66). A binarized image is then output at step 68.

More specifically, at step 52, an input image is received. For example, the image may be received from memory of a binarization system (such as system 10 described above), or from cloud storage 18. As described above with respect to FIG. 2, cloud storage 18 may include different kinds images retrieved from different sensors. Alternatively, the images may be directly acquired via a system 10 including one or more sensors 20, or may be obtained via a scanner or other suitable source that is part of or in communication with the system 10 having processing circuitry 14.

If the acquired input image is grayscale, no color space transformation is necessary and steps 54 and 56 may be skipped. However, if the input image is a color image, a suitable color space transformation can be applied at step 54. Specific color transformation models may be used for different color models such as CIE, RGB, YUV, HSL/HSV, and CMYK. Additionally, a color space model, median based PCA conversion as described in Qazi, Sadaf, Karen Panetta, and Sos Agaian, "Detection and comparison of color edges via median based pca," Systems, Man and Cybernetics, 2008, SMC 2008, IEEE International Conference on, IEEE, 2008 may also be employed. Alternatively, a novel color space model, α-trim based principal component analysis can be applied. This method converts any given color model into grayscale using a first principal component approximation. For example, in an RGB color model, three different color planes $p_{1,2,3}$ for an image of size M by N exists. To estimate the first component analysis, first, a mean for each color plane is computed. The mean of each color space can be computed using one of the following three variations of α-trim mean: (1) α-trim mean; (2) α-winsorized mean; and (3) weighted rank order statistics (WROS). These can be formulated as shown in Equation 1 to Equation 3 below, respectively.

$$aTrMean(I_1, I_2, I_3, \ldots, I_N; a) = \frac{1}{N - 2aN} \sum_{i=aN+1}^{N-aN} I_{(i)}; \quad \text{Eq. 1}$$

$$aTrMean(I_1, I_2, I_3, \ldots, I_N; a) = \quad \text{Eq. 2}$$
$$\frac{1}{N}\left(aN \cdot I_{(aN+1)} + \sum_{i=aN+1}^{N-aN} I_{(i)} + aN \cdot X_{(N-aN)}\right);$$

$$WROS(I_1, I_2, I_3, \ldots, I_N; \text{weight, rank}) = \quad \text{Eq. 3}$$
$$r^{th} \text{order statistic of} \{a_1 \diamond I_1, a_2 \diamond I_2, \ldots, a_n \diamond I_N\}.$$

Once the α-trim mean is computed, it can be applied to Equation 4 below, and covariance is computed using Equation 5. Throughout the disclosure, operators $\oplus$, $\ominus$, $\otimes$ and $\oslash$ are parametric operations (e.g., as described in Nercessian, Shahan C., Karen A. Panetta, and Sos S. Agaian.

"Multiresolution decomposition schemes using the parameterized logarithmic image analytic model with application to image fusion." EURASIP Journal on Advances in Signal Processing 2011.1 (2011): 515084. However, they can be substituted with logarithmic operations or symmetric logarithmic operators. Also, classical operators illustrated herein, such as arithmetic, subtraction, etc., can be replaced with PLIP operations, logarithmic operations, and symmetric logarithmic operators. From the covariance, corresponding eigen vectors $[v_1, v_2, v_3]$ and eigen values $[\zeta_1, \zeta_2, \zeta_3]$ are computed. The eigen values are arranged in the order of significance such that $[\zeta_1 > \zeta_2 > \zeta_3]$. The eigen vector with the highest eigen value is the principle component of the data set. The new color space model can be constructed using Equation 6.

$$\tilde{p}_l = aTrMean(p_1, p_2, p_3; a) \quad \text{Eq. 4}$$

$$C = \frac{1}{M*N} \sum_{m=0}^{M-1} \sum_{n=0}^{N-1} (p_i[m,n] \ominus \tilde{p}_l[m,n])(p_i[m,n] \ominus \tilde{p}_l[m,n])' \; \forall i = 0,1,2 \quad \text{Eq. 5}$$

$$S_i = v'_i p[m,n] \begin{cases} \forall i = 1 \text{ for grayscale} \\ \forall i = 1,2,3 \text{ for color models} \end{cases} \quad \text{Eq. 6}$$

This method has an advantage of minimal noise (which can be otherwise introduced during conversions). The method generates or constructs grayscale by de-correlating the information in the three planes and has better edge detection properties. Referring back to FIG. 3, at step 56, a required or desired channel is selected from the color space conversion. The selection at step 56 may be application-specific. More specifically, selecting the desired channel can depend on information which needs to be extracted from the image. For example, a visible image in RGB color space can be converted to grayscale to perform segmentation. In another instance, a thermal image with color palette mode can be converted to HSV channel, and V channel can be used to perform segmentation.

Figure 4A:
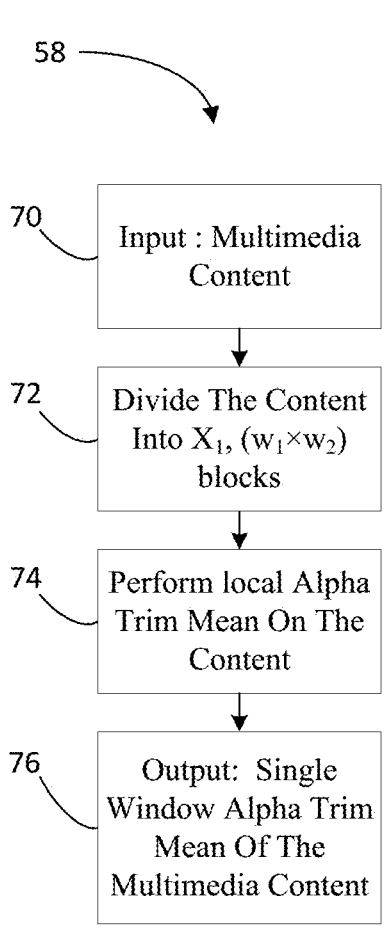
FIG. 4A is a flowchart of a single window α-trim mean technique, according to an embodiment of the present disclosure.

At steps 58 and 59, single window α-trim mean and a double window α-trim mean, respectively, are applied to the original input image (if already in grayscale and steps 54 and 56 are skipped) or the converted image from step 56 (if the original input image is in color). With respect to the single window α-trim mean (SW αMean) at step 58, FIG. 4A illustrates a method for executing this step. More specifically, as shown in FIG. 4A, using an input 2D or 3D image, I, (as received at step 70), the image is divided into χ blocks, where χ=k1×k2, at step 72 (or, alternatively, as shown in FIG. 4A, χ=w1×w2). Then, each χ block is sorted so that the intensity value can be written as follows:

$$I_{min} \leq I_2 \leq I_3 \ldots \leq I_{max} \quad \text{Eq. 7}$$

Once sorted at step 72, one of the three variations of α-trim mean described above in Equations 1-3 (or a different variation, in some embodiments) can be performed on the image at step 74. Once the local α-trim mean is performed at step 74 using any of the above variations, a single window α-trim mean of the image may be output at step 76.

Referring now to the double window α-trim mean (DW αMean) at step 60 of FIG. 3, generally, the same procedure from the single window α-trim mean may be followed, but the output of the single window α-trim mean is raised to a desired power β1 and the single window α-trim mean is again applied, as illustrated in Equation 8 below:

$$DW_{mean} = a_{mean}(a_{mean}(I)_{(k_3 \times k_4)}^{\beta_1})_{k_5 \times k_6} \quad \text{Eq. 8}$$

Figure 4B:
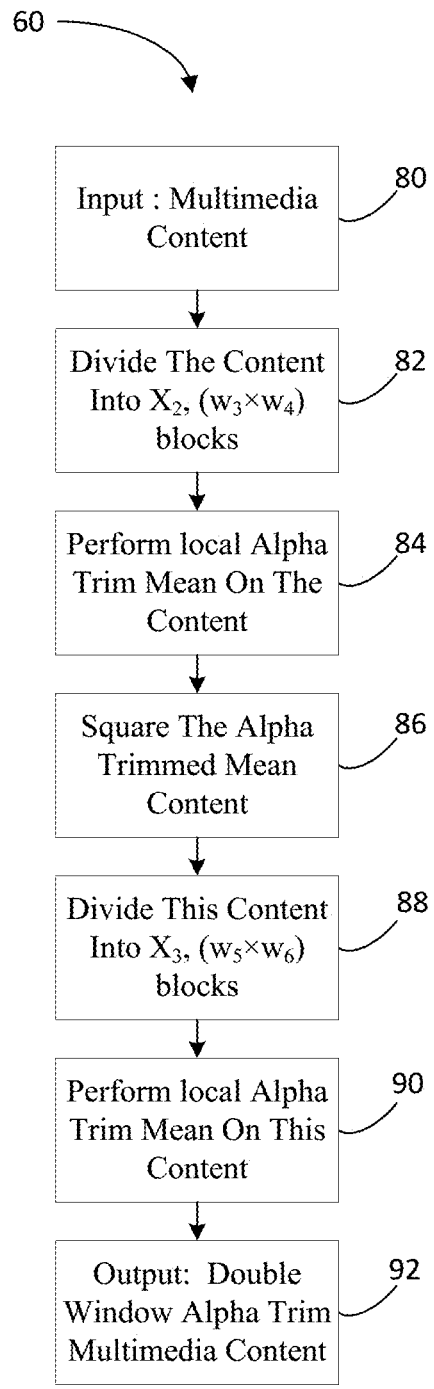
FIG. 4B is a flowchart of a double window α-trim mean technique, according to an embodiment of the present disclosure.

FIG. 4B illustrates an example method for executing the double window α-trim mean of step 60. As shown in FIG. 4B, using an input 2D or 3D image (as received at step 80), the image is divided into a χ blocks, where χ=k3×k4 at step 82 (or, alternatively, as shown in FIG. 4A, χ=w3×w4). Once sorted at step 82, local α-trim mean can be performed on the image using any of the three variations in Equations 1-3 above at step 84. The output single window α-trim mean of the image from step 84 is then squared at step 86. The output image from step 86 (e.g., termed an intermediate output) is again divided into χ blocks, where χ=k5×k6 at step 88 (or, alternatively, as shown in FIG. 4A, χ=w5×w6). Once sorted at step 88, local α-trim mean can again be performed using any of the three variations in Equations 1-3 above at step 90. Once the local α-trim mean is again performed at step 90, a double window α-trim mean of the image may be output at step 92.

Referring back to FIG. 3, once single window and double window α-trim mean is applied at steps 58 and 60, respectively (e.g., using the methods described above with respect to FIGS. 4A and 4B, respectively), a visibility image (VI) can be computed at step 62. For example, the VI can be computed as a Human Visual System Operator (HVSO), as shown in Equation 9 below:

$$HVSO = \Psi * \left\{ \frac{(DW_{aMean})^{\beta_2} \oplus C(SW_{aMean})^{\beta_1 \beta_2}}{(DW_{aMean})^{\beta_2} \ominus C(SW_{aMean})^{\beta_1 \beta_2}} \right\}. \quad \text{Eq. 9}$$

As illustrated in Equation 9, the HVSO is a combination of the single and double α window mean. $\Psi$ is a normalizing factor which controls the dynamic range of the HVSO. In some embodiments, the HVSO described herein can be replaced by any of the HVS operators described in Agaian, Sos S, "Visual morphology," Electronic Imaging '99. International Society for Optics and Photonics (1999).

Additionally, in some embodiments (e.g., dependent on the need of the application), the HVSO can be combined with the original input image as shown in Equation 10 below. In some applications, this may produce a better visibility image (e.g., depending on the intensity of the image). It should be noted that, as used herein, HVSO and HṼSO may be interchangeable and may also be termed as Visibility Image (VI).

$$H\tilde{V}SO = \tau(\text{image}) \oplus (1-\tau)HVSO \quad \text{Eq. 10.}$$

Figure 5:
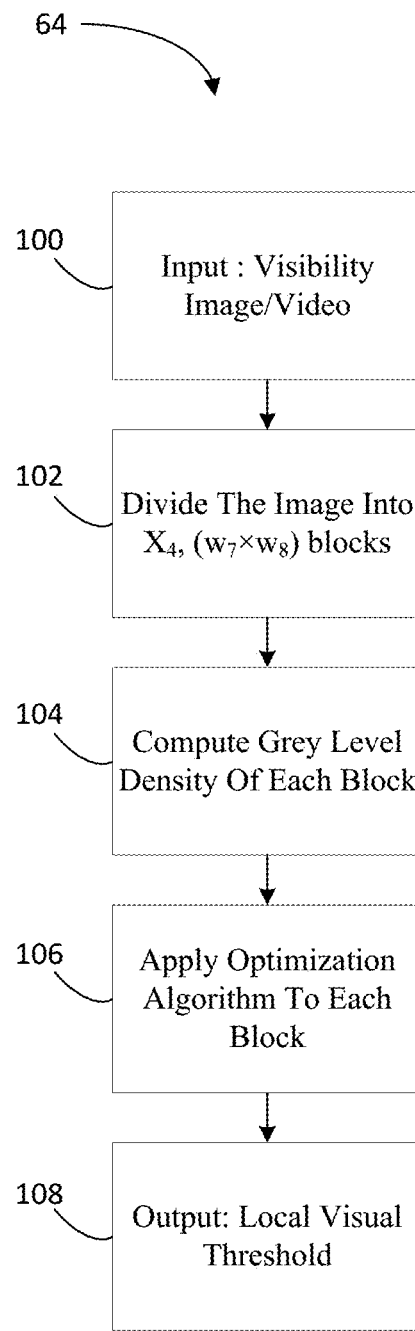
FIG. 5 is a flowchart of a local thresholding method, according to an embodiment of the present disclosure.

Using the VI computed at step 62, a local visual threshold may be computed at step 64. According to some embodiments, a new visual morphological thresholding method is provided, and the present disclosure presents a broader scope for using this technique. A general block diagram of this visual morphological thresholding method (for use at step 64) is illustrated in FIG. 5. For example, an input visibility image, $I_{x,y}$, x=1,2,3, ..., X and y=1,2,3, ..., Y, where X and Y are the dimensions of the image is considered at step 100. At step 102, the image may be divided to $\chi_4$ number of blocks, where $\chi_4 = k_7 \times k_8$ and $\chi_4 = 1,2 \ldots N$. At step 104, each block can be sorted depending on the pixel density (e.g., gray levels). This can be formulated as shown in Equation 11 below:

$$D_{min} \leq D_2 \leq D_3 \ldots \leq D_{[T_{k_7,k_8}]} \leq \ldots \leq D_{max}. \quad \text{Eq. 11}$$

In Equation 11, $D_{min}$, m=min . . . max stands for the probability of density value, which can be defined as: $D_{min}=r_n \times n$, where n is the $n^{th}$ intensity level, and $r_n$ is the total number of times the pixel with intensity level n is repeated in $\chi_4^{th}$ block. $T_{k_7,k_8}$ may be defined as the visual morphological separation point. This point is determined by minimizing or maximizing the visual morphology between the darkness, $D_{Dark;k_7,k_8}^{\chi_4}$, and brightness $D_{Bright;k_7,k_8}^{\chi_4}$. It can be described as shown in Equations 12 and 13 below:

$$D_{Dark;k_7,k_8}^{\chi_4} = \frac{\sum_{min}^{[T_{k_7,k_8}]} D_m}{\sum_{min}^{max} D_m}; \qquad \text{Eq. 12}$$

$$D_{Bright;k_7,k_8}^{\chi_4} = \frac{\sum_{[T_{k_7,k_8}]+1}^{max} D_m}{\sum_{min}^{max} D_m}. \qquad \text{Eq. 13}$$

Visual morphological thresholding, according to some embodiments, can be defined as the distance between visual darkness and visual brightness components in each block. As such, at step 106, the optimal threshold for each block can be formulated as shown below in Equation 14 to Equation 16. The constant $\partial$ selects the block threshold depending on the density of each block, and this can be varied depending on the requirement of the application. At step 108, the local visual threshold is output.

$$T_{opt;k_7,k_8} = \qquad \text{Eq. 14}$$
$$\text{Argmin or Argmax} \left\{ \left( \partial \frac{D_{Dark;k_7,k_8}^{\chi_4}}{D_{Bright;k_7,k_8}^{\chi_4}} \right) \log \left( \partial \frac{D_{Dark;k_7,k_8}^{\chi_4}}{D_{Bright;k_7,k_8}^{\chi_4}} \right) \right\}.$$

$$T_{opt;k_7,k_8} = \text{Argmin or Argmax} \qquad \text{Eq. 15}$$
$$\left\{ (\partial * D_{Dark;k_7,k_8}^{\chi_4} * D_{Bright;k_7,k_8}^{\chi_4}) \log \left( \partial \frac{D_{Dark;k_7,k_8}^{\chi_4}}{D_{Bright;k_7,k_8}^{\chi_4}} \right) \right\}.$$

$$T_{opt;k_7,k_8} = \qquad \text{Eq. 16}$$
$$\text{Argmin or Argmax} \left\{ \left( \partial \frac{D_{Dark;k_7,k_8}^{\chi_4}}{D_{Bright;k_7,k_8}^{\chi_4}} \right) \log \left( \partial \frac{D_{Dark;k_7,k_8}^{\chi_4}}{D_{Bright;k_7,k_8}^{\chi_4}} \right) \oplus \right.$$
$$\left. \left( \partial \frac{D_{Bright;k_7,k_8}^{\chi_4}}{D_{Dark;k_7,k_8}^{\chi_4}} \right) \log \left( \partial \frac{D_{Bright;k_7,k_8}^{\chi_4}}{D_{Dark;k_7,k_8}^{\chi_4}} \right) \right\}.$$

According to another local thresholding method of some embodiments, the single window α-trim mean and the VI are employed to calculate the local threshold (e.g., a local gamma visual threshold), as shown below in Equation 17. These two parameters adjust the threshold according to the contrast in the local neighborhood of the pixel. This technique removes relatively dark regions in the background when the contrast in the local neighborhood is low. In Equation 17, $\gamma_1$ and $\gamma_2$ depend on the intensity characteristics of the image under consideration and C is a constant.

$$T_{opt}=\gamma_1*(SW_{aMean} \otimes (1+C*(VI)))+\gamma_2 \qquad \text{Eq. 17}$$

According to yet another local thresholding method of some embodiments, the VI may be employed. The image may be divided to $\chi_5$ number of blocks, where $\chi_5=k_9 \times k_{10}$ and $\chi_5=\text{min} \ldots \text{max}$. For each intensity level block in VI its occurrence probability may be found using Equation 18 below, where N is the total number of pixels in the block.

$$p_i = \frac{\chi_5(i)}{N} p_i > 0; \sum_{i=min}^{max} p_i = 1. \qquad \text{Eq. 18}$$

Letting the threshold be $T_{k_7,k_8}$ for each block, the blocks can be split into two sections. For example, the cumulative probability of pixels in section 1 (i=min, . . . , $T_{k_7,k_8}$) may be found as $w_1$, and the cumulative probability of pixels in section 2 i=$T_{k_7,k_8}$=1, . . . , max) may be found as $w_2$. This is illustrated below in Equation 19:

$$w_1 = \sum_{i=min}^{T_{k_7,k_8}} p_i; \quad w_2 = \sum_{i=T_{k_7,k_8}+1}^{max} p_i. \qquad \text{Eq. 19}$$

The mean intensity values for both sections can be individually calculated, as well as the total mean of each block, using Equation 20:

$$\mu_1 = \sum_{i=min}^{T_{k_7,k_8}} \frac{ip_i}{w_1}; \quad \mu_2 = \sum_{i=T_{k_7,k_8}+1}^{max} \frac{ip_i}{w_1}; \quad \mu_T = \sum_{i=min}^{max} ip_i. \qquad \text{Eq. 20}$$

The variance can then be computed for each block using Equation 21:

$$\sigma_{\chi_5}^2 = w_1 \left(\frac{\mu_1}{\mu_T}\right)^2 + w_2 \left(\frac{\mu_2}{\mu_T}\right)^2. \qquad \text{Eq. 21}$$

Visual threshold optimization can then be applied to each block. For example, the optimal threshold may be obtained by minimizing (via Equation 22) or maximizing (via Equation 23) the variances.

$$T_{opt(\chi_5)}=\text{Arg min}\{\sigma_{\chi_5}^2\} \qquad \text{Eq. 22.}$$

$$T_{opt(\chi_5)}=\text{Arg max}\{\sigma_{\chi_5}^2\} \qquad \text{Eq. 23.}$$

Yet another technique to threshold an image is by changing the window sizes, thus providing a multi-window binarization method. For example, suppose a threshold $T_1$ is computed using any of the above-mentioned techniques using a window size $\chi_6$ and another threshold $T_2$ is computed using window size $\chi_7$. These thresholds can then be combined using Equation 24 below. Similar techniques using classical operators have been presented in Kim, In-Jung, "Multi-window binarization of camera image for document recognition," Frontiers in Handwriting Recognition (2004).

$$T_{opt}=\tau(T_1) \oplus (1-\tau)T_2 \qquad \text{Eq. 24.}$$

Additionally, to calculate the threshold, other optimization algorithms may be used such as, but not limited to, those described in Agaian, Sos, and Mehdi Roopaei, "New haze removal scheme and novel measure of enhancement," Cybernetics (CYBCONF), 2013 IEEE International Conference, IEEE (2013); Sezgin, Mehmet, "Survey over image thresholding techniques and quantitative performance evaluation," Journal of Electronic imaging 13.1: 146-168 (2004) (this paper reviews many existing thresholding techniques; any of these thresholding techniques can be used with embodiments of the disclosure); An improved scheme for minimum cross entropy threshold selection based on genetic algorithm, Knowledge-Based Systems, Volume 24, Issue 8:1131-1138 (December 2011) (providing recursive algorithms, etc.); and Jiao, X., and T. Wu, "A visual consistent adaptive image thresholding method," The Imaging Science Journal 64.1:34-49 (2016).

Referring back to FIG. 3, the optimal local visual threshold (computed using any of the techniques described above) may be used to binarize the input image at step 66. More specifically, the threshold can be applied on the original image to binarize the image. For example, an optimization algorithm using the optimal threshold can be applied using Equation 25 below. In Equation 25, ρ is a constant and depends on the intensity of the original image. The binarized image, B(x,y), is then output at step 68.

$$B(x, y) = \begin{cases} 1 & I(x, y) \geq \rho \times T_{opt}(x, y) \\ 0 & I(x, y) < \rho \times T_{opt}(x, y) \end{cases} \quad \text{Eq. 25}$$

Figure 6A:
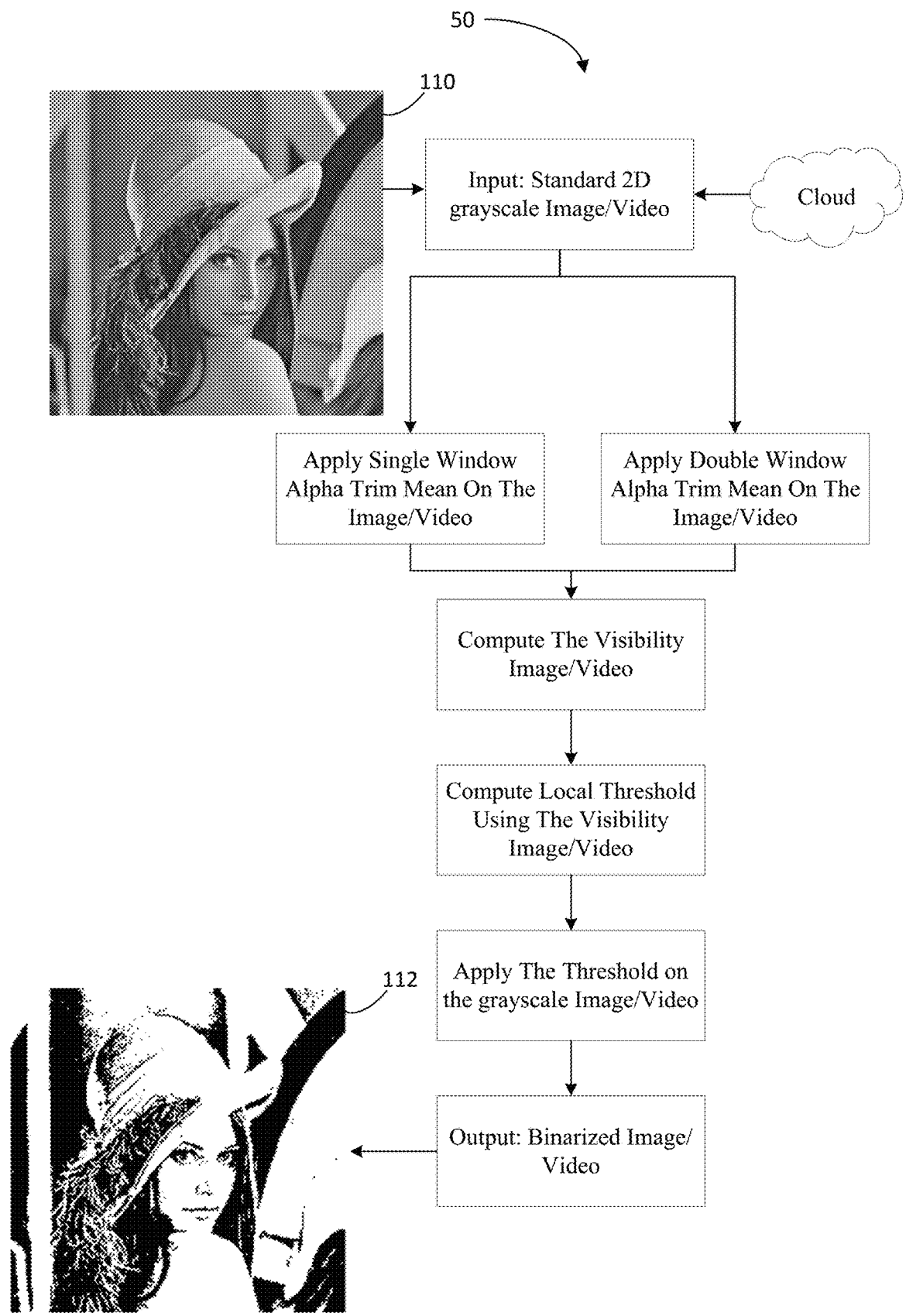
FIG. 6A is a flowchart of an example grayscale image/video binarization, according to an embodiment of the present disclosure.
Figure 6B:
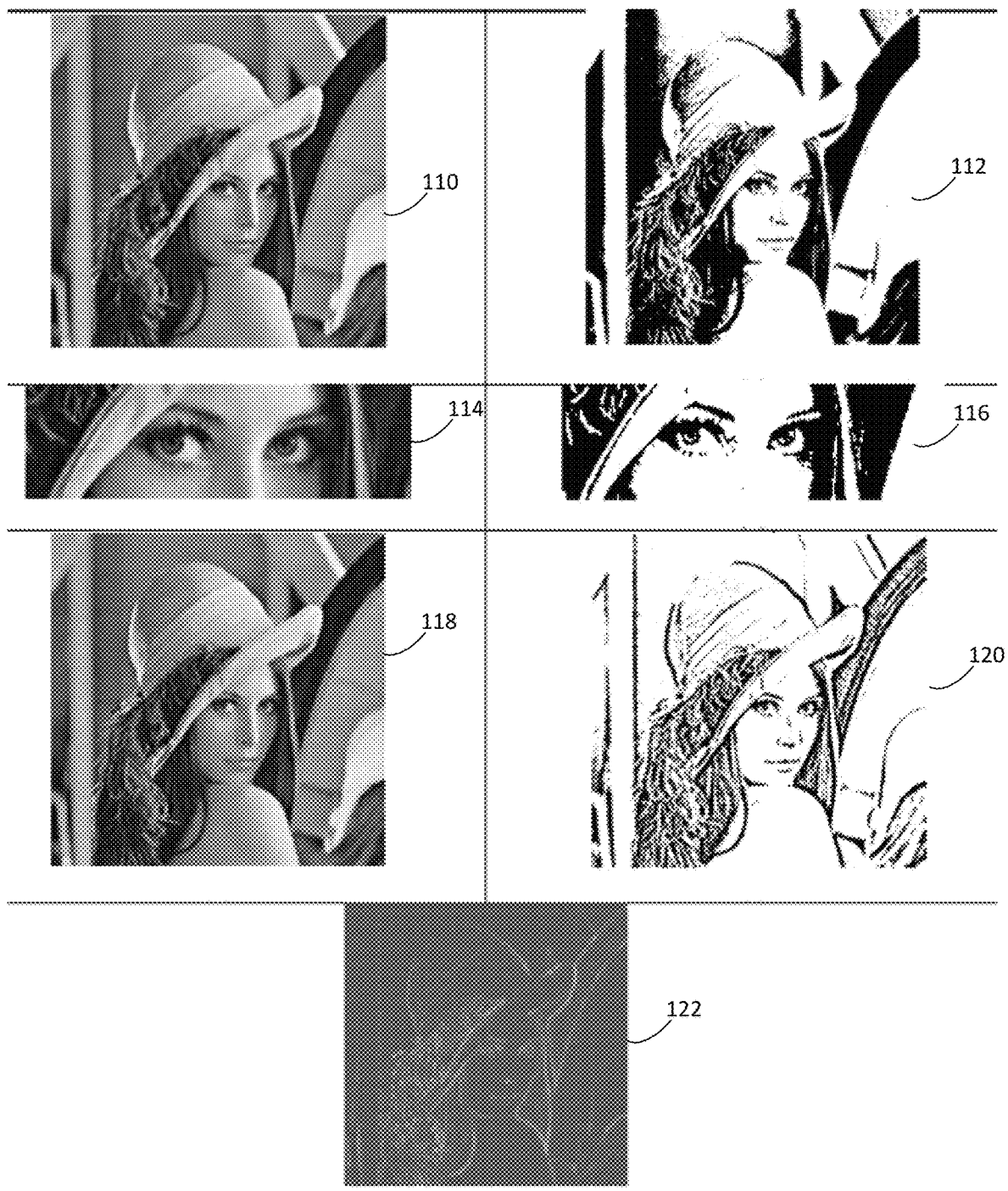
FIG. 6B is a diagram comparing input grayscale images and proposed binarizations, according to an embodiment of the present disclosure.
Figure 7:
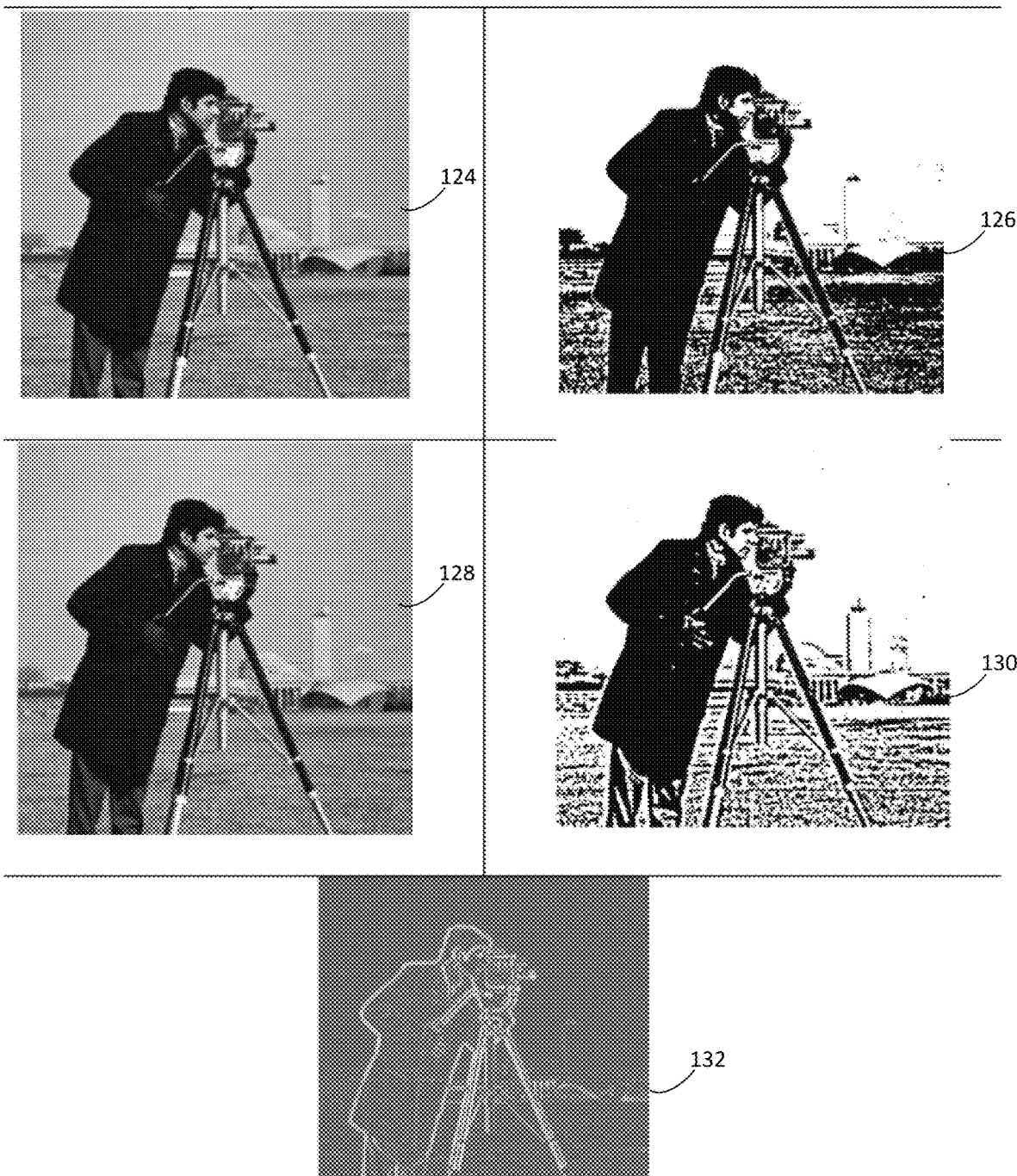
FIG. 7 is another diagram comparing input grayscale images and proposed binarizations, according to an embodiment of the present disclosure.
Figure 8:
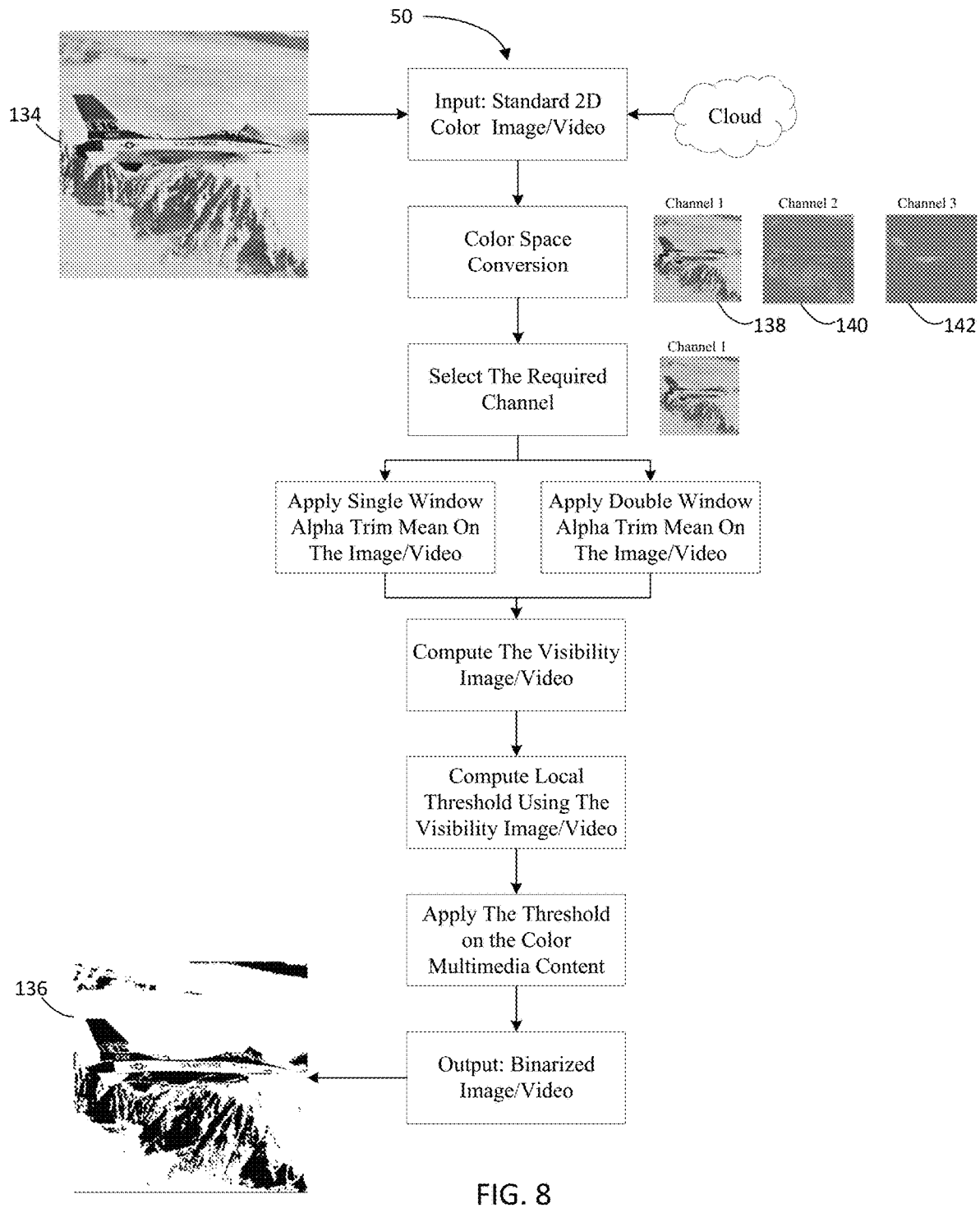
FIG. 8 is a flowchart of an example color image/video binarization, according to an embodiment of the present disclosure.

FIGS. 6A-18 illustrate various examples of the above binarization method. More specifically, FIG. 6A illustrates an example binarization method 50 receiving a standard 2D grayscale image 110 as input and outputting a binarized image 112. FIG. 6B illustrates the original image 110 and the binarized image 112, obtained using Visual morphological thresholding. In FIG. 6B, image 114 and image 116 are the zoomed images obtained from the original image 110 and the binarized image 112, respectively. As shown in the images 114, 116, the eye pattern was accurately segmented using the present technique. Moreover, the technique does not need any additional parameters to binarize the image. FIG. 6B also illustrates the original image 118, and the binarized image 120, obtained by applying a local thresholding method using Equation 17 above. Additionally, in FIG. 6B, image 122 is an image obtained after applying an HVSO operator. FIG. 7 illustrates another example of an input grayscale image 124, proposed binarization 126 and additional input and proposed binarizations 128-132 in accordance with the methods of the present disclosure. FIG. 8 illustrates an example binarization method 50 receiving a standard 2D color image 134 as input and outputting a binarized image 136. As shown in FIG. 8, the color space conversion step 54 outputs three channels 138, 140, 142 for selection at step 56.

Figure 9:
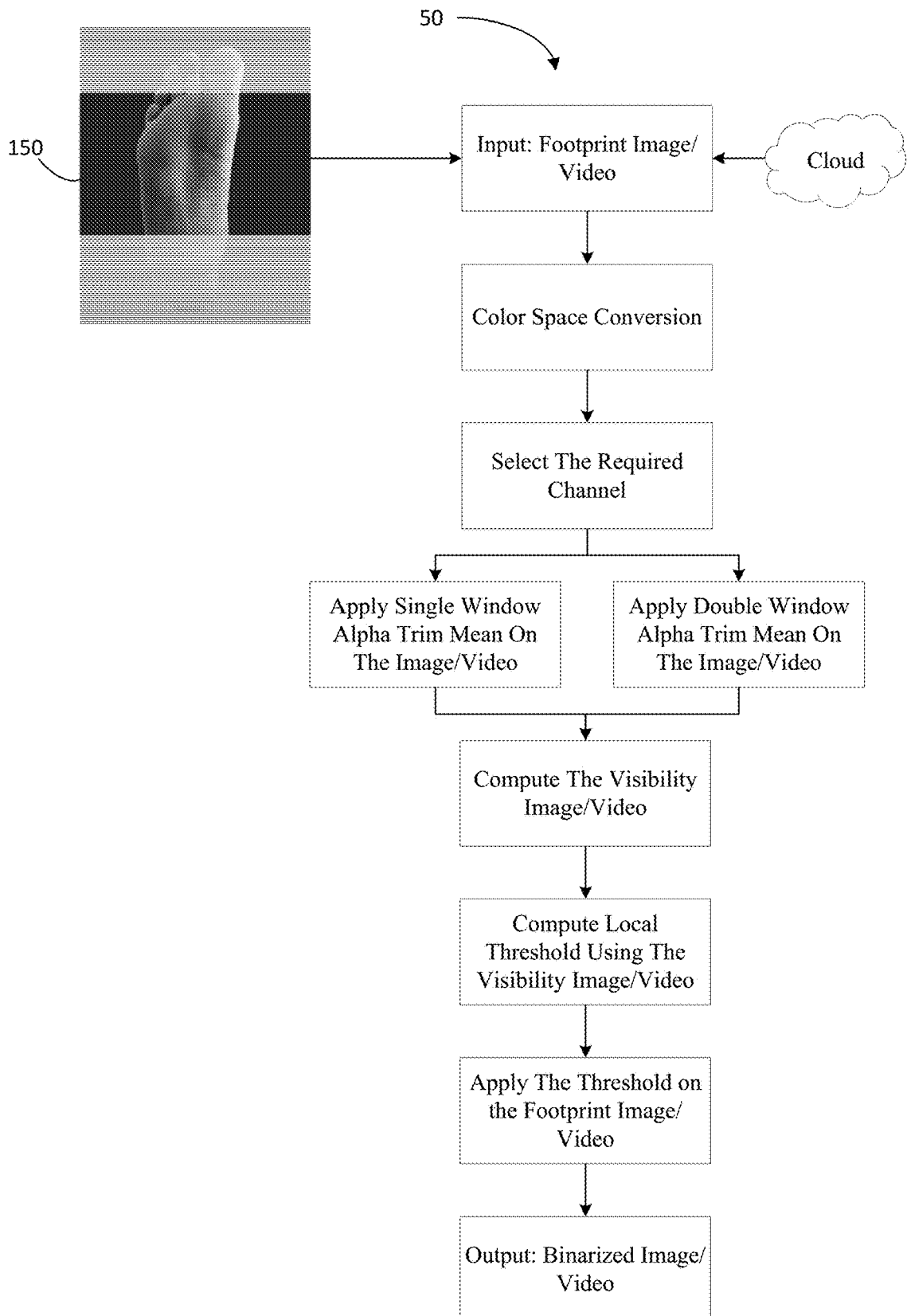
FIG. 9 is a flowchart of an example footprint image/video binarization, according to an embodiment of the present disclosure.
Figure 10:
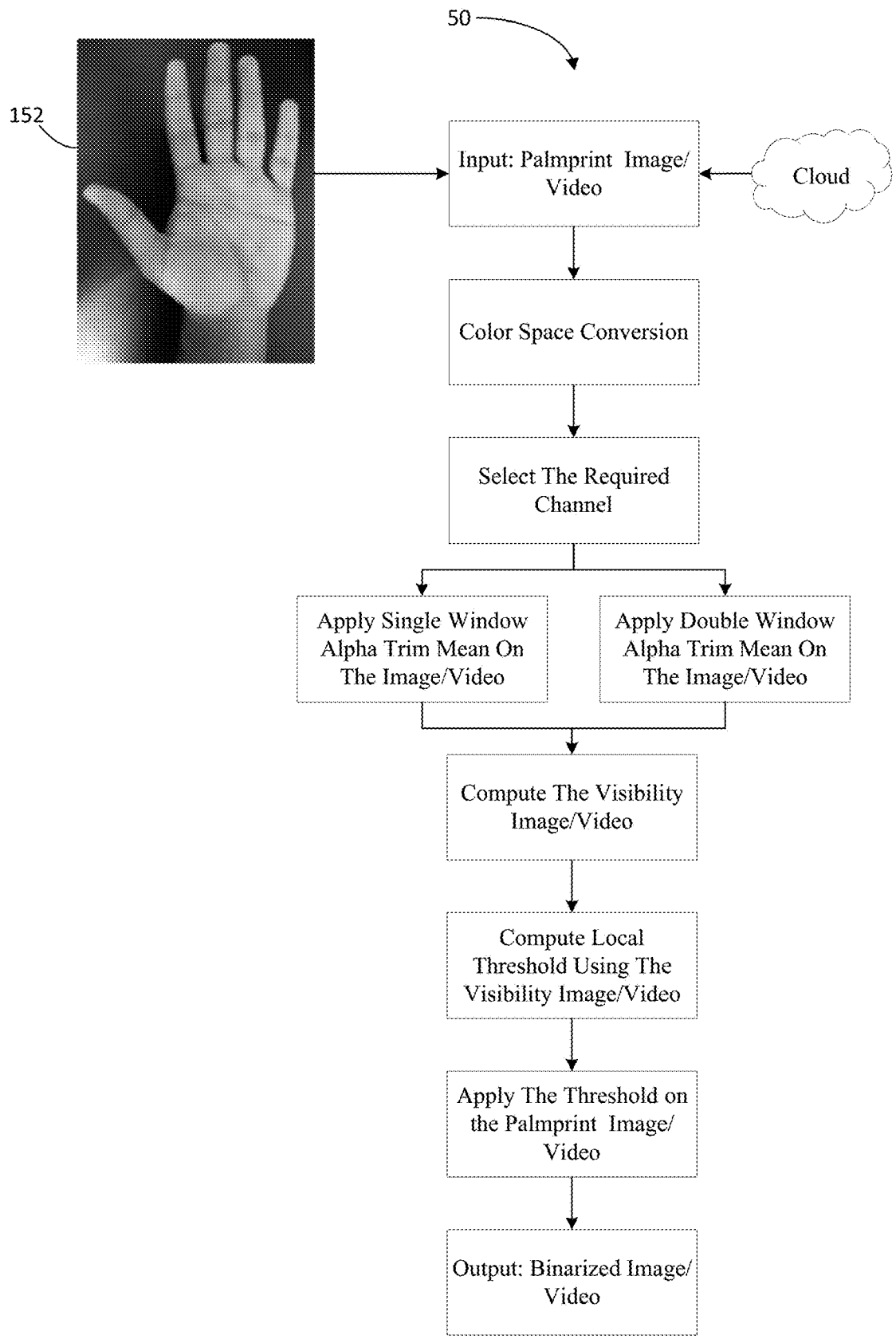
FIG. 10 is a flowchart of an example palm print image/video binarization, according to an embodiment of the present disclosure.
Figure 11A:
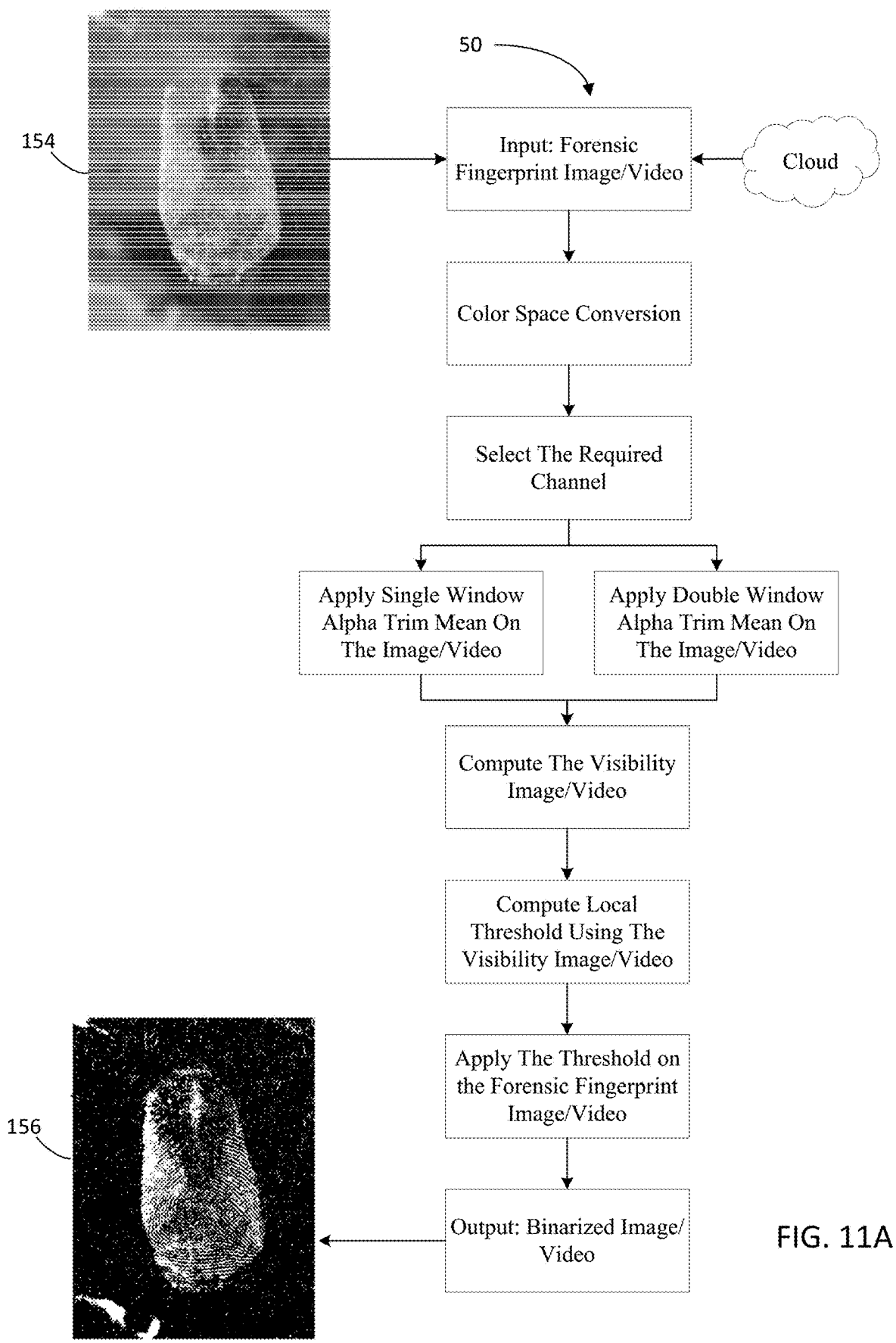
FIG. 11A is a flowchart of an example fingerprint image/video binarization, according to an embodiment of the present disclosure.
Figure 11B:
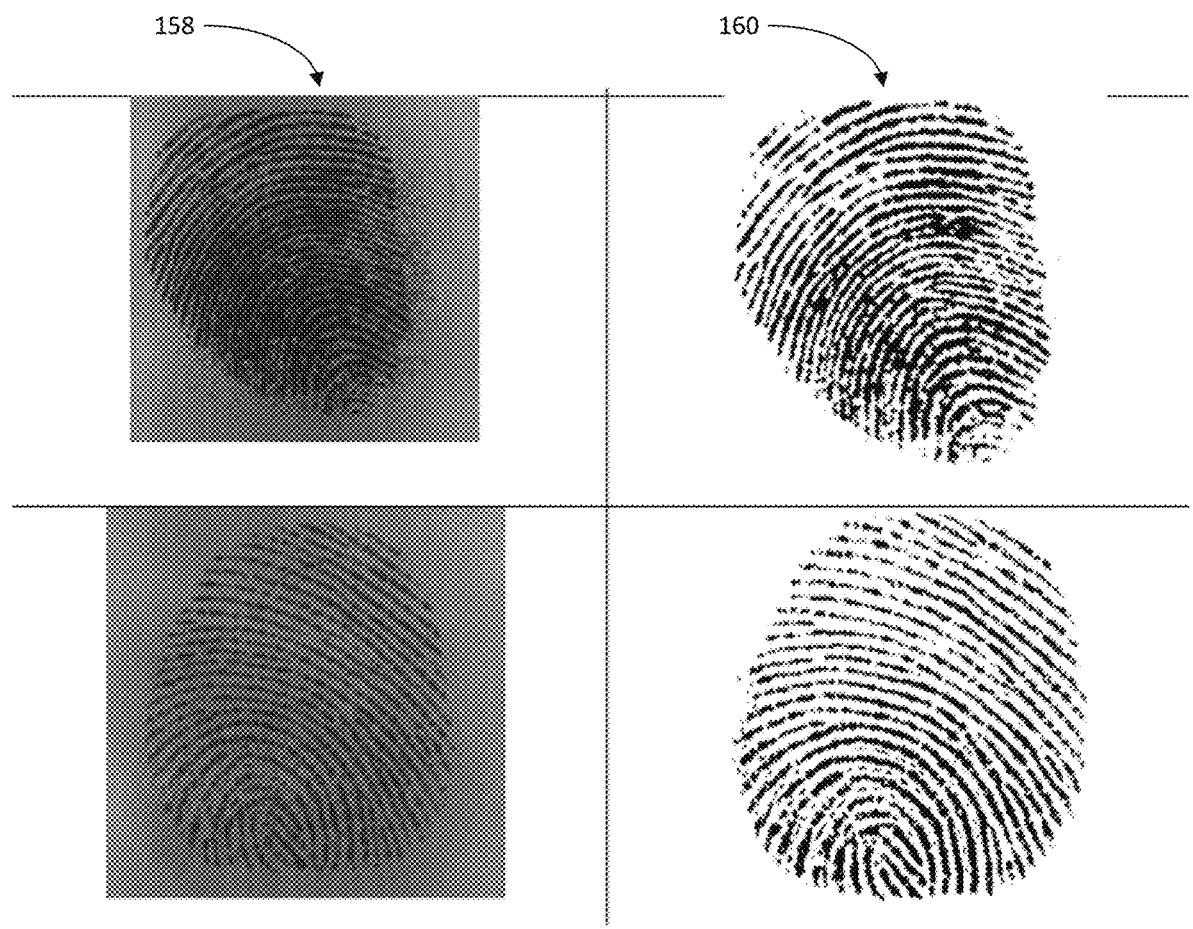
FIG. 11B is a diagram comparing input fingerprint images and proposed binarizations, according to an embodiment of the present disclosure.
Figure 11C:
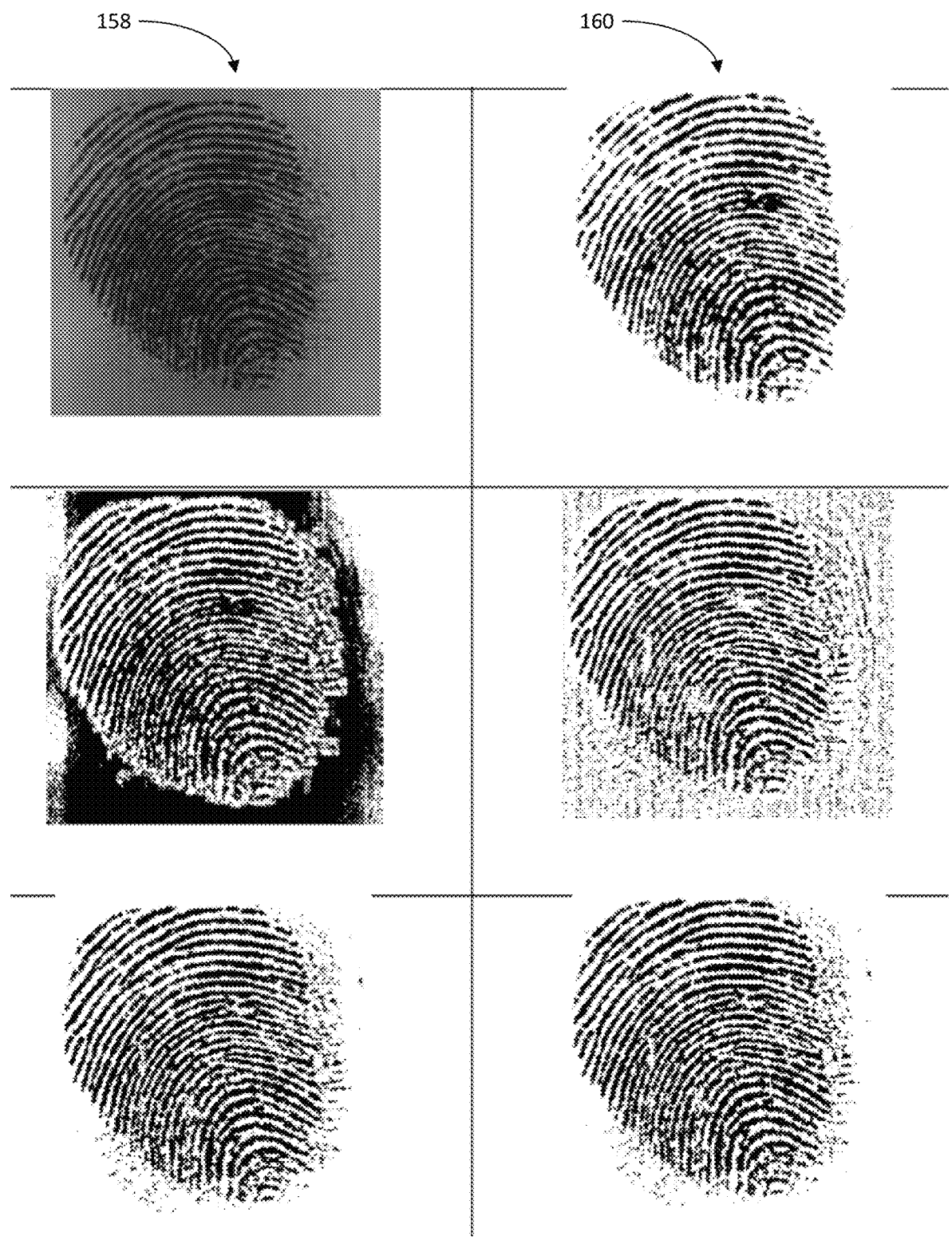
FIG. 11C is another diagram comparing input fingerprint images and proposed binarizations using various methods, according to an embodiment of the present disclosure.

The binarization methods herein may also be used with biological image data. For example, FIGS. 9 and 10 illustrate example binarization methods 50 receiving a footprint image 150 and a palm print image 152 as input, respectively. FIG. 11A illustrates an example binarization method 50 receiving a fingerprint image 154 as input and outputting a binarized image 156. FIG. 11B illustrates additional input fingerprint images 158 and proposed binarizations 160. FIG. 11C illustrates a diagram comparing an input fingerprint image 158 and proposed binarizations 160 using methods of the present disclosure (image B), binarization methods described by Bernsen et al. (image C), binarization methods described by Nilback et al. (image D), binarization methods described by Wolf et al. (image E), and binarization methods described by Sauvola et al. (image F). As shown in FIG. 11C, methods of the present disclosure provide a superior binarized image (image B), compared to previous methods (images C-F), which, in this application, can facilitate better feature detection within the fingerprint and lead to superior matching.

Figure 12:
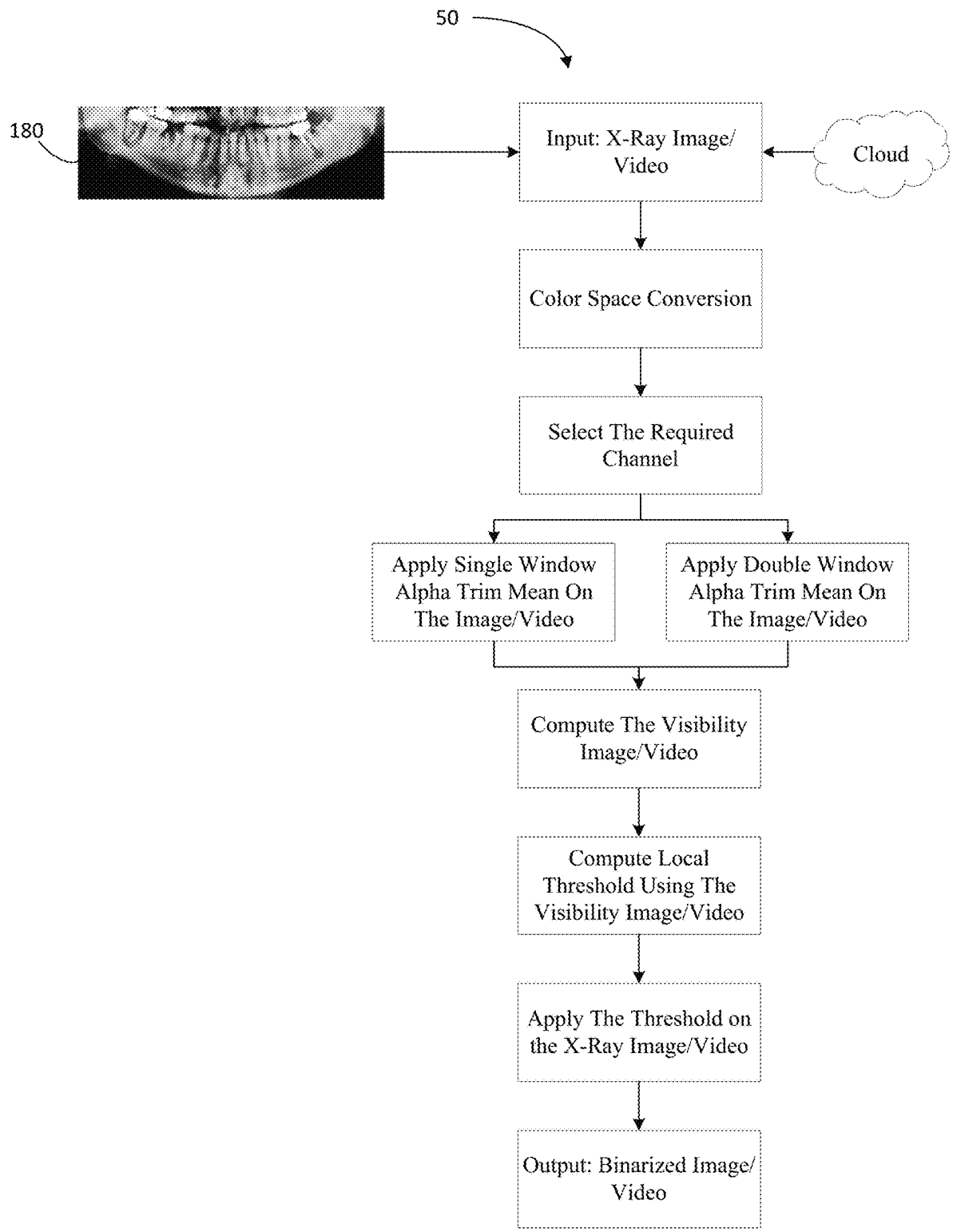
FIG. 12 is a flowchart of an example x-ray image/video binarization, according to an embodiment of the present disclosure.
Figure 13:
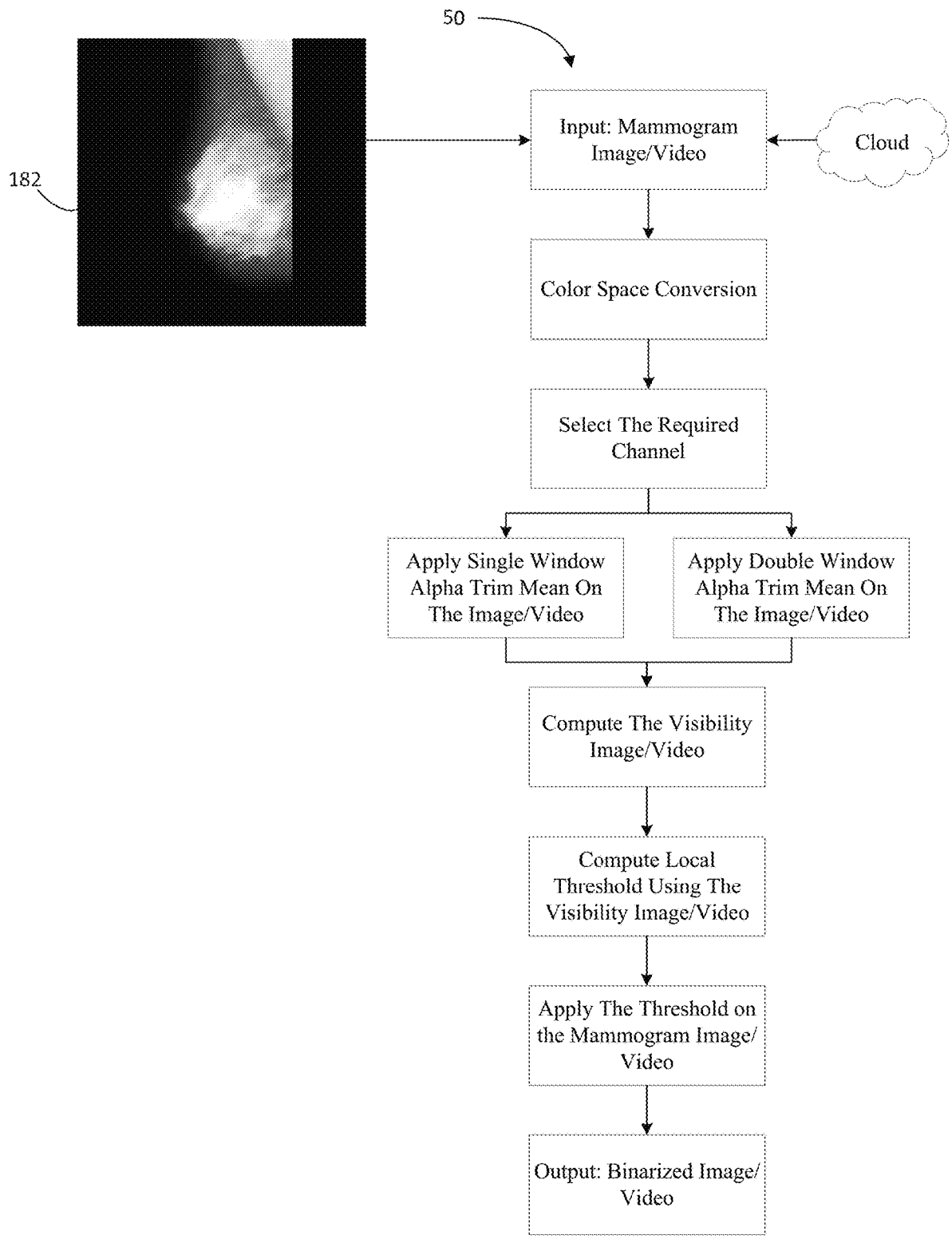
FIG. 13 is a flowchart of an example mammogram image/video binarization, according to an embodiment of the present disclosure.
Figure 14A:
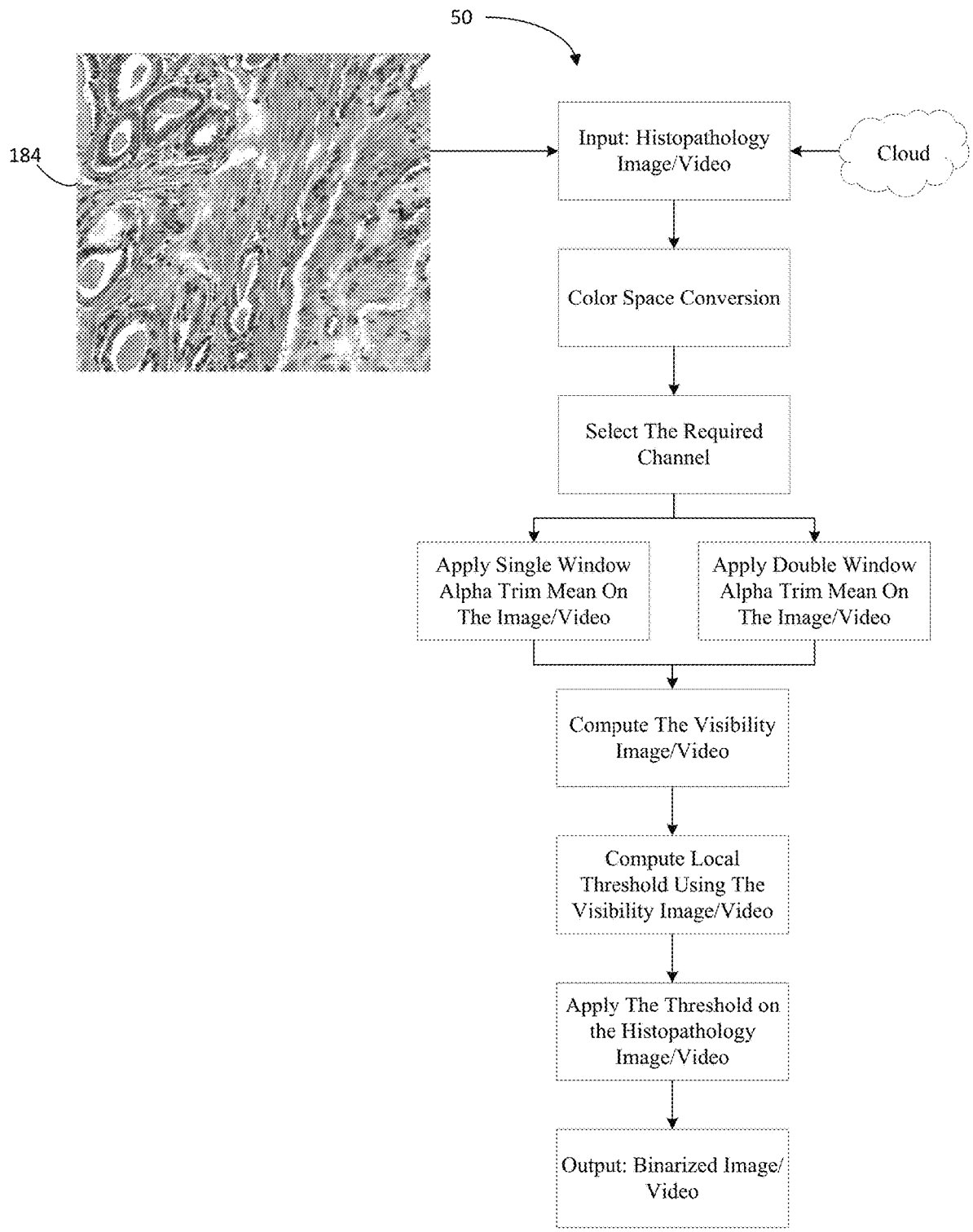
FIG. 14A is a flowchart of an example histopathology image/video binarization, according to an embodiment of the present disclosure.
Figure 14B:
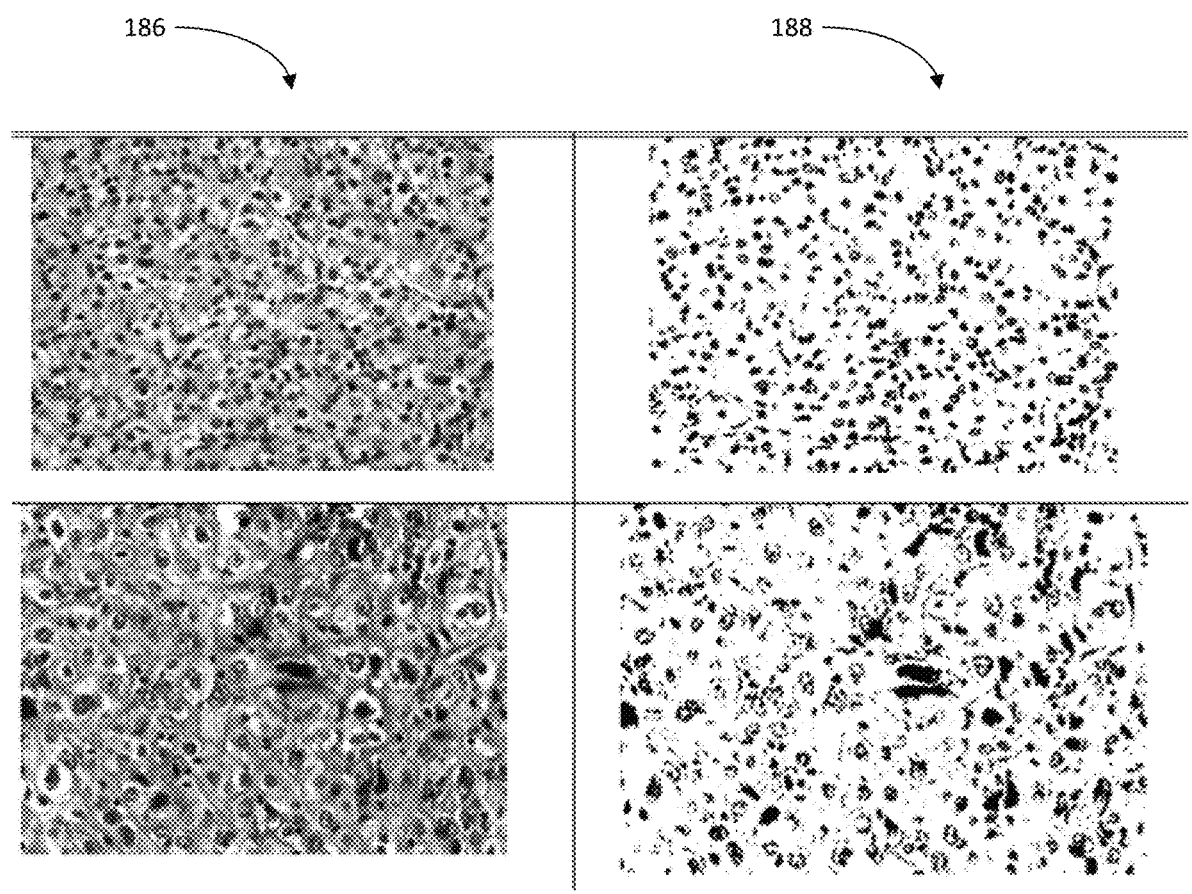
FIG. 14B is a diagram comparing input histopathology images and proposed binarizations, according to an embodiment of the present disclosure.
Figure 15:
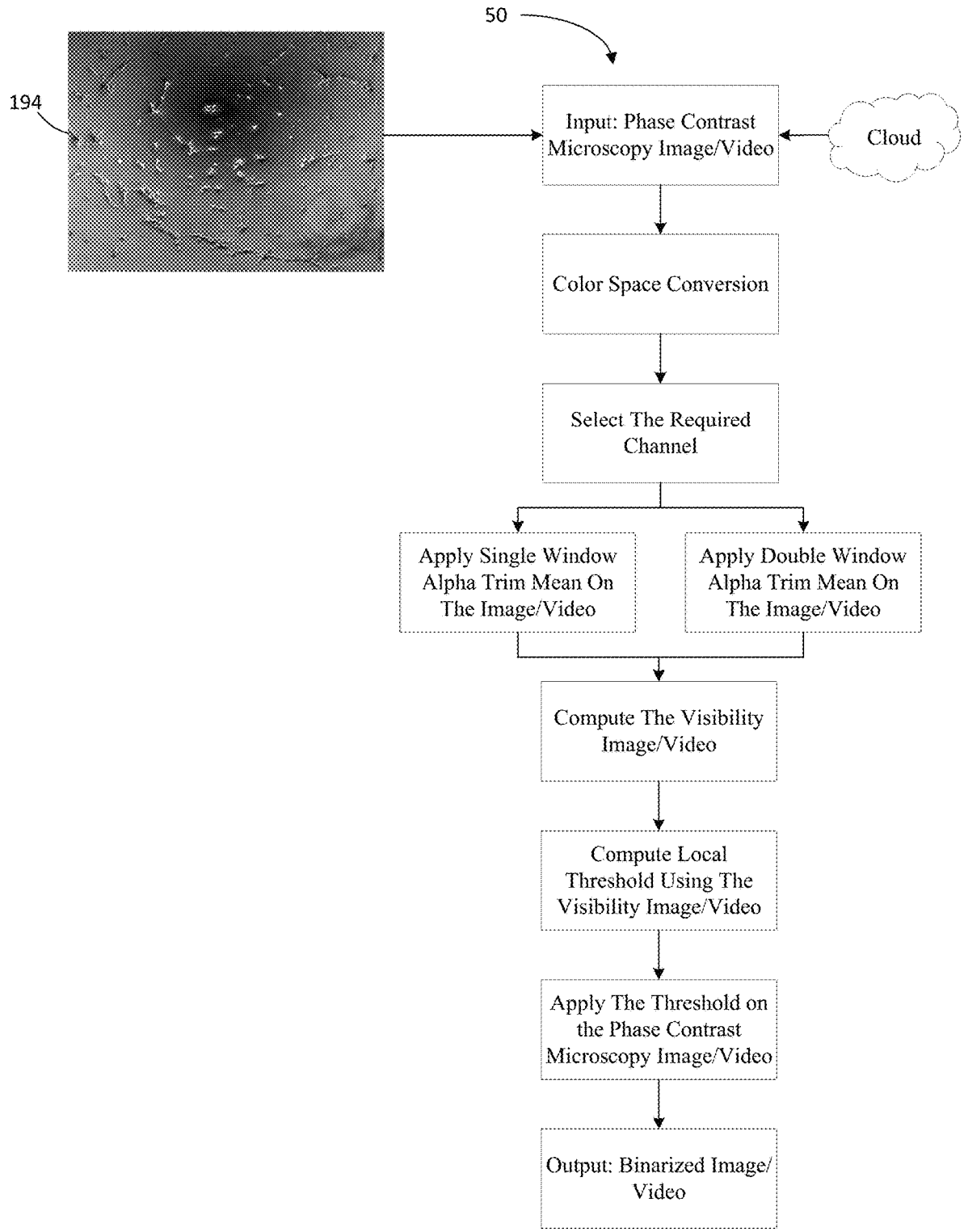
FIG. 15 is a flowchart of an example phase contrast image/video binarization, according to an embodiment of the present disclosure.

Furthermore, with respect to biological image data, FIG. 12 illustrates an example binarization method 50 receiving an x-ray image 180 as input. FIG. 13 illustrates an example binarization method 50 receiving a mammogram image 182 as input. FIG. 14A illustrates an example binarization method 50 receiving a histopathology image 184 as input. FIG. 14B illustrates original histopathology images 186 and output binarized images 188. FIG. 15 illustrates an example binarization method 50 receiving a phase contrast microscopy image 194 as input.

Figure 16A:
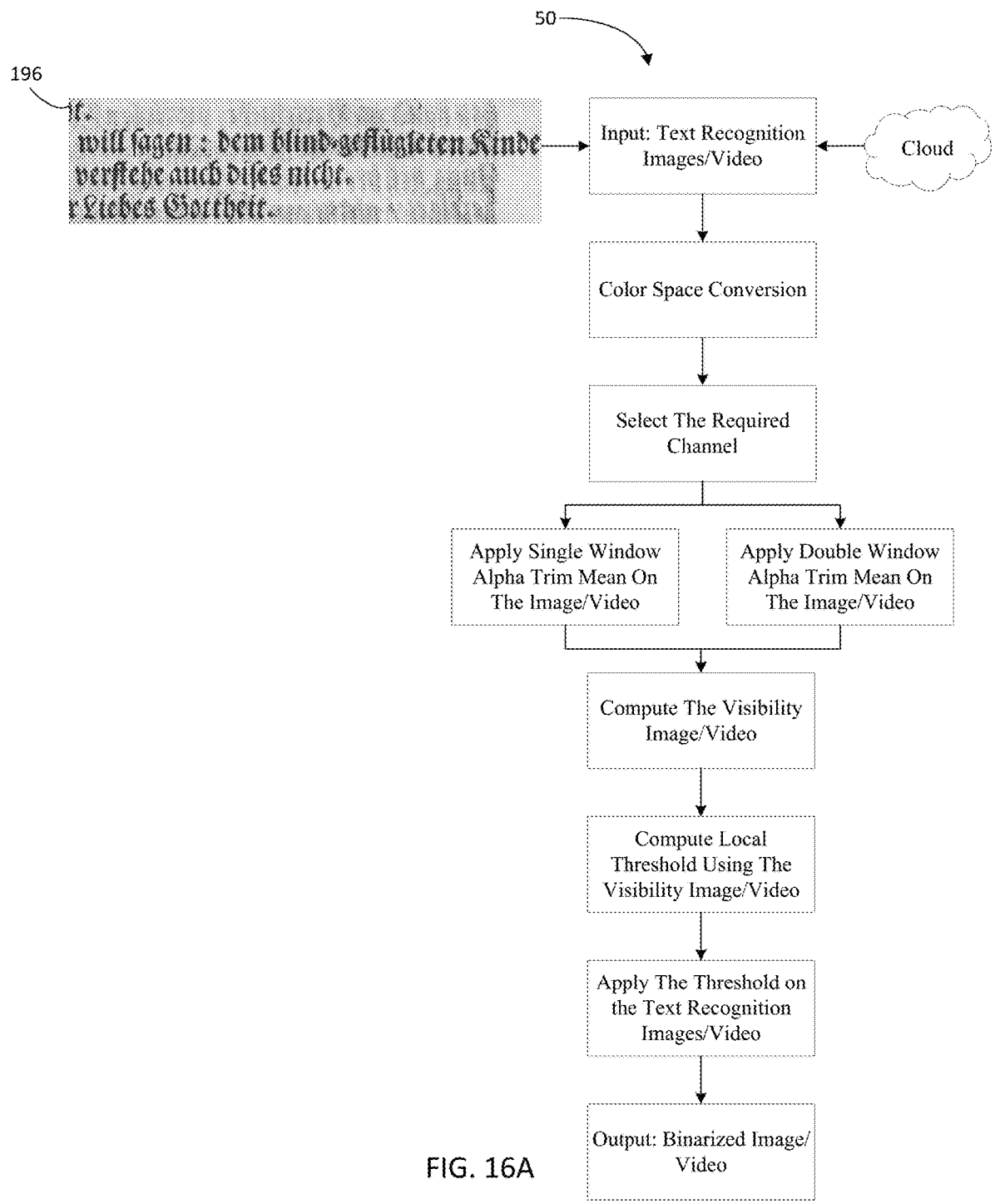
FIG. 16A is a flowchart of an example text recognition image/video binarization, according to an embodiment of the present disclosure.
Figure 16B:
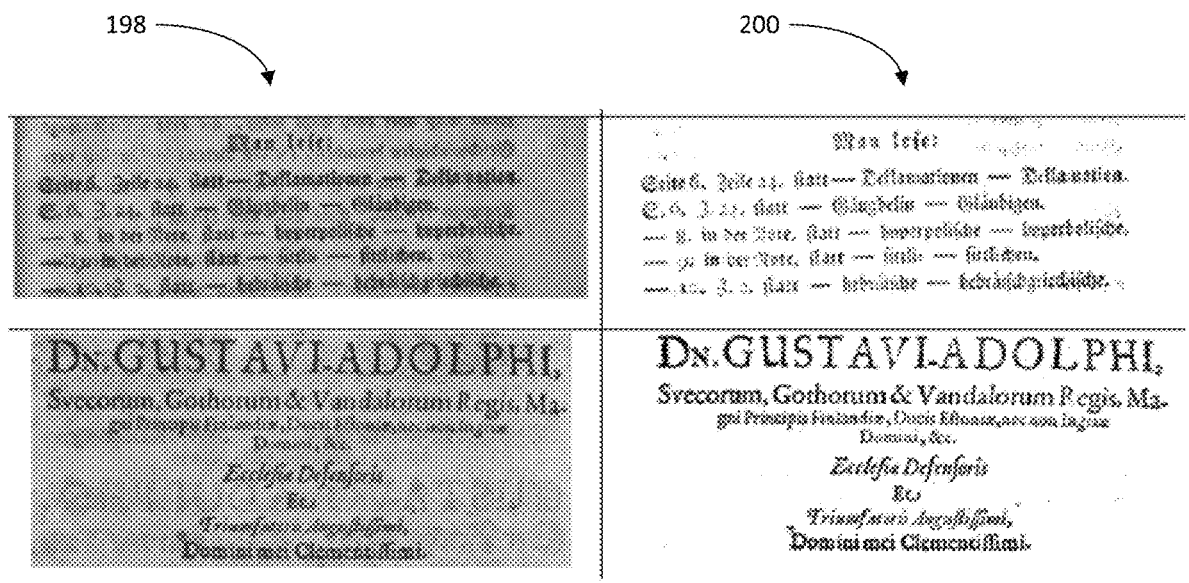
FIG. 16B is a diagram comparing input text recognition images and proposed binarizations, according to an embodiment of the present disclosure.
Figure 17:
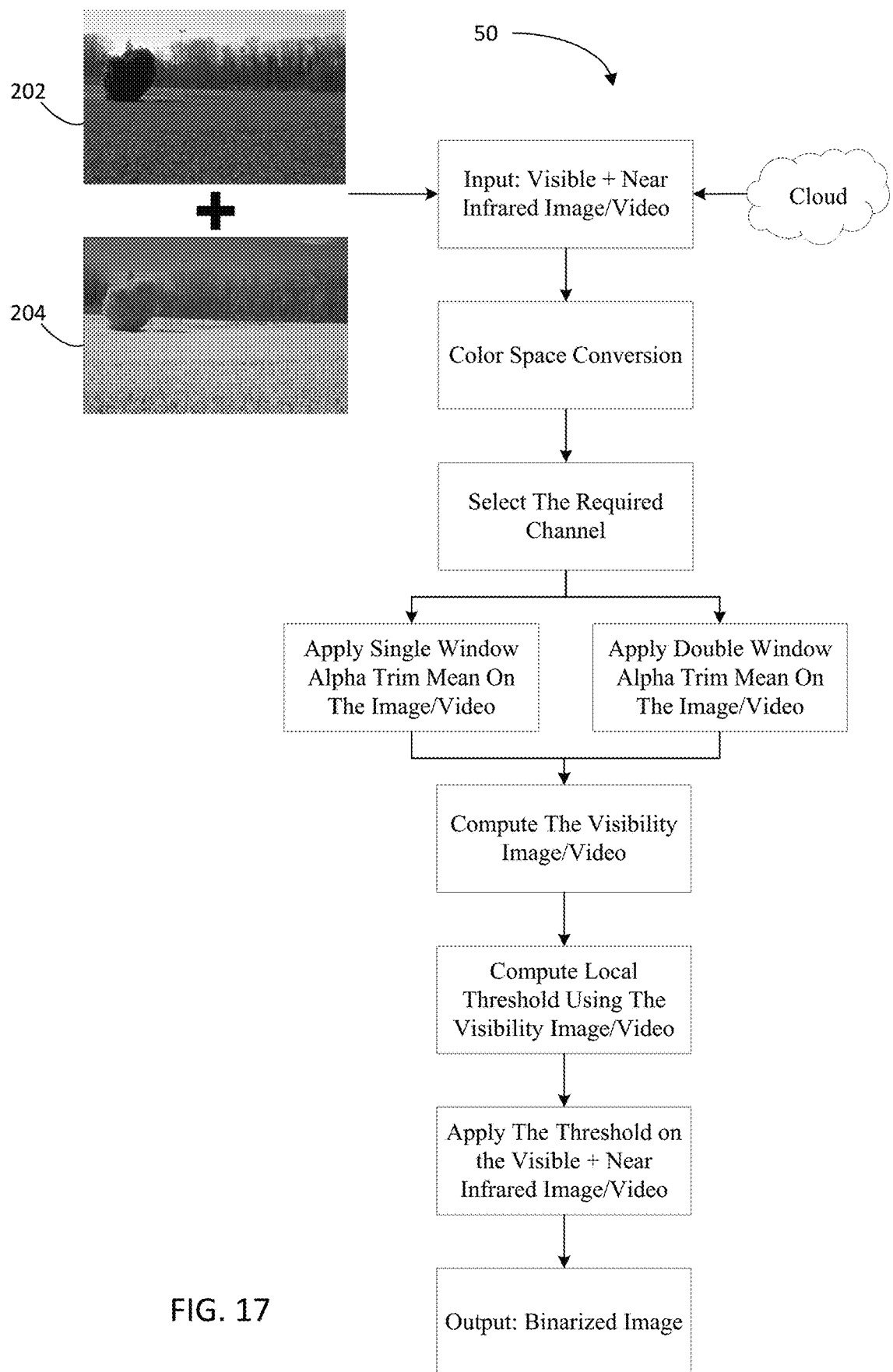
FIG. 17 is a flowchart of an example visible plus near infrared image/video binarization, according to an embodiment of the present disclosure.
Figure 18:
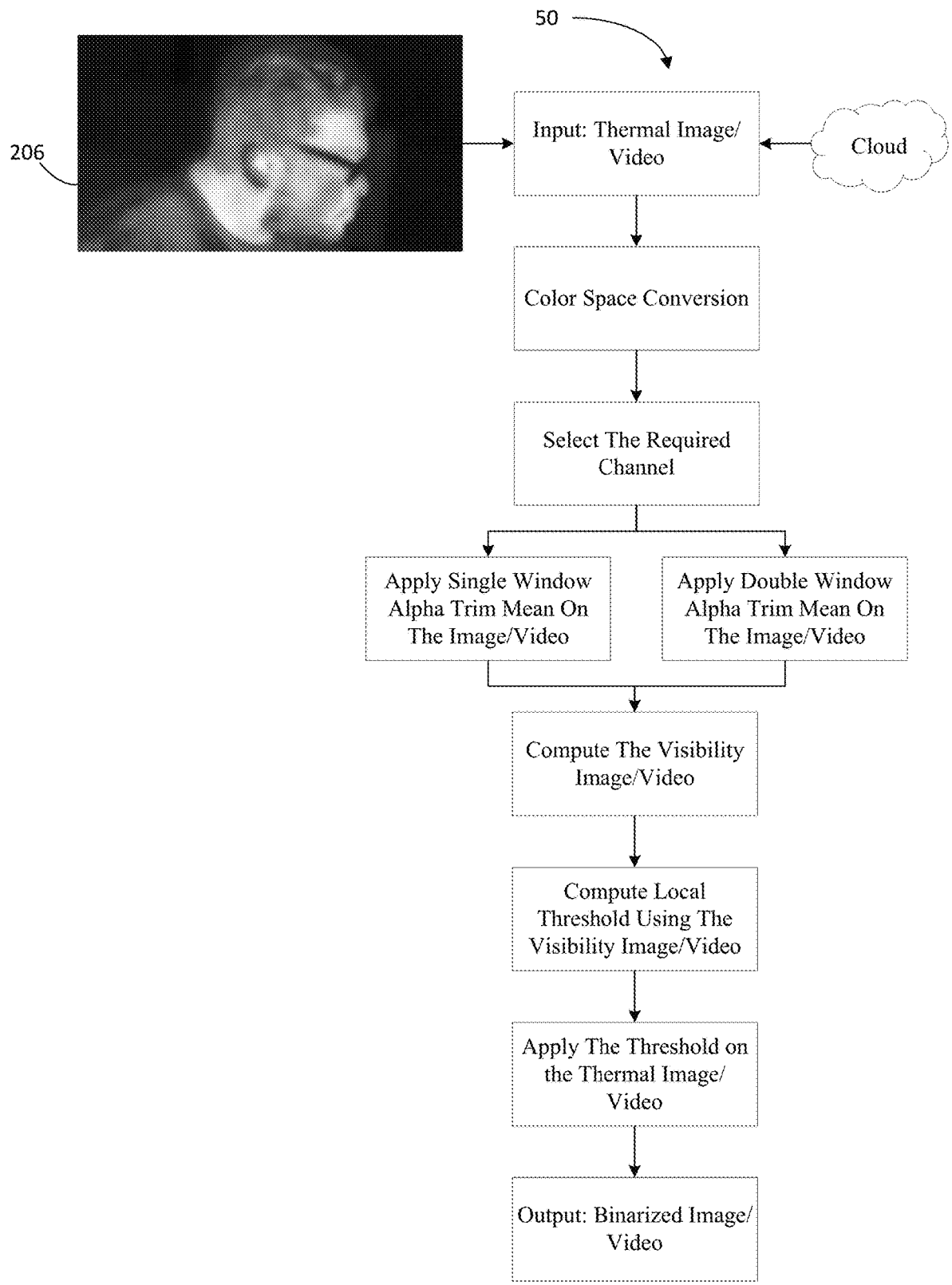
FIG. 18 is a flowchart of an example thermal image/video binarization, according to an embodiment of the present disclosure.

The binarization methods herein may also be used with other types of images. For example, FIG. 16A illustrates an example binarization method 50 receiving a text recognition image 196 as input. By way of example, the image 196 may be obtained from a scanner or other suitable source, and/or may be acquired using the image acquisition methods described herein. FIG. 16B illustrates additional input text recognition images 198 and proposed binarizations 200. Additionally, FIG. 17 illustrates an example binarization method 50 receiving a visible image 202 and a near infrared image 204 as inputs. FIG. 18 illustrates an example binarization method 50 receiving a thermal image 206 as input. It should be noted that any of the above-described examples of FIGS. 6A-18 may equally apply to videos or other types of multimedia content.

Furthermore, in some embodiments, image recoloring may be used to transfer ambience (color) between images by extracting the color information from a reference image and applying it on target images. This technique can be used in various fields after binarization to improve interpretability or perception of information in images. For example, in medical imaging, this technique helps in exposing prominent features required for diagnosis (e.g., by better illustrating tumors or an organ to help medical personnel distinguish pertinent information quickly).

In light of the above, the presented thresholding system of some embodiments may provide an improvement over existing techniques due to: a) removal of short- and long-tailed types of noise due to the usage of single and double alpha window mean; b) segmentation being dependent on the visibility image; c) segmentation being density dependent; and/or d) the present methods applying the concept of a human visual system (HVS).

Figure 19:
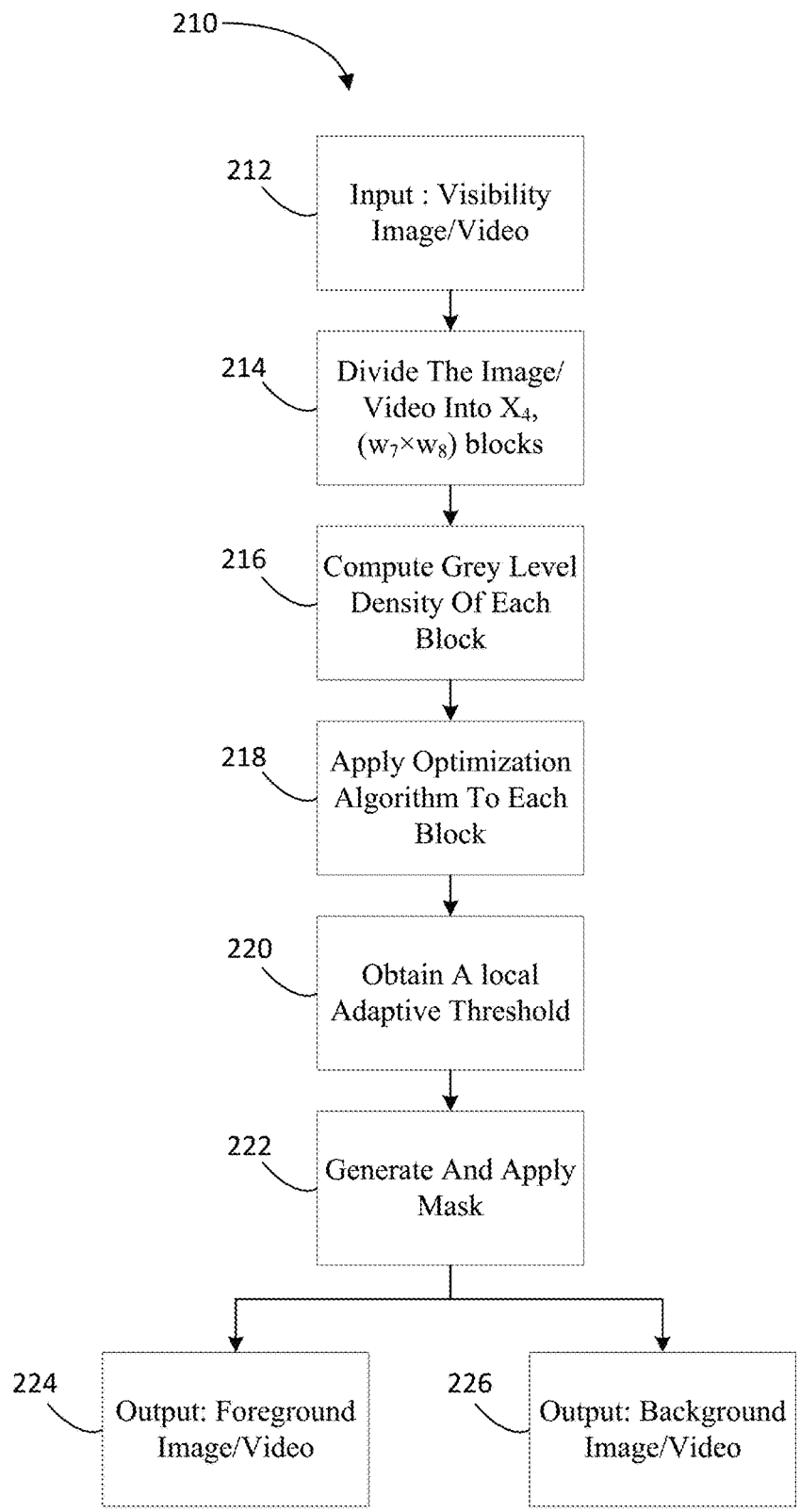
FIG. 19 is a flowchart of a foreground-background image/video segmentation method, according to an embodiment of the present disclosure.

According to some embodiments, the present disclosure includes methods for background/foreground segmentation, which may build on the binarization and thresholding methods described above with respect to FIGS. 3-5. For example, FIG. 19 illustrates a method 210 for image segmentation according to some embodiments. The method 210 can be used with, for example, grayscale, color, thermal, visible and near infrared, or other types of images. Generally, as shown in FIG. 19, the method 210 can include receiving a visibility image, $I_{(x,y)}$, x=1,2,3, ..., X and y=1,2,3, ..., Y, where X and Y are the dimensions of the image, as input (step 212), dividing the image into $\chi_4$ number of blocks, where $\chi_4 = k_7 \times k_8$ and $\chi_4 = 1,2 \ldots N$ (step 214), computing grey level densities of each block (step 216), applying an optimization algorithm to each block (step 218), and obtaining a local visual threshold (which may be considered a local adaptive threshold) (step 220). Using the local adaptive threshold, a mask can be generated and applied to the visibility image (step 222) to output foreground and background images (steps 224 and 226, respectively).

Figure 20A:
FIG. 20A is a diagram comparing input images and proposed foreground/background segmentations, according to an embodiment of the present disclosure.
Figure 20B:
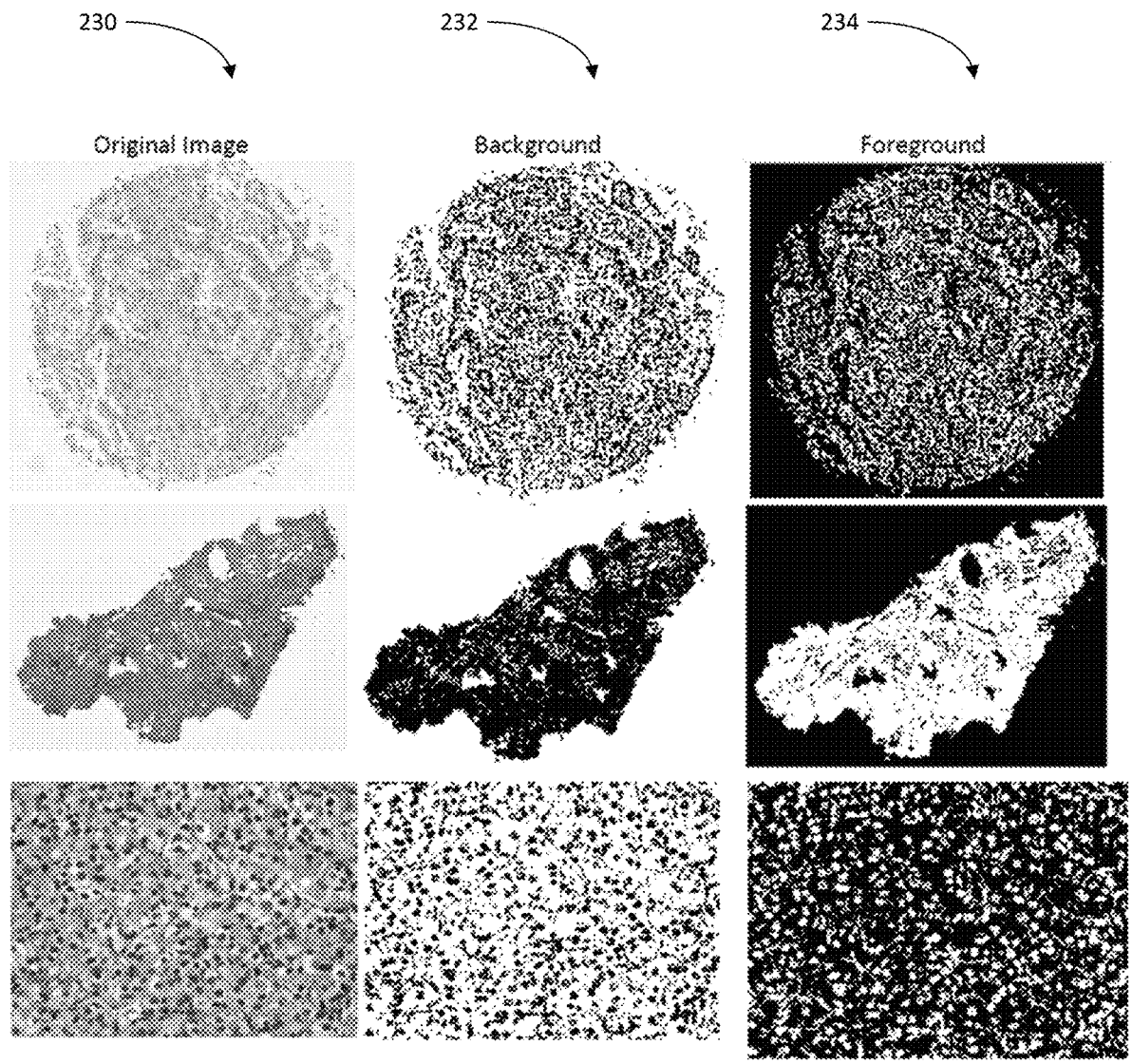
FIG. 20B is another diagram comparing input images and proposed foreground/background segmentations, according to an embodiment of the present disclosure.

More specifically, at step 212, a visibility image is received as input. The visibility image may be computed from an original grayscale or color input image, as described above (e.g., with respect to steps 52-62 of FIG. 3). Upon receiving the visibility image at step 212, steps 214-220 can generally follow steps 102-108 of FIG. 5, as described above. Using the local visual threshold obtained at step 220, a mask may be generated and applied to the original image (at step 222 in order to output a foreground image (at step 224) and a background image (at step 224). By way of example, FIGS. 20A and 20B illustrate sample original images 230 and output background mask content 232 and foreground mask content 234 created using the thresholding method 210 of FIG. 19, where the input images 230 of FIG. 20A are grayscale and the input images 230 of FIG. 20B are color.

According to some embodiments, the present disclosure includes methods for image (or other multimedia content) enhancement. These methods may be based on pixel density of images, may build on the principles described above with respect to the image binarization methods, and can be used with, for example, grayscale, color, thermal, visible and near infrared, or other types of images. Furthermore, these methods may use a global visual threshold.

Figure 21:
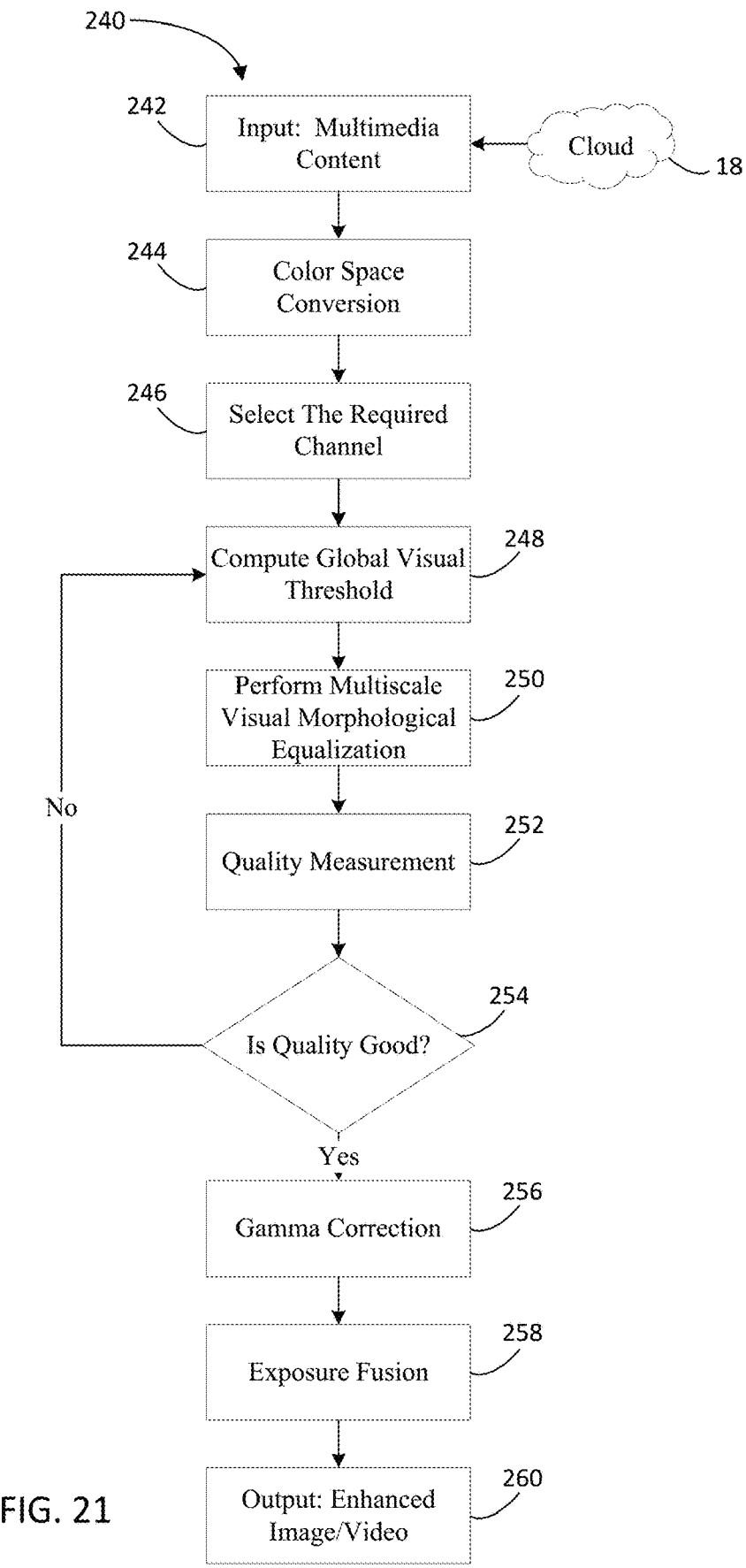
FIG. 21 is a flowchart of an image enhancement method, according to an embodiment of the present disclosure.

For example, FIG. 21 illustrates a method 240 of image enhancement and quality measurement, according to some embodiments. Generally, as shown in FIG. 21, the method 240 can include receiving an image as input (step 242), if needed, applying color space transformation to obtain a grayscale input image (step 244), selecting a required channel from the color space transformation (step 246), and computing a global visual threshold (step 248). The method further includes performing multiscale visual morphological equalization (step 250), measuring quality (step 252) and checking for sufficient quality (step 254). When the quality is insufficient, the method reverts back to step 248 and repeats this loop until quality is sufficient. When quality is sufficient, gamma correction is performed (step 256) and exposure fusion is performed (step 258). An enhanced image is then output at step 260.

More specifically, steps 242-246 may be similar to steps 52-56 as described above with respect to FIG. 3. In some embodiments, the input image received at step 242 may be an original image, or may be an input image already processed via the binarization or segmentation method described above. Once the color space is generated and a channel selected at step 246, a global visual threshold is computed at step 248. The global visual threshold may be similar to the local visual morphological threshold described above; however, local visual threshold techniques compute an optimal threshold with respect to every pixel, whereas global visual threshold techniques obtain an optimal threshold considering an entire image.

For example, considering an image, $I_{(x,y)}$, $x=1,2,3, \ldots, X$ and $y=1,2,3, \ldots, Y$, where X and Y are the dimensions of the image, the entire image can be sorted depending on the pixel density. This can be formulated as shown in Equation 26 below:

$$D_{min} \leq D_2 \leq D_3 \ldots \leq D_{[\hat{T}_1]} \leq \ldots \leq D_{[\hat{T}_2]} \ldots \leq D_{max} \quad \text{Eq. 26}$$

In Equation 26, $D_{min}$, m=min . . . max stands for the probability of density value, which can be defined as: $D_n = r_n \times n$, where n is the $n^{th}$ gray level, and $r_n$ is the total number of times the pixel with intensity level n is repeated in entire image. $\hat{T}$ may be defined as the global visual morphological threshold between visual darkness, $\hat{D}_{Dark}$, and visual brightness, $\hat{D}_{Bright}$, regions. This can be described as shown in Equations 27 and 28 below:

$$\hat{D}_{Dark} = \frac{\sum_{min}^{\hat{T}} D_m}{\sum_{min}^{max} D_m}; \quad \text{Eq. 27}$$

$$\hat{D}_{Bright} = \frac{\sum_{\hat{T}+1}^{max} D_m}{\sum_{min}^{max} D_m}. \quad \text{Eq. 28}$$

Visual morphological thresholding, according to some embodiments, can be defined as the distance between visual darkness and visual brightness components in the entire image. Using this definition, two sets of thresholds can be computed (that is, a two-level threshold). For the first threshold, $\hat{T}_1$, any of the equations provided from Equation 29 to Equation 31 can be selected. For the second threshold, $\hat{T}_2$, any of the equations provided from Equation 32 to Equation 34 can be selected. Generally, the constant $\partial$ is varied continuously until an enhanced image with good quality is achieved.

$$\hat{T}_1 = \text{Argmin}\left\{\left(\partial \frac{\hat{D}_{Dark}}{\hat{D}_{Bright}}\right) \log\left(\partial \frac{\hat{D}_{Dark}}{\hat{D}_{Bright}}\right)\right\}; \quad \text{Eq. 29}$$

$$\hat{T}_1 = \text{Argmin}\left\{(\partial * \hat{D}_{Dark} * \hat{D}_{Bright}) \log\left(\partial \frac{\hat{D}_{Dark}}{\hat{D}_{Bright}}\right)\right\}; \quad \text{Eq. 30}$$

$$\hat{T}_1 = \text{Eq. 31}$$
$$\text{Argmin}\left\{\left(\partial \frac{\hat{D}_{Dark}}{\hat{D}_{Bright}}\right) \log\left(\partial \frac{\hat{D}_{Dark}}{\hat{D}_{Bright}}\right) \oplus \left(\partial \frac{\hat{D}_{Bright}}{\hat{D}_{Dark}}\right) \log\left(\partial \frac{\hat{D}_{Bright}}{\hat{D}_{Dark}}\right)\right\};$$

$$\hat{T}_2 = \text{Argmax}\left\{\left(\partial \frac{\hat{D}_{Dark}}{\hat{D}_{Bright}}\right) \log\left(\partial \frac{\hat{D}_{Dark}}{\hat{D}_{Bright}}\right)\right\}; \quad \text{Eq. 32}$$

$$\hat{T}_2 = \text{Argmax}\left\{(\partial * \hat{D}_{Dark} * \hat{D}_{Bright}) \log\left(\partial \frac{\hat{D}_{Dark}}{\hat{D}_{Bright}}\right)\right\}; \quad \text{Eq. 33}$$

$$\hat{T}_2 = \text{Eq. 34}$$
$$\text{Argmax}\left\{\left(\partial \frac{\hat{D}_{Dark}}{\hat{D}_{Bright}}\right) \log\left(\partial \frac{\hat{D}_{Dark}}{\hat{D}_{Bright}}\right) \oplus \left(\partial \frac{\hat{D}_{Bright}}{\hat{D}_{Dark}}\right) \log\left(\partial \frac{\hat{D}_{Bright}}{\hat{D}_{Dark}}\right)\right\}.$$

According to another global thresholding method of some embodiments, considering an image, $I_{(x,y)}$, $x=1,2,3, \ldots, X$ and $y=1,2,3, \ldots, Y$, where X and Y are the dimensions of the image, for each intensity level in $I_{(x,y)}$, its occurrence probability may be found using Equation 35 below, where N is the total number of pixels in the image.

$$p_i = \frac{I_i}{N} p_i > 0; \quad \sum_{i=min}^{max} p_i = 1. \quad \text{Eq. 35}$$

Letting the threshold be $\hat{T}$, the cumulative probability of pixels in section 1 (i=min, . . . , $\hat{T}$) may be found as $w_1$, and the cumulative probability of pixels in section 2 (i=$\hat{T}$+1, . . . , max) may be found as $w_2$. This is illustrated below in Equation 36:

$$w_1 = \sum_{i=min}^{\hat{T}} p_i; \quad w_2 = \sum_{i=\hat{T}+1}^{max} p_i. \quad \text{Eq. 36}$$

The mean intensity values for both sections can be individually calculated, as well as the total mean, using Equation 37:

$$\mu_1 = \sum_{i=\min}^{\hat{T}} \frac{ip_i}{w_1}; \quad \mu_2 = \sum_{i=\hat{T}+1}^{\max} \frac{ip_i}{w_1}; \quad \mu_T = \sum_{i=\min}^{\max} ip_i. \quad \text{Eq. 37}$$

The variance can then be computed using Equation 38:

$$\sigma^2 = w_1 \left(\frac{\mu_1}{\mu_T}\right)^2 + w_2 \left(\frac{\mu_2}{\mu_T}\right)^2. \quad \text{Eq. 38}$$

Two optimal thresholds, $\hat{T}_1$ and $\hat{T}_2$, may then be obtained by minimizing (via Equation 39) and maximizing (via Equation 40) the variances, respectively.

$$\hat{T}_1 = \text{Arg min}\{\sigma^2\} \quad \text{Eq. 39;}$$

$$\hat{T}_2 = \text{Arg max}\{\sigma^2\} \quad \text{Eq. 40.}$$

Referring back to FIG. 21, at step 250, Visual Morphological Equalization (VME) is performed. To perform VME, the above thresholds can be used to subdivide the image into, for example, three subsections. Notably, due to the multiple thresholds used, this may be considered multiscale VME. These subsections $S_i$ (where i=1, 2,3) are defined below in Equation 41, Equation 42, and Equation 43, respectively.

$$S_1 = \min(I(x,y)) \le I(x,y) \le \hat{T}_1 \quad \text{Eq. 41;}$$

$$S_2 = \hat{T}_1 < I(x,y) \le \hat{T}_2 \quad \text{Eq. 42;}$$

$$S_3 = \hat{T}_2 < I(x,y) \le \max(I(x,y)) \quad \text{Eq. 43.}$$

These subsections can be considered to be in a range of $[R_{min}, R_{max}]$, and can be transformed using a Histogram Equalization (HE), which may be defined below in Equation 44. This maps the range from $[R_{min}, R_{max}]$ to $[\hat{R}_{min}, \hat{R}_{max}]$.

$$HE(s_i) = R_{min;i} + [R_{max;i} - R_{min;i}]c(s_i) \quad \text{Eq. 44}$$

In Equation 44, $c(s_i)$ is defined as the cumulative distribution function (CDF) of each subsection. The CDF for each subsection can be implemented, for example, as described in Roopaei, Mehdi, et al, "Cross-entropy histogram equalization," Systems, Man and Cybernetics (SMC), 2014 IEEE International Conference, IEEE (2014). More specifically, the CDF may be formulated as shown in Equation 45 to Equation 47:

$$c(s_i) = \sum_{R_{ii} \le s_i} p(S_i = R_{ii}); \quad \text{Eq. 45}$$

$$c(s_i) = \sum_{R_{ii} \le s_i} p_{max} \cdot \left(\frac{(S_i = R_{ii}) - p_{max}}{p_{max} - p_{min}}\right)^\delta; \quad \text{Eq. 46}$$

$$c(s_i) = 0.5 p(S_i = s_i) \sum_{R_{ii} \le s_i} p(S_i = R_{ii}). \quad \text{Eq. 47}$$

Once the image is equalized using the above technique, the image may be considered the Visual Morphological Enhanced Image (VMEI) (or Visual Morphological Enhanced Video (VMEV)). Additionally, in some embodiments, the above process can also be computed using the procedure described in Panetta, Karen, et al, "Parameterized logarithmic framework for image enhancement," IEEE Transactions on Systems, Man, and Cybernetics, Part B (Cybernetics) 41.2: 460-473 (2011).

Figure 22:
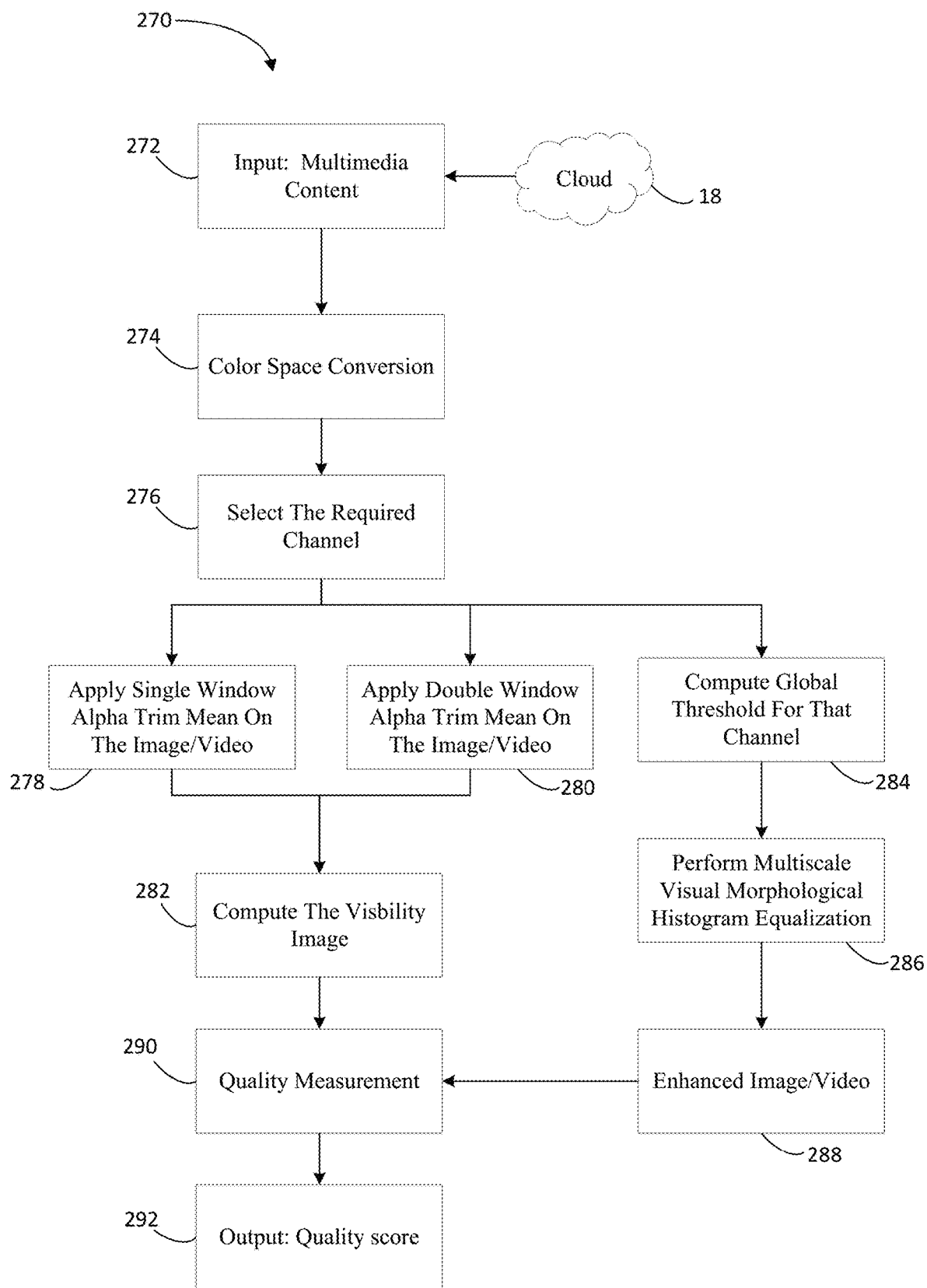
FIG. 22 is a flowchart of a quality measurement method, for example, for use with the image/video enhancement method of FIG. 21, according to an embodiment of the present disclosure.

At step 252, a quality measurement may be performed, for example, using a method 270 as illustrated in FIG. 22. Once the VME is performed, computing the quality of the image is an important task in certain applications. The quality measurement technique illustrated in FIG. 22 may be considered a partial reference quality analysis. As shown in FIG. 22, the method 270 generally includes receiving an original image as input (step 272), if needed, applying color space transformation to obtain a grayscale input image (step 274), selecting a required channel (step 276) and applying a single window α-trim mean (step 278) and double window α-trim mean (step 280) to compute a visibility image (step 280). The method 270 also includes computing a global visual threshold (step 284) and performing multiscale visual morphological equalization (step 286) to obtain an enhanced image, that is, a VMEI (step 288). Using the visibility image and the VMEI, quality measurement is performed (step 290) and a quality score is output at step 292.

More specifically, in order to calculate a visibility image, steps 272-282 can be similar to those steps 52-62 described above with respect to FIG. 3. Furthermore, in order to create the VMEI, steps 284-286 can be similar to those steps 248-250 described above with respect to FIG. 21. At step 290, the means of the images are used to determine a quality score, $Q_{score}$. This can be formulated as shown in Equation 48 or Equation 49, where $M_{org}$ is the mean intensity of the original image, $M_{VI}$ is the mean intensity of the visual image, and $M_{VMEI}$ is the mean intensity of the visual morphological enhanced image. The quality score is then output at step 292.

$$Q_{score} = M_{VI} \times \left(\frac{M_{org}}{M_{VMEI}}\right); \quad \text{Eq. 48}$$

$$Q_{score} = M_{VI} \times \left(\frac{M_{VMEI}}{M_{org}}\right). \quad \text{Eq. 49}$$

In some embodiments, the $Q_{score}$ can be calculated using other techniques such as, but not limited to, those described in Panetta, Karen, Arash Samani, and Sos Agaian, "Choosing the optimal spatial domain measure of enhancement for mammogram images," Journal of Biomedical Imaging 2014, 3 (2014); and Agaian, Sos, and Mehdi Roopaei, "Method and systems for thermal image/video measurements and processing," U.S. patent application Ser. No. 14/533,061.

Referring back to FIG. 21, the $Q_{score}$ assists in selecting a highly enhanced image. As such, steps 248-252 can be repeated until the best enhanced $Q_{score}$ is received, as determined at step 254. That is, steps 248-252 can be repeated until the $Q_{score}$ is above a threshold value. In some embodiments, this threshold value may be selected based on a specific application. Accordingly, when the best enhanced $Q_{score}$ is received, the method 240 continues to step 256 using the best enhanced image.

In some cases, the best enhanced image may be very bright or dark. Thus, a gamma correction technique can be applied to provide sufficient visibly at step 256. An example gamma correction technique is illustrated below in Equation 50:

$$I_{GC}(x,y) = (VMEI)^{\gamma 3} \quad \text{Eq. 50.}$$

The gamma corrected image $I_{GC}$ can then be fused with the original image at step 258. In some embodiments, fusion can be accomplished using one of the following methods:

Nercessian, Shahan C., Karen A. Panetta, and Sos S. Agaian, "Multiresolution Decomposition Schemes Using the Parameterized Logarithmic Image Processing Model with Application to Image Fusion," EURASIP Journal on Advances in Signal Processing, 2011.1:515084 (2011); Paul, Sujoy, Ioana S. Sevcenco, and Panajotis Agathoklis, "Multi-Exposure and Multi-Focus Image Fusion in Gradient Domain," Journal of Circuits, Systems and Computers, 25.10:1650123 (2016); Nercessian, Shahan C., Karen A. Panetta, and Sos S. Agaian, "Multiscale Image Fusion Using an Adaptive Similarity-Based Sensor Weighting Scheme and Human Visual System-Inspired Contrast Measure," Journal of Electronic Imaging, 21.2:021112-1 (2012). However, other fusion methods may also be contemplated in some embodiments.

Figure 23A:
FIG. 23A is a diagram comparing grayscale input images and proposed image enhancements, according to an embodiment of the present disclosure.
Figure 23B:
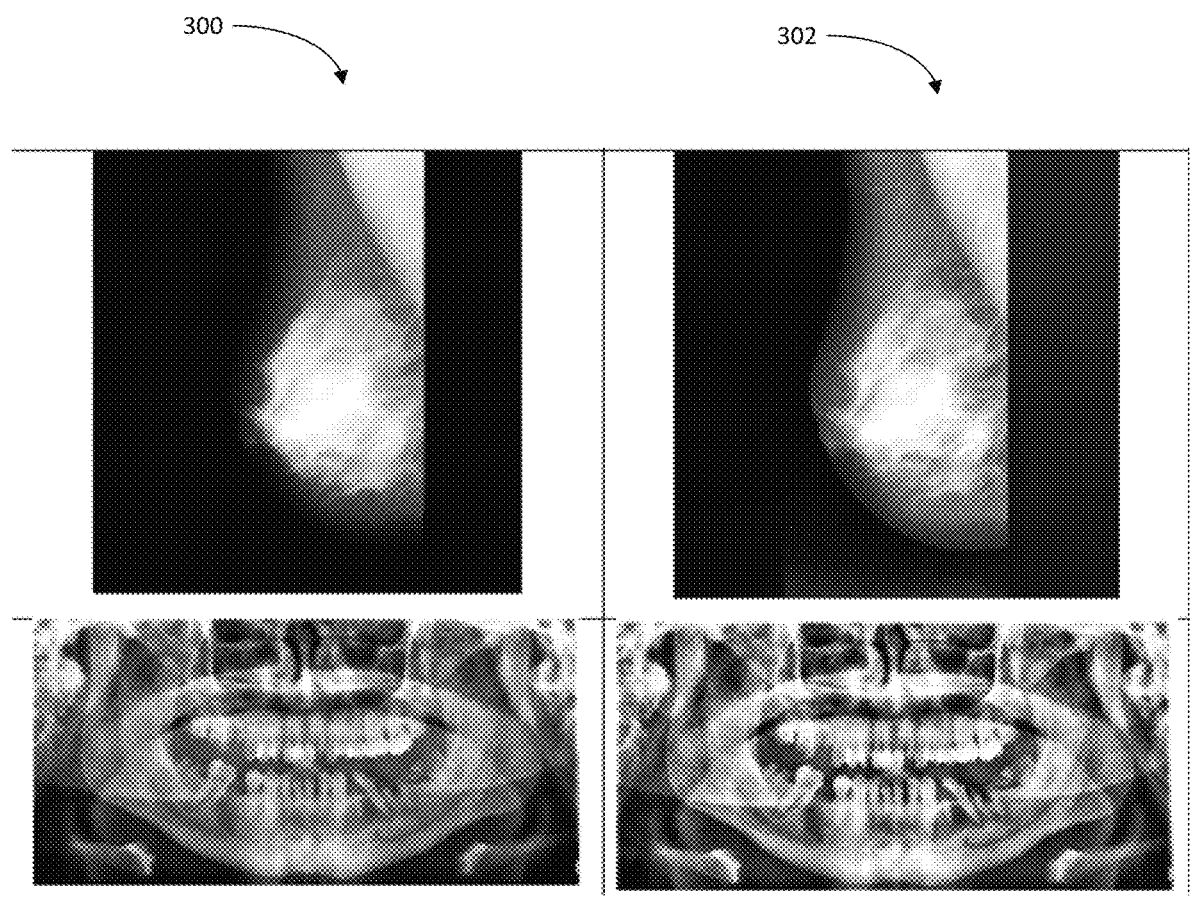
FIG. 23B is another diagram comparing grayscale input images and proposed image enhancements, according to an embodiment of the present disclosure.
Figure 23C:
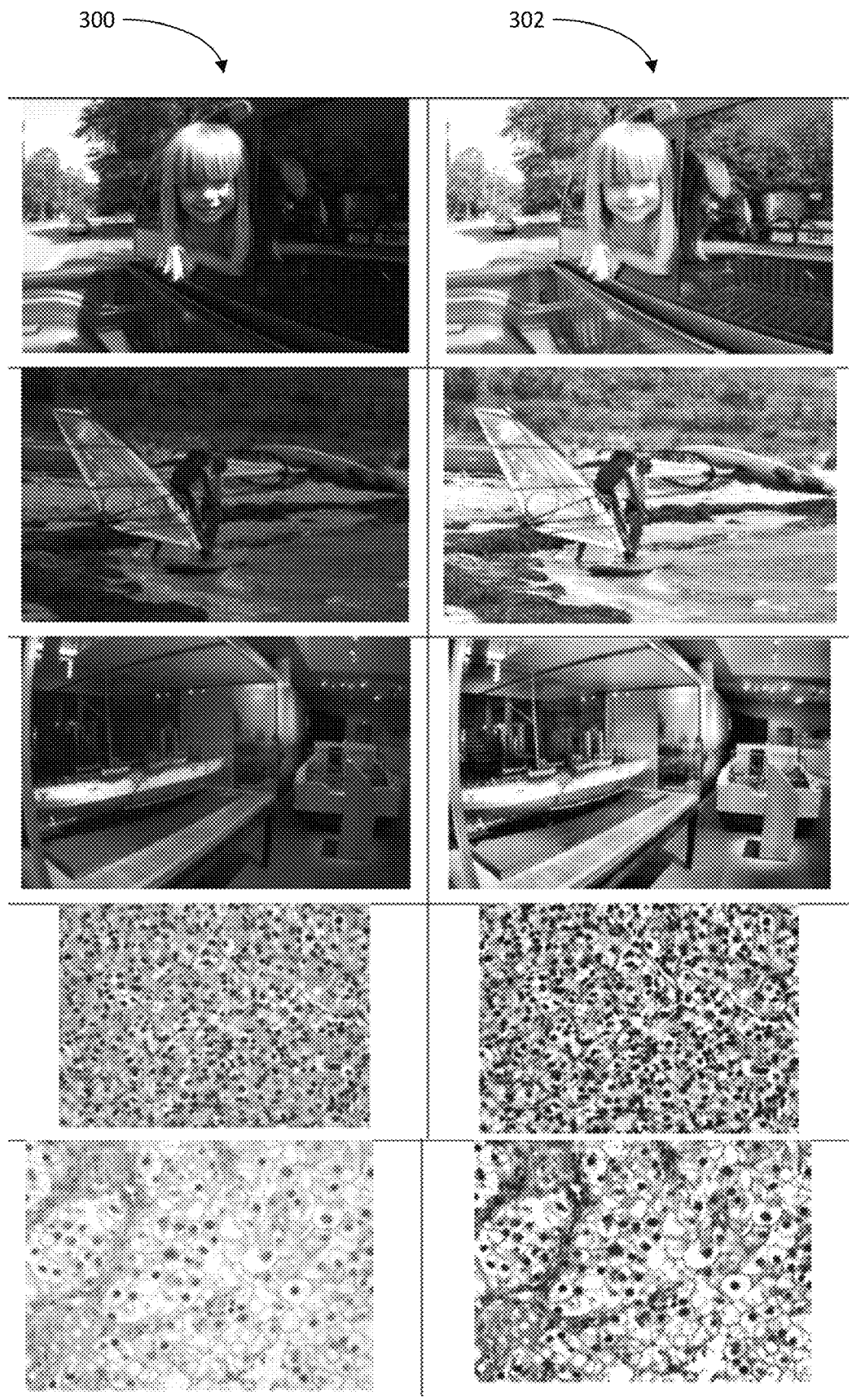
FIG. 23C is a diagram comparing color input images and proposed image enhancements, according to an embodiment of the present disclosure.

Following fusion at step 258, the best enhanced image may be output at step 260. By way of example, FIGS. 23A, 23B, and 23C illustrate sample original images 300 and output proposed enhanced images 302 created using the enhancement method 240 of FIG. 21, where the input images 300 of FIGS. 23A and 23B are grayscale and the input images 300 of FIG. 23C are color. In the illustrated enhanced images 302, brightness, contrast, and/or other features are improved compared to the original inputs 300. Additionally, these enhanced images can be recolored to expose prominent features undetected in the original image. For example, in the mammogram image shown in FIG. 23B, recoloring of the image may help in diagnosing microcalcifications, which may have gone undetected in the original image. Similarly, recoloring of radiograph images in FIG. 23B may help in diagnosing cavities, hairline fractures etc., which may have gone undetected in the original images.

Additionally, the above methods can be used for image classification and/or image brightness and darkness equalization. For example, foreground and background segmentation is dependent on a single threshold. However, the number of thresholds ($\tilde{\eta}$) can be increased depending on the application, and these thresholds can be used to partition images into ($\tilde{\eta}+1$) clusters. These clusters can be classified depending on the information and can be used for various applications. For example, the radiograph image in FIG. 23B can be classified into clusters, which contain only teeth information, jaw information, cavities, etc. Similarly, these thresholds can be used to separate bright regions and dark regions. For example, depending on the application, a particular (dark or bright) region can be chosen and HE or any enhancement techniques can be applied for visualization.

With respect to the biometric authentication methods of the present invention, feature detection and extraction techniques are extensively used in the field of computer vision. These techniques have many applications including, but not limited to, object classification, image matching, image retrieval, etc. The extracted features can be categorized into global and characteristic local features and certain features may be preferable based on the application. For example, for fingerprint matching, detecting local features rather than global features may be preferable as only the foreground image is generally considered, and background information may be irrelevant. Local features in the foreground image may be points, edges, lines or segments specific structures in the image. These features are also known as corner points, key points or feature points.

Various feature detectors have been proposed example detectors are described in the following paragraphs, including a Difference of Gaussian detector, a Hessian detector, a Multiscale Hessian detector, a Hessian Laplace detector, a Harris Laplace detector, and a Multiscale Harris detector. Furthermore, a comparative study of these detectors is provided in Agaian, Sos S. et al, "A Comparative Study of Image Feature Detection and Matching Algorithms for Touchless Fingerprint Systems," Electronic Imaging, 2016.15: 1-9 (2016).

Figure 24:
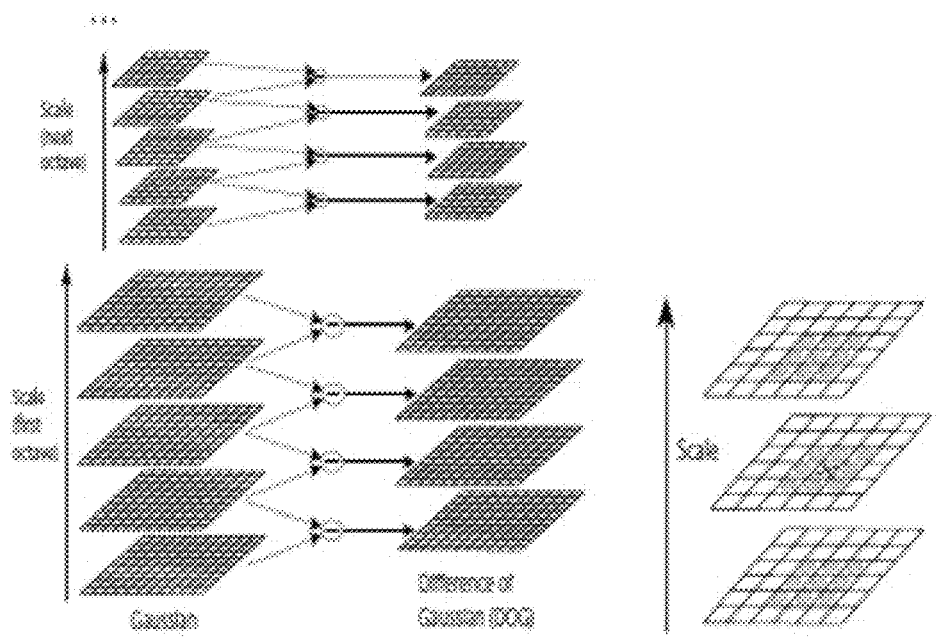
FIG. 24 is a schematic visualization of a Difference of Gaussian detector, according to an embodiment of the present disclosure.

With respect to a Difference of Gaussian (DoG) detector, Lindeberg, (Lindeberg, Tony, "Feature Detection with Automatic Scale Selection," International Journal of Computer Vision, 30.2: 79-116 (1998)) proposed using the local extrema Laplacian-of-Gaussian (LoG) as the point of interest. On this same principle, Lowe proposed a DoG detector, which is a rotation, translation, and scale invariant feature detector. The general process for detection includes detecting extrema in the scale space, i.e., over multiple scales and locations, and selecting key points based on a measure of stability. First, an image scale space is generated by convolving a Gaussian kernel at different scales to the image. Next, the produced scale space is divided into a number of octaves, and each generated octave is again convolved with the Gaussian to create a set of scale space image for that particular octave. The DoG is obtained by subtracting adjacent sub-octave scale spaces and, to proceed to a next octave, the Gaussian image is down-sampled by two. The maxima and minima of DoG in scale space are detected by comparing each point with eight neighbors in the current image and nine neighbors each in the scales above and below. This can be visualized in FIG. 24.

In another example, a PLIP based Hessian detector is used to identify locations in an image that exhibits strong derivatives in two orthogonal directions. The PLIP based Hessian matrix for an image I can be represented as:

$$\hat{H} = \begin{bmatrix} I_{xx}'' & I_{xy}'' \\ I_{yx}'' & I_{yy}'' \end{bmatrix} \qquad \text{Eq. 51}$$

In the above equations, $I_{xx}''$, $I_{yy}''$, and $I_{xy}''$ are the second order derivatives of image intensity obtained using PLIP operations as described in Agaian, S. S., Panetta, K. A., & Nercessian, S. C. (2011). Image fusion using a parameterized logarithmic image processing framework. In Image Fusion. InTech. The extrema of the D measure in a local neighborhood is used for interest point detection. A scale space representation is built by convolving the image with Gaussians of increasing size. For scale invariance, a factor σ2 is multiplied with the Hessian matrix, where σ represents the scale of the image. See, for example, Tuytelaars, Tinne, and Krystian Mikolajczyk, "Local Invariant Feature Detectors: A Survey," Foundations and Trends in Computer Graphics and Vision, 3.3:177-280 (2008).

Additionally, a multi-scale Hessian detector is used to find keypoints when the image dimensions are different. This uses multiple scales to detect the interest points, and the interest points are detected using the eigenvalues of the Hessian.

In another example, a Hessian-Laplace detector was proposed by Mikolajczyk, Krystian, and Cordelia Schmid ("An Affine Invariant Interest Point Detector," Computer Vision—ECCV 2002, 128-142 (2002)). This detector is a scale invariant detector that detects points using blobs in an image. The detector uses the Hessian matrix (see Equation 51, above) to locate points in space and the Laplacian function to compute their scale. The Laplacian function can be expressed as:

$$\text{Laplacian}(x;\sigma_D) = |I_{xx}''(x;\sigma_D) \oplus I_{yy}''(x;\sigma_D)| \qquad \text{Eq. 52}$$

where $I_{xx}''$ and $I_{yy}''$ are the second order derivatives from Equation 51. This detector is invariant to rotation and scale changes.

In yet another example, a Harris Laplace detector was proposed for better discriminative power when compared to DoG operators. This detector combines the specificity for corner-like structures available from a Harris operator with a scale selection mechanism. In this detection process, two separate scales are built for Harris as well as Laplacian functions. Points are selected in such a way that the Harris function localizes the candidate points one each scale and selects points which Laplacian function simultaneously reach extremum over scales. See, for example, K. Grauman and B. Leibe, "Visual object recognition," Synthesis lectures on artificial intelligence and machine learning, 5:1-181 (2011). These detectors are invariant to rotation, scale changes, illumination, and camera noise.

Additionally, in a Multiscale Harris detector, the Harris corner indicator is applied at successive integration scales when the images are of different dimensions. This detector determines many points which repeat in the neighboring scales. In the Harris detector, an auto-correlation matrix is used which ascertains feature detection. In addition to these, other edge detection filters can be employed to obtain the features, such as those described in Gao, Chen, Karen Panetta, and Sos Agaian. "New edge detection algorithms using alpha weighted quadratic filter." Systems, Man, and Cybernetics (SMC), 2011 IEEE International Conference on. IEEE, 2011; and Panetta, Karen, et al. "A new reference-based edge map quality measure." IEEE Transactions on Systems, Man, and Cybernetics: Systems 46.11 (2016): 1505-1517. An edge measure map, such as that described in Panetta, Karen, et al, "Nonreference medical image edge map measure." Journal of Biomedical Imaging 2014 (2014): 2, can be employed with a Log(Harris) detector to detect keypoints. Further, this can be applied on multi scales to detect keypoints which have unique features and can be used for matching purposes.

In sum, the types of features detected and their invariance to different transforming entities for the above-described detectors are provided in Table 1 below.

TABLE 1

Characteristics of Feature Detectors

| Feature Detector (FD) Type | Feature Detected | Rotation Invariant | Scale Invariant |
|---|---|---|---|
| DoG | Corner + Blob | Yes | Yes |
| Hessian | Blob | Yes | No |
| Hessian Laplace | Corner + Blob | Yes | Yes |
| Harris Laplace | Corner + Blob | Yes | Yes |
| Multiscale Hessian | Blob | Yes | No |
| Multi scale Harris | Corner | Yes | No |

Figure 25:
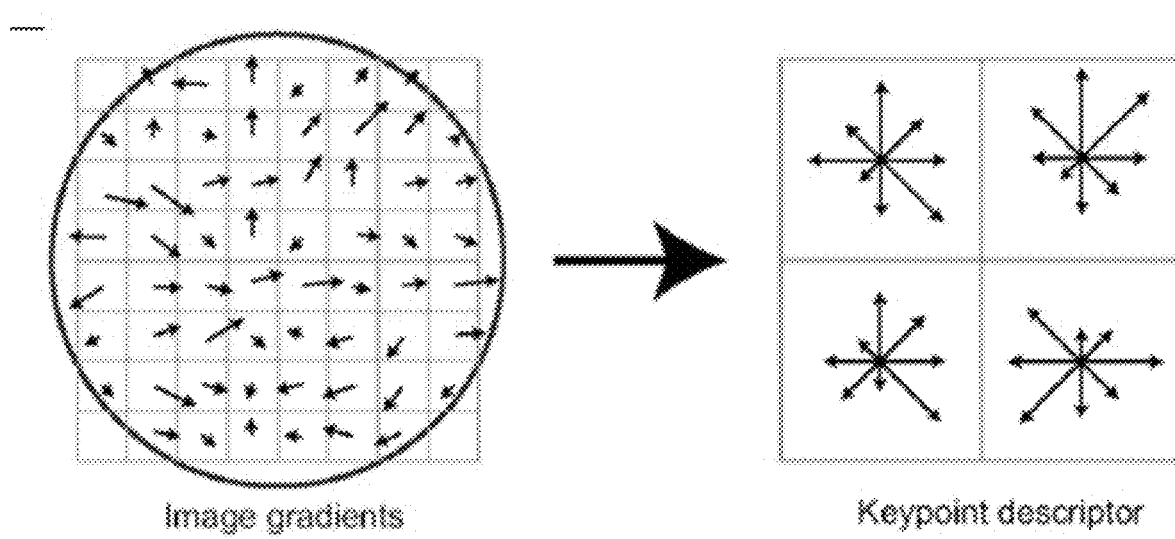
FIG. 25 is a schematic visualization of SIFT image gradient and keypoint descriptors, according to an embodiment of the present disclosure.

In addition to the above-described detectors, a SIFT descriptor is commonly used in the field of computer vision. The SIFT descriptor was first presented by Lowe, David G. "Distinctive Image Features from Scale-Invariant Keypoints," International Journal of Computer Vision, 60.2:91-110 (2004). SIFT uses a combination of Difference of Gaussians (DoG) interest region detector and a corresponding feature descriptor to locate features in the image. This detector can be replaced by different detectors mentioned above, and they deliver good performance. The feature vectors obtained from the detectors are unique, making it invariant to complications such as rotation, translation, and object scaling. In a SIFT descriptor, a localized set of gradient orientation histograms are encoded with image information thereby achieving robustness to lighting variations and minor shifts in the positions. The keypoint descriptors are computed using the data obtained from either DoG or one of the above-mentioned detectors. The image gradient magnitude and orientation is sampled using a 16×16 grid around the keypoint location using the region scale to select the level of Gaussian blur. This sampled region with a proper scale and rotation is further split into 4×4 square grid as shown in FIG. 25. Every cell in this grid contains a histogram with eight orientation bins. Each bin is given weight by the magnitude of the corresponding pixel's gradient and by a circular Gaussian weighting function. See, for example, Grauman, Kristen, and Bastian Leibe, "Visual Object Recognition," Synthesis Lectures on Artificial Intelligence and Machine Learning, 5.2:1-181 (2011).

Figure 26:
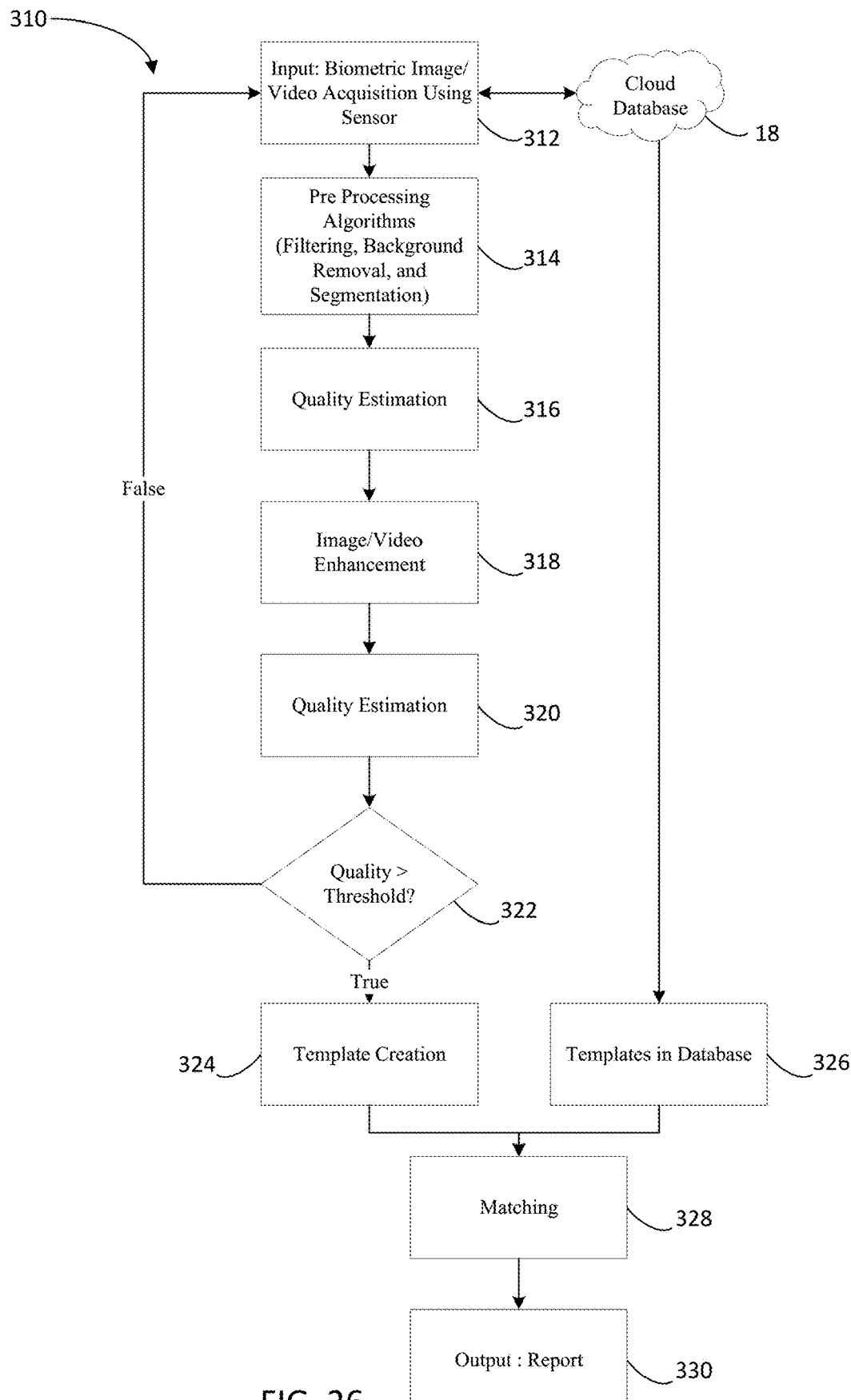
FIG. 26 is a flowchart of a biometric authentication method, according to an embodiment of the present disclosure.

Referring now to FIG. 26, a method 310 for biometric authentication, according to some embodiments, is provided. For example, the method 310 may be used for biometric authentication such as, but not limited to, fingerprint, palm print, footprint, iris, facial, and tongue authentication based on geometric features. The method 310 can be used with, for example, grayscale, color, thermal, visible and near infrared, or other types of biometric images (or other multimedia content) and can build on the principles described above with respect to the binarization, segmentation, enhancement, and quality control methods.

Generally, as shown in FIG. 26, the method 310 can include receiving a biometric image as input (step 312), conducting initial image analytics (step 314), measuring quality (step 316), enhancing the image (step 318), again measuring quality (step 320), and checking for sufficient quality (step 254). When the quality is insufficient, that is, below a threshold, the method reverts back to step 312 and repeats this loop until quality is sufficient. When quality is sufficient (that is, above a threshold), an image template is created (step 324), one or more existing templates are retrieved (step 326), and the image and retrieved templates are matched against each other (step 328). A report from the matching step is then generated and output at step 330.

More specifically, at step 312, a biometric image is retrieved as input. The image may be retrieved from storage (such as a cloud database 18) or may be directly acquired from one or more sensors (e.g., of the system 10 or another suitable system), as described above. At step 314, the image may be pre-processed by performing, for example, the above-described color space conversion, filtering, segmentation and/or background removal (e.g., using the visual morphological operators described above), and/or other initial processing.

At step 316, a first quality estimation of the initially processed image is conducted, for example, via the quality measurement methods described above with respect to FIG. 22. The initially processed image is then enhanced, for example, using the image enhancement methods and visual morphological equalization described above with respect to FIG. 21, and a second quality estimation of the enhanced image is conducted at step 320.

The quality estimations can assist in selecting a highly enhanced image. As such, steps 312-320 may be repeated until the quality estimation at step 320 is above a set threshold, as determined at step 322. More specifically, the initial quality assessment at step 316 can provide an initial quality of the biometric images (e.g., to check if any kind of enhancement required). If required, the image is enhanced, and the quality is estimated again at step 320. If the quality of the image obtained is not satisfactory, then the image is captured again at step 312. In some embodiments, this quality threshold may be stored in memory of a system 10 with processing circuitry 14 configured to execute the steps described herein or accessed from external memory (e.g., cloud storage 18). Once the image quality is above the threshold, an image template is created using the finally enhanced image at step 324.

At step 326, one or more existing templates can be retrieved, for example, from internal or external memory (such as the cloud database 18). The image template can then be matched against the one or more existing templates at step 328. For example, at step 328, the image template and an existing template can be compared in order to authenticate or verify an identity based on the original input image. At step 330, a report or display indicating an output of the matching step can be generated and output, such as, for example, a yes/no or match/no match response, a response including additional details about the matching step with respect to the original image and the retrieved template(s), a visual display of the match and detected features, and/or a visual display of the matched retrieved template (e.g., if multiple retrieved templates were considered during the matching step). Other generated reports or displays may be contemplated within the scope of this disclosure.

Referring back to the matching step 328, first, one or more characteristic local features, also known as keypoints, can be detected using one or more of the feature detectors described herein. Additionally, the SIFT descriptor, as described above, may be used to describe the local image feature points (e.g., depending on their texture). More specifically, in some embodiments, different detectors are employed on both the image template and the retrieved template and the local image points, or keypoints, are described using a common SIFT descriptor. In some embodiments, detected and described keypoints can contain the at least following attributes: 2D location, orientation, scale, and description.

Once all the keypoints are described using SIFT for the image template and the retrieved template, matching is performed. In one embodiment, the best match for each keypoint detected is found by identifying its nearest neighbor in a database of keypoints. For example, consider a keypoint, k1, in image I, and a keypoint, k2, in template T. These two keypoints are successfully matched if the distance between k1 and k2 is significantly smaller than any other keypoint in T. This significant distance is defined by a threshold set during matching. It should be noted that, during SIFT matching, erroneous matching points may increase. Such errors may be eliminated by geometric verification. One example verification technique that uses a RANSAC algorithm is described in Derpanis, Konstantinos G. "Overview of the RANSAC Algorithm." *Image Rochester NY* 4.1: 2-3 (2010). However, other verification techniques may be used in some embodiments.

Figure 27:
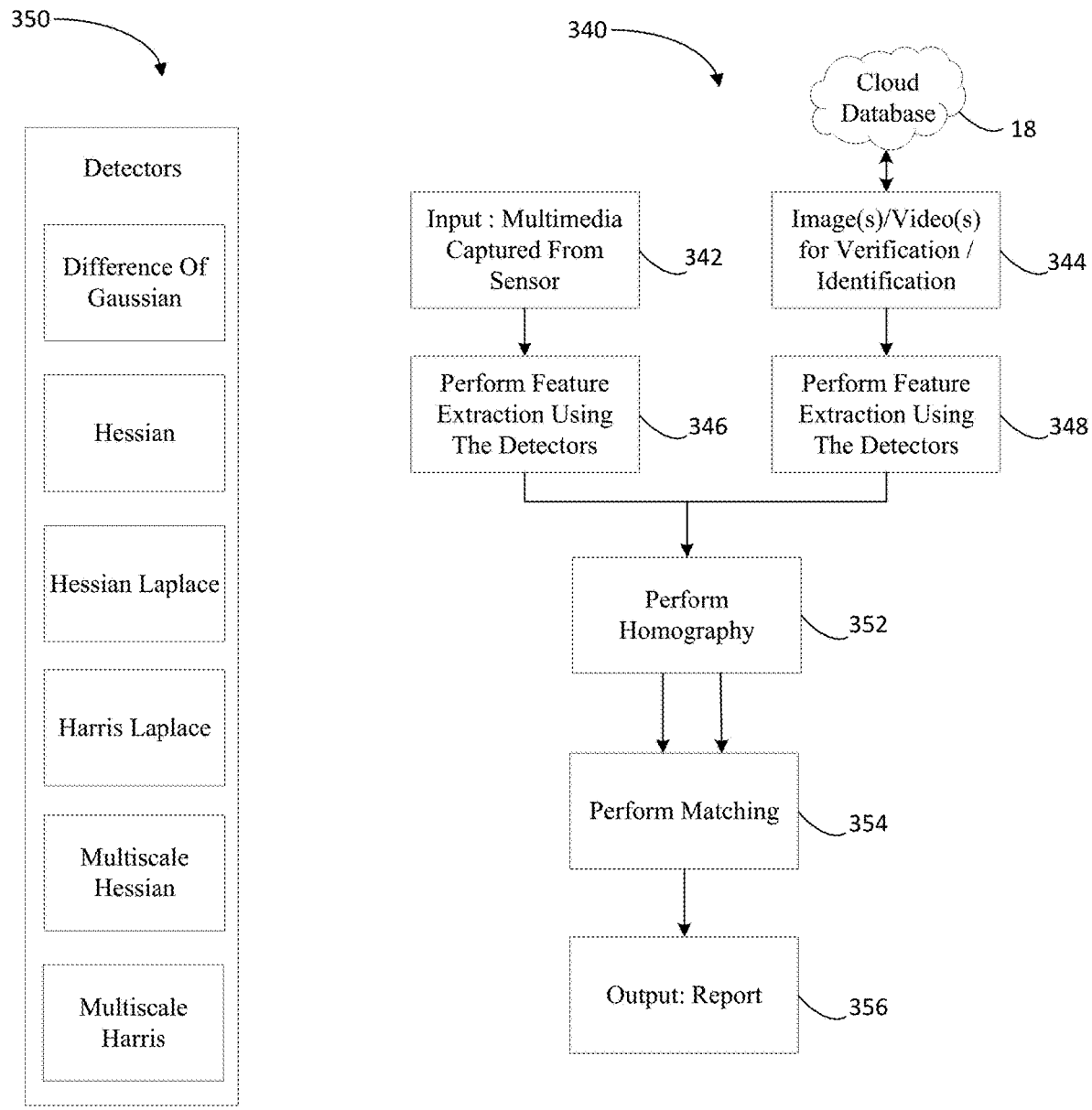
FIG. 27 is a flowchart of a biometric matching method, for example, for use with the biometric authentication method of FIG. 26, according to an embodiment of the present disclosure.

By way of example, FIG. 27 illustrates a matching method 340 according to some embodiments. As shown in FIG. 27, an image template is input at step 342 (such as the image template created at step 324 of FIG. 26). One or more retrieved templates are input at step 344 (such as the retrieved template from step 326 of FIG. 26). At steps 346 and 347, feature extraction is performed for each of the image template and the retrieved templates, respectively, for example, using one or more of the above-described detectors and keypoints are described using SIFT.

At step 352, homography is performed to compile the templates together. For example, a similarity transformation can be calculated using Equation 53 below:

$$\begin{bmatrix} x' \\ y' \end{bmatrix} = sR(\theta)\begin{bmatrix} x \\ y \end{bmatrix} + \begin{bmatrix} t_x \\ t_y \end{bmatrix},$$ Eq. 53 which includes a rotation by $\theta$ an isotropic scaling by s, and a translation by a vector ($t_x$, $t_y$). This transformation is used to map all the SIFT detections in one image to the other and, if a distance between the mapped detections are within a threshold, they may be considered inliers. The count of matched inliers can be checked and the transformation with the highest count of inliers can be chosen.

After applying this algorithm, the inliers are consistent with the transformation and are retained and most mismatches are removed. Furthermore, as described above, once geometric verification is conducted, all the erroneous matches are removed, thereby providing a better matching score (as described below).

At step 354, matching is performed using the geometrically verified image templates. More specifically, a matching score can be used to calculate the difference between two images. In one example, the matching score, MS, can be defined as shown in Equation 54 below:

$$MS = \frac{\text{number of geometrically verified matches}}{\max(NI, NT)}.$$ Eq. 54

According to this definition, NI are the number of keypoints in I and NT are the number of keypoints in T. This equation provides a matching score between 0 and 1, where a score of 1 indicates that I and T are perfect match and a score of 0 indicates that I and T have no matching keypoints.

Once matching is completed, a report of the matching can be output at step 356. This report can include the matching score, a yes/no or match/no match indication (e.g., a matching score above a threshold indicates a match, while a matching score below the threshold indicates no match), or other generated reports or displays. In some embodiments, this report can be used as the output at step 330 of the method 310 of FIG. 26, or can be used to generate the report output at step 330.

In some aspects, matching a complete biometric image with a partial biometric image can cause a bottleneck towards achieving desired system performance. For example, a database or cloud may contain full fingerprint images or complete face images, but during crime scenes, in most cases, only a partial fingerprint may be obtained. Also, in the case of face recognition, a surveillance camera may only provide partial face information. In these cases, image completion using generative adversarial networks (GAN) can be employed, as shown in the generative biometric image completion method 360 of FIG. 28. This network was first introduced by Goodfellow, I., Pouget-Abadie, J Mirza, M., Xu, B., Warde-Farley, D., Ozair, S., Courville, A. & Bengio, Y. "Generative adversarial nets," *Advances in neural information processing systems*, pp. 2672-2680 (2014).

Figure 28:
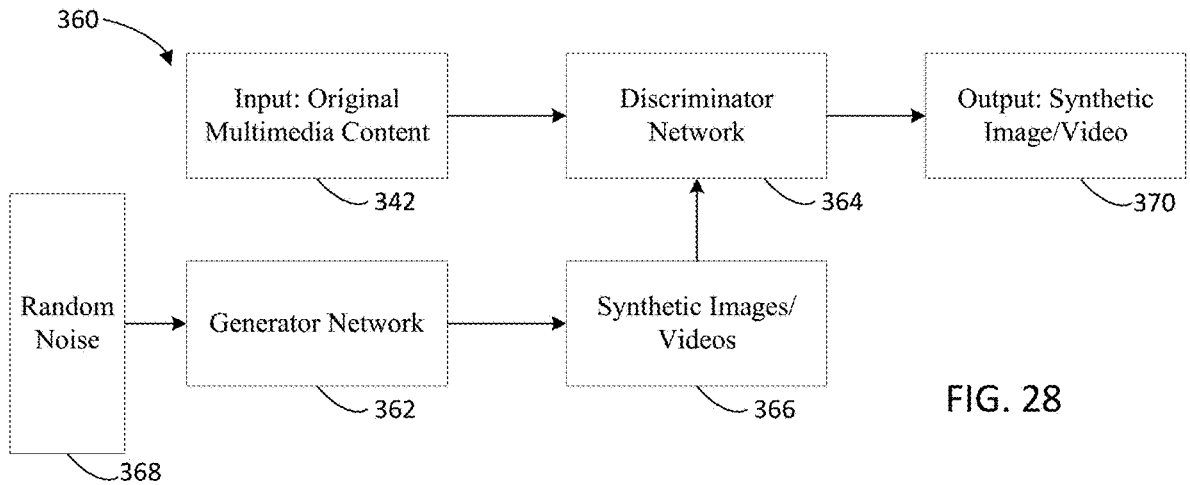
FIG. 28 is a flowchart of a general generative adversarial network used to fill the missing regions in any partial biometric image, according to an embodiment of the present disclosure.
Figure 29:
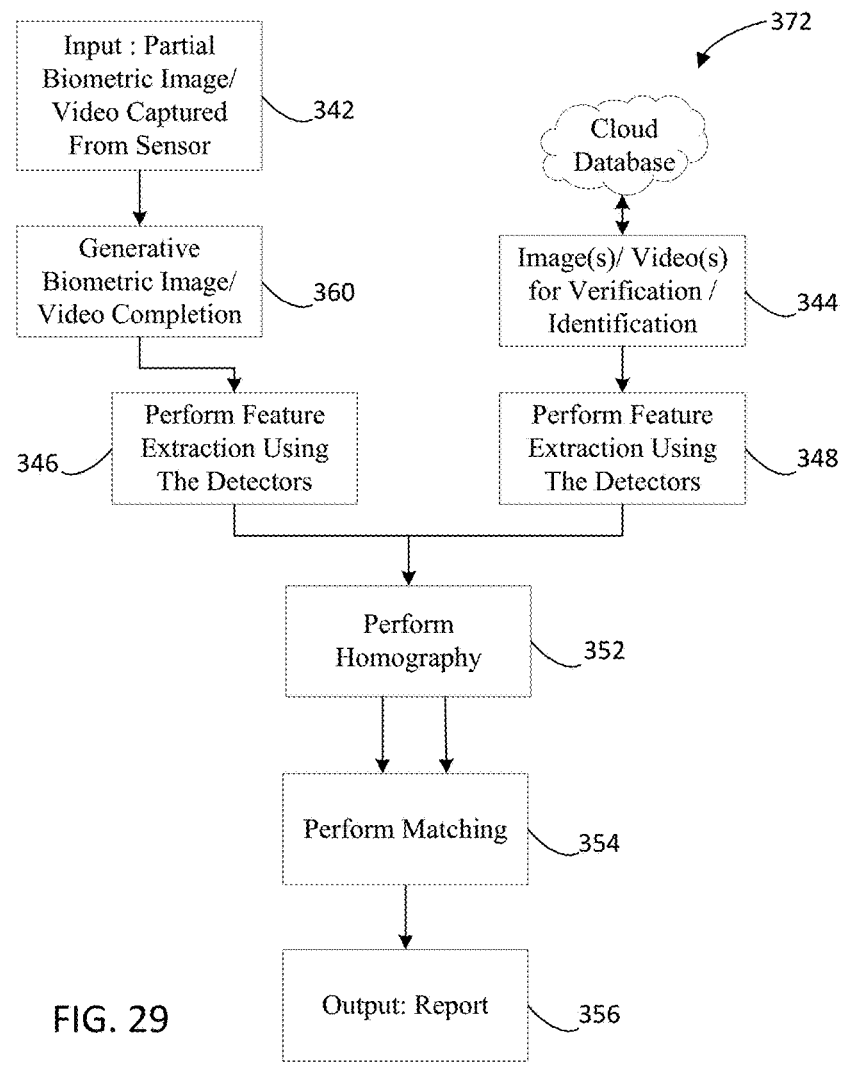
FIG. 29 is a flowchart of partial biometric matching method, for example, for use with the biometric authentication method of FIG. 26, according to an embodiment of the present disclosure.

As shown in FIG. 28, the basic concept of this neural network is that it contains two networks, namely, a generator network 362 and a discriminator network 364. The generator network 362 can generate new data instances 366 (e.g., new synthetic images) using random noise 368. In other words, the generator network 362 can take in random values and return new data instances as complete images. The discriminator network 364 can evaluate an authenticity of the generated data instances based on the original input image 342. These networks can be used to reconstruct missing or masked regions in biometric images, generating an output synthetic image 370 as a complete biometric image. Accordingly, partial biometric images can be generated using GAN or any neural network or computer vision technique that has the ability to generate images either as precise as the original or appearing to be visually realistic. Biometric matching can be performed using the generated synthetic complete image (i.e., the output image 370). For example, FIG. 29 illustrates a matching technique 372 similar to the matching technique of FIG. 27. More specifically, a partial image is input at step 342, generative biometric image completion 360 is performed (as shown in FIG. 28), and the matching technique can follow steps 344 to 356, as described above with respect to FIG. 27.

Figure 30:
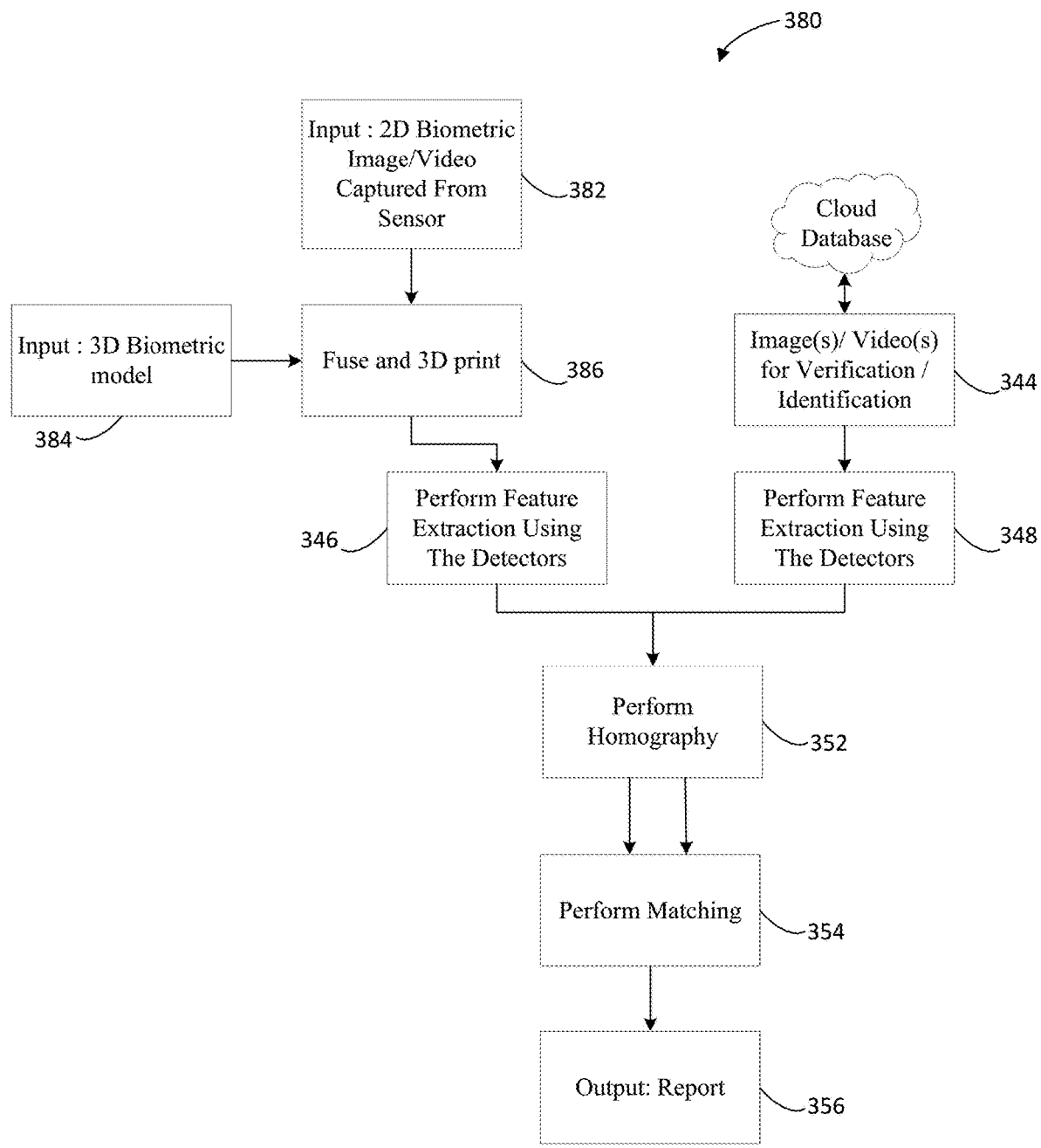
FIG. 30 is a flowchart of a 3D biometric modality matching method, for example, for use with the biometric authentication method of FIG. 26, according to an embodiment of the present disclosure.

In yet another instance, FIG. 30 illustrates a method 380 of 3D image authentication using 2D images obtained from biometric sensors. This method may be helpful, for example, with biometric sensor input from crime scenes. As shown in FIG. 30, a 2D biometric image may be input at step 382 and a 3D model of the biometric modality may be generated at step 384. The 3D model may then be fused or superimposed with the 2D image at step 386. The output from step 386 can then be used with the matching technique of steps 344 to 356 (as described above with respect to FIG. 27) to authenticate an individual.

Figure 31:
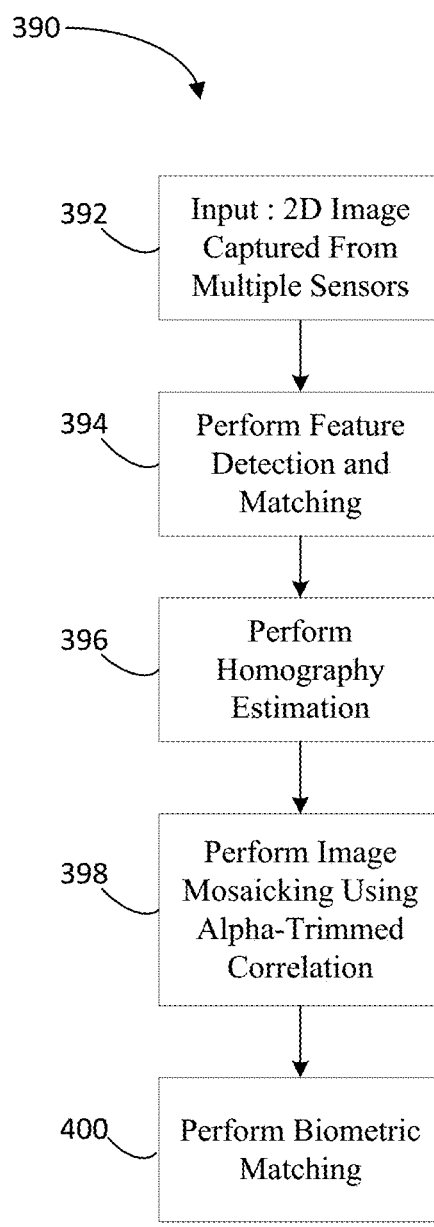
FIG. 31 is a flowchart of a method for mosaicking images captured from multiple sensors, with the biometric authentication method of FIG. 26, according to an embodiment of the present disclosure.
Figure 32A:
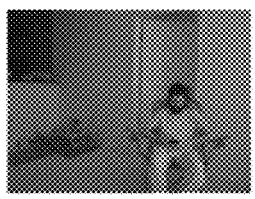
FIG. 32A is an original image to be stitched using a mosaicking algorithm, according to an embodiment of the present disclosure.
Figure 32B:
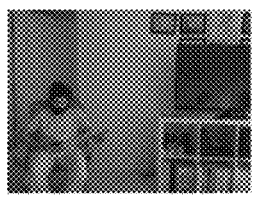
FIG. 32B is another original image to be stitched using a mosaicking algorithm, according to an embodiment of the present disclosure.
Figure 32C:
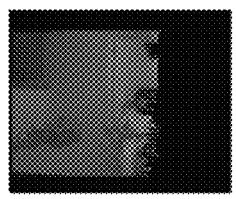
FIG. 32C is an image with a seam line cut obtained using an alpha-trimmed correlation technique, according to an embodiment of the present disclosure.
Figure 32D:
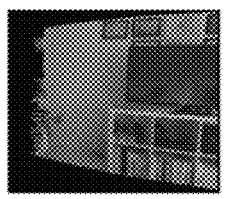
FIG. 32D is another image with a seam line cut obtained using an alpha-trimmed correlation technique, according to an embodiment of the present disclosure.
Figure 32E:
FIG. 32E is a final mosaicked image, according to an embodiment of the present disclosure.
Figure 32F:
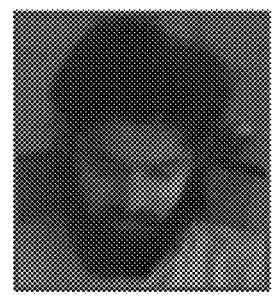
FIG. 32F is a zoomed section of the final image of FIG. 32E, according to an embodiment of the present disclosure.

In yet another instance, FIG. 31 illustrates another method 390 of biometric authentication. Images captured from a single sensor, for example, a single video surveillance camera can cause ambiguity due to occlusion or depth. Thus, to overcome this, images can be captured from multiple views or multiple sensors, for example from surveillance cameras oriented at different angles of a street. These images can be mosaicked together to provide a better view of the entire section considered.

As shown in FIG. 31, images from multi-views or multiple sensors are obtained at step 392. Feature detection and matching can be performed at step 394 using any of the various detectors described above. Step 394 can also include eliminating any irrelevant detected feature points. At step 396, homography estimation can be performed, for example, using a RANSAC algorithm (in other words, step 396 includes executing the RANSAC algorithm to obtain homography of the images). Next, at step 398, the images are aligned together, and an alpha trimmed correlation is performed, for example, as mentioned in Rao, Shishir P., et al., "Alpha trimmed correlation for touchless finger image mosaicking." Mobile Multimedia/Image Processing, Security, and Applications 2016, Vol. 9869, International Society for Optics and Photonics, 2016. The alpha trimmed correlation technique can be used to find an optimal seam line to stitch. Referring still to step 398, these images are mosaicked at multiple levels to obtain a panoramic image. Additionally, multi-level blending can be performed, for example, using a Gaussian pyramid, Laplacian pyramid, or Steerable pyramid to construct a panoramic image. An advantage of this technique is that the resulting panoramic image preserves biometric information, which may be crucial for individual authentication. In some applications, after mosaicking, image segmentation can be performed to obtain only a required or desired biometric trait(s) for identification. Finally, at step 400, the biometric authentication process described above with respect to FIG. 26 can be performed using the final image (or the final image segment based on the relevant biometric trait(s)).

An example of this is mosaicking method 390 is illustrated in FIG. 32. More specifically, FIGS. 32A and 32B are original images to be stitched (e.g., input at step 392), FIGS. 32C and 32D are images with a seam line cut obtained using an alpha-trimmed correlation technique (e.g., during step 398), FIG. 32E is a final mosaicked image (e.g., an output of step 398), and FIG. 32F is a zoomed section of the final image, for example, to be used if the application warrants only a required or desired section for matching.

The foregoing merely illustrates the principles of the disclosure. Various modifications and alterations to the described aspects will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. Further, the exemplary aspects described herein can operate together with one another and interchangeably therewith.

In addition, to the extent that the prior art knowledge has not been explicitly incorporated by reference herein above, it is explicitly being incorporated herein in its entirety. All publications referenced herein above are incorporated herein by reference in their entireties. Additionally, the following patents and publications are incorporated herein by reference: US Patent Publication No. 2015/0244946; U.S. Pat. No. 8,213,735; US Patent Publication No. 2013/0170749; U.S. Pat. Nos. 8,144,986; 8,594,446; US Patent Publication No. 2009/0196501; US Patent Publication No. 2010/0061629; and U.S. Pat. No. 6,775,405.

The invention claimed is:

1. A method of binarizing acquired input multimedia content, the method comprising the steps of:
   a) receiving the input multimedia content;
   b) applying single window $\alpha$-trim mean on one of the input multimedia content and a transformed grayscale channel of the input multimedia content;
   c) applying double window $\alpha$-trim mean on one of the input multimedia content and the transformed grayscale channel of the input multimedia content;
   d) creating a visibility multimedia content using the single window $\alpha$-trim mean and the double window $\alpha$-trim mean;
   e) determining a local visual threshold using the visibility multimedia content and a visual morphological thresholding method; and
   f) generating a binarized multimedia content by applying the local visual threshold on the input multimedia content.

2. The method of claim 1 and further comprising, prior to step b), performing a color space transformation on the input multimedia content and selecting a channel from the transformation to create the transformed grayscale channel of the input multimedia content.

3. The method of claim 1 and further comprising, prior to step b), performing a color space transformation using an $\alpha$-trim mean based principal component analysis (PCA) conversion on the input multimedia content, and selecting a channel from the transformation to create the transformed grayscale channel of the input multimedia content.

4. The method of claim 1, wherein applying the single window $\alpha$-trim mean comprises:
   dividing the input multimedia content into a plurality of content blocks;
   performing a local $\alpha$-trim mean on each of the plurality of content blocks; and
   determining the single window $\alpha$-trim mean, based on the local $\alpha$-trim means.

5. The method of claim 1, wherein applying the double window α-trim mean comprises:
   dividing the input multimedia content into a plurality of content blocks;
   performing a local α-trim mean on each of the plurality of content blocks;
   squaring a resulting α-trim mean for each of the plurality of content blocks;
   dividing each squared result into a second plurality of content blocks;
   performing the local α-trim mean on each of the second plurality of content blocks; and
   determining a double window α-trim mean, based on the local α-trim means corresponding to the second plurality of content blocks.

6. The method of claim 1, wherein determining a local visual threshold comprises:
   dividing the visibility multimedia content into a plurality of content blocks;
   determining a grey level density value for each of the plurality of content blocks;
   applying an optimization algorithm to each of the plurality of content blocks; and
   determining the local visual threshold.

7. The method of claim 1, wherein the input multimedia content is at least one forensic finger print image, and the binarized multimedia content is at least one binarized forensic finger print image.

8. The method of claim 1, wherein the input multimedia content is at least one microscopy image, and the binarized multimedia content is at least one binarized microscopy image.

9. The method of claim 1, wherein the input multimedia content is at least one 3D image, and the binarized multimedia content is at least one binarized 3D image.

10. The method of claim 1, wherein the input multimedia content is at least one X-ray image, and the binarized multimedia content is at least one binarized X-ray image.

11. A method of segmenting an acquired multimedia content, the method comprising the steps of:
   a) receiving the multimedia content;
   b) applying single window α-trim mean on one of the multimedia content and a transformed grayscale channel of the multimedia content;
   c) applying double window α-trim mean on one of the multimedia content and the transformed grayscale channel of the multimedia content;
   d) creating a visibility multimedia content using the single window α-trim mean and the double window α-trim mean;
   e) determining a local visual threshold using the visibility multimedia content and a visual morphological thresholding method; and
   f) generating a mask based on the local visual threshold; and
   g) generating a foreground multimedia content and a background multimedia content by applying the mask to the multimedia content.

12. The method of claim 11, wherein applying the single window α-trim mean comprises:
   dividing the input multimedia content into a plurality of content blocks;
   performing a local α-trim mean on each of the plurality of content blocks; and
   determining the single window α-trim mean, based on the local α-trim means.

* * * * *